(12) United States Patent
Lockett et al.

(10) Patent No.: US 9,501,666 B2
(45) Date of Patent: Nov. 22, 2016

(54) POLYMORPHIC COMPUTING ARCHITECTURES

(71) Applicant: SRI International, Menlo Park, CA (US)

(72) Inventors: Christopher S. Lockett, Santa Clara, CA (US); Scott A. Oberg, Paso Robles, CA (US); Sean M. Forsberg, San Luis Obispo, CA (US); Hassen Saidi, Menlo Park, CA (US); Jeffrey E. Casper, San Carlos, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 135 days.

(21) Appl. No.: 14/052,266

(22) Filed: Oct. 11, 2013

(65) Prior Publication Data
US 2014/0380425 A1 Dec. 25, 2014

Related U.S. Application Data

(60) Provisional application No. 61/839,202, filed on Jun. 25, 2013.

(51) Int. Cl.
*H04L 29/06* (2006.01)
*G06F 21/74* (2013.01)
(Continued)

(52) U.S. Cl.
CPC ............... *G06F 21/74* (2013.01); *G06F 9/542* (2013.01); *G06F 21/00* (2013.01); *G06F 21/575* (2013.01);
(Continued)

(58) Field of Classification Search
CPC .................. H04L 63/08; H04L 63/20; G06F 9/542; G06F 21/00; G06F 21/575;
(Continued)

(56) References Cited

U.S. PATENT DOCUMENTS 6,134,594 A * 10/2000 Helland .............. G06F 21/6218
707/999.102
6,256,771 B1 * 7/2001 O'Neil ...................... G06F 8/36
709/202

(Continued)

OTHER PUBLICATIONS

SRI International, "SRI International Begins Final Development of Commercial Trusted Mobility Devices for U.S. Marine Corps," Apr. 8, 2013, 1 page, available at http://www.sri.com/newsroom/press-releases/sri-begins-final-development-commercial-trusted-mobility-devices.

(Continued)

*Primary Examiner* — Theodore C. Parsons
*Assistant Examiner* — James J Wilcox
(74) *Attorney, Agent, or Firm* — Barnes & Thornburg LLP

(57) ABSTRACT

Polymorphic computing architectures can support and control separate, independently executable domains and other components on a computing platform. In some embodiments, the architectures may control the different domains and/or components according to different purposes. In some embodiments, the architectures can control domains and/or components to enforce a desired "purpose" of a domain/component while simultaneously denying a corresponding "anti-purpose".

10 Claims, 29 Drawing Sheets

(51) Int. Cl.
*G06F 9/54* (2006.01)
*G06F 21/60* (2013.01)
*G06F 21/00* (2013.01)
*G06F 21/57* (2013.01)
*H04W 12/06* (2009.01)

(52) U.S. Cl.
CPC ............... *G06F 21/60* (2013.01); *H04L 63/08* (2013.01); *H04L 63/20* (2013.01); *G06F 2221/2101* (2013.01); *H04W 12/06* (2013.01)

(58) Field of Classification Search
CPC ...................... G06F 21/60; G06F 21/74; G06F 2221/1101; H04W 12/08
See application file for complete search history.

(56) References Cited

U.S. PATENT DOCUMENTS

| | | | | |
|---|---|---|---|---|
| 6,324,619 | B1* | 11/2001 | Raverdy | G06F 8/24 717/120 |
| 6,643,262 | B1* | 11/2003 | Larsson | H04L 12/2856 370/236 |
| 6,854,107 | B2* | 2/2005 | Green | G06F 8/20 717/102 |
| 7,676,608 | B1* | 3/2010 | Crosmer | G06F 21/554 710/36 |
| 8,204,480 | B1* | 6/2012 | Lindteigen | H04L 63/083 455/411 |
| 8,270,963 | B1* | 9/2012 | Hart | G06F 8/65 455/418 |
| 8,458,800 | B1* | 6/2013 | Van Voorhees | H04L 63/105 380/255 |
| 8,495,731 | B1* | 7/2013 | Mar | G06F 21/74 379/161 |
| 8,519,820 | B2 | 8/2013 | Cannistraro | |
| 2005/0233744 | A1* | 10/2005 | Karaoguz | H04W 12/08 455/432.3 |
| 2007/0298719 | A1* | 12/2007 | Sproule | H04M 1/72563 455/66.1 |
| 2008/0114973 | A1* | 5/2008 | Norton | G06F 9/485 712/228 |
| 2008/0184274 | A1* | 7/2008 | Ohta | G06F 9/485 719/319 |
| 2008/0318616 | A1* | 12/2008 | Chipalkatti | H04W 12/08 455/550.1 |
| 2009/0089860 | A1* | 4/2009 | Forrester | H04L 63/12 726/3 |
| 2009/0125880 | A1* | 5/2009 | Manolescu | G06F 8/24 717/110 |
| 2010/0319053 | A1* | 12/2010 | Gharabally | G06F 21/604 726/4 |
| 2011/0145833 | A1* | 6/2011 | De Los Reyes | G06F 3/0488 718/106 |
| 2013/0152092 | A1 | 6/2013 | Yadgar | |
| 2013/0303146 | A1* | 11/2013 | Van Voorhees | G06F 21/53 455/418 |
| 2014/0115693 | A1* | 4/2014 | Schieman | G06F 21/53 726/17 |
| 2014/0179271 | A1* | 6/2014 | Guccione | G06F 21/10 455/410 |
| 2014/0325644 | A1* | 10/2014 | Oberg | G06F 21/51 726/22 |
| 2014/0330990 | A1* | 11/2014 | Lang | G06F 9/4555 710/14 |
| 2014/0379923 | A1* | 12/2014 | Oberg | H04L 63/20 709/226 |
| 2014/0380405 | A1* | 12/2014 | Forsberg | H04L 63/20 726/1 |
| 2014/0380406 | A1* | 12/2014 | Saidi | H04L 63/20 726/1 |
| 2015/0363474 | A1* | 12/2015 | Fogel | H04M 1/72547 707/722 |
| 2016/0019104 | A1* | 1/2016 | Major et al. | G06F 21/6218 719/319 |

OTHER PUBLICATIONS

Carl L. Nerup et al., "A High Assurance Framework for Mobile/Wireless Device Applications," 2012, 15 pages, available at http://www.ok-labs.com/_assets/OK-WP-High-Assurance-Framework-022712.pdf.

Rob McCammon, "SecureIT Mobile: How to Build a More Secure Smartphone with Mobile Virtualization and Other Commercial Off-the-Shelf Technology," 2010, 14 pages.

Grit Denker et al., "Policy-Based Date Downgrading: Toward a Semantic Framework and Automated Tools to Balance Need-To-Protect and Need-To-Share Policies," IEEE International Symposium on Policies for Distributed Systems and Networks, Jun. 17, 2010. 9 pages.

Common Criteria for Information Tehcnology Security Evaluation, "Part 1: Introduction and General Model," v. 3.1, rev. 3, Jul. 2009, 93 pages, available at http://www.commoncriterialportal.org/files/ccfiles/CCPART1V3.1R3.pdf.

Common Criteria for Information Tehcnology Security Evaluation, "Part 2: Security Functional Components," v. 3.1, rev. 3, Jul. 2009, 321 pages, available at http://www.commoncriterialportal.org/files/ccfiles/CCPART2V3.1R3.pdf.

Common Criteria for Information Tehcnology Security Evaluation, "Part 3: Security Assurance Components," v. 3.1, rev. 3, Jul. 2009, 232 pages, available at http://www.commoncriterialportal.org/files/ccfiles/CCPART3V3.1R3.pdf.

J. M. Rushby et al., "The MILS Component Integration Approach to Secure Information Sharing," Proceedings of the 27th IEEE/AIAA Digital Avionics Systems Conference, 2008, 12 pages, St. Paul, MN, USA.

National Information Assurance Partnership: Common Criteria Evaluation & Validation Scheme, "U.S. Government Protection Profile for Separation Kernels in Environments Requiring High Robustness," v. 1.03, Jun. 29, 2007, 182 pages, available at http://www.niap-ccevs.org/pp/pp_skpp_hr_v1.03.pdf.

Rance Delong et al., "Toward a Medium-Robustness Separation Kernel Protection Profile," 2007, 10 pages available at http://www.acsac.org/2007/papers/168.pdf.

Jonathon Corbet, "dm-verity", Rhino Security Labs, 2011, 4 pages.

Dmitry Kasatkin, "[dm-devel] [PATCH 0/1] dm-integrity: Integrity Protection Device-Mapper Target", http://www.redhat.com/archives/dm-devel/2012-September/msg00320.html, 2 pages.

TrustZone, ARM The Architecture for the Digital World; http://www.arm.com/products/processors/technologies/trustzone.php, 5 pages.

Trustonic; Trusted Execution Environment, http://www.trustonic.com/products-services/trusted-execution-environment, 1 page.

Open Kernel Labs, OKL4 Microviser : Open Kernel Labs, http://www.ok-labs.com/products/okl4-microvisor, 4 pages.

Christopher S. Lockett et al., unpublished U.S. Appl. No. 14/052,266, filed Oct. 11, 2013, 140 pages.

Hassen Saidi et al., unpublished U.S. Appl. No. 14/052,169, filed Oct. 11, 2013, 55 pages.

Sean M. Forsberg et al., unpublished U.S. Appl. No. 14/052,080, filed Oct. 11, 2013, 69 pages.

Scott A. Oberg et al., unpublished U.S. Appl. No. 14/051,923, filed Oct. 11, 2013, 70 pages.

Scott A. Oberg et al., unpublished U.S. Appl. No. 13/872,865, filed Apr. 29, 2013, 49 pages.

Kenneth C. Nitz et al., unpublished U.S. Appl. No. 13/585,003, filed Aug. 14, 2012, 63 pages.

Kenneth C. Nitz et al., unpublished U.S. Appl. No. 13/585,008, filed Aug. 14, 2012, 63 pages.

Edgar T. Kalns et al., unpublished U.S. Appl. No. 13/891,858, filed May 10, 2013, 67 pages.

Edgar T. Kalns et al., unpublished U.S. Appl. No. 13/891,864, filed May 10, 2013, 65 pages.

Unpublished U.S. Appl. No. 61/839,202, filed Jun. 25, 2013, 63 pages.

Redbend Software, A New Solution for Managing Embedded Handset Software, printed May 7, 2013, 6 pages.

(56) References Cited

OTHER PUBLICATIONS

GlobalPlatform made simple guide: Trusted Execution Environment (TEE) Guide, available at http://www.globalplatform.org/mediaguidetee.asp, printed Aug. 16, 2013, 4 pages.

* cited by examiner

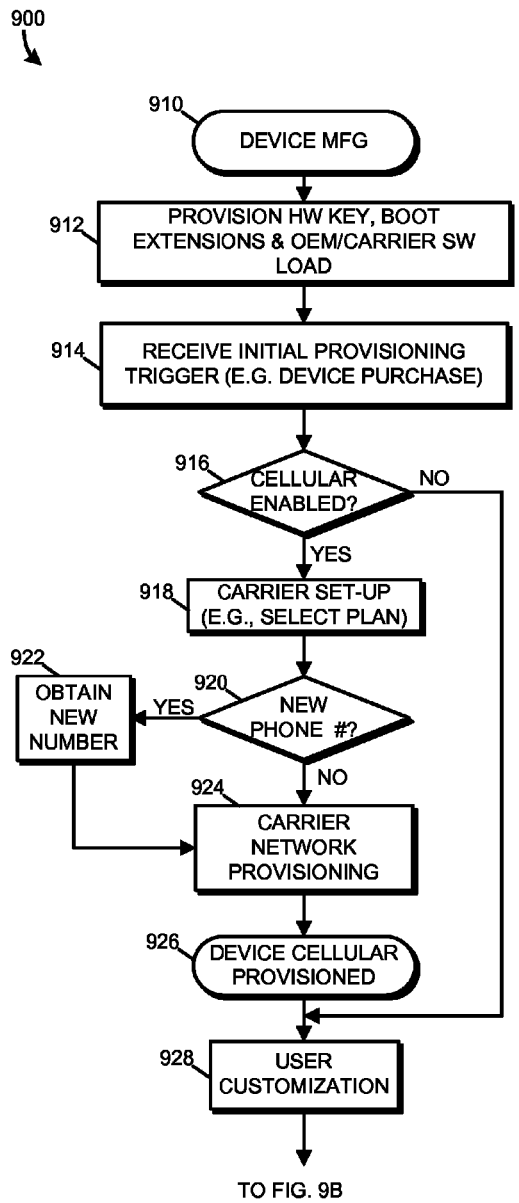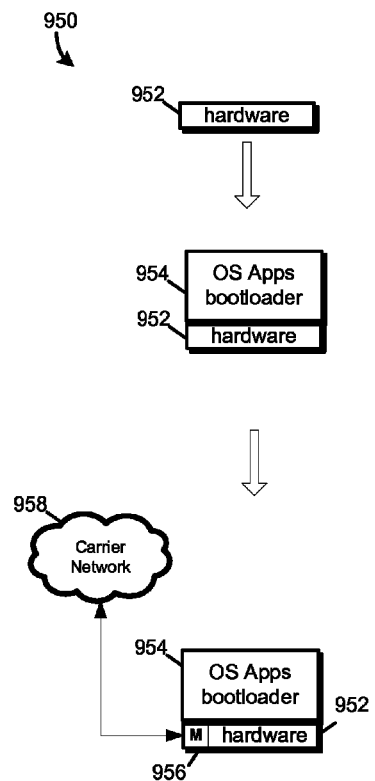
FIG. 9A
FIG. 9C

1700

TRIGGER FOR DOMAIN POLICY GENERATION/UPDATE
(E.G., USER REQUEST OR POLICY ARBITRATION SUBSYSTEM FEEDBACK)

1710
IDENTIFY STAKEHOLDER(S)
(E.G., USER, ENTITY OWNER, ETC.)

1712
OBTAIN NATURAL LANGUAGE
EXPRESSION(S) OF DOMAIN POLICY

1714
DERIVE POLICY PURPOSE AND
ANTI-PURPOSE FROM NATURAL
LANGUAGE EXPRESSION(S)

1716
GENERATE/UPDATE
DOMAIN POLICY ARTIFACT
(1 to N IMPLEMENTATIONS)

NEW/UPDATED POLICY ARTIFACT

FIG. 17

POLYMORPHIC COMPUTING ARCHITECTURES

CROSS-REFERENCES TO RELATED APPLICATIONS

This application claims the benefit of and priority to U.S. Provisional Patent Application Ser. No. 61/839,202, filed Jun. 25, 2013, which is incorporated herein by this reference in its entirety.

This application is related to U.S. Utility application Ser. No. 13/872,865 filed Apr. 29, 2013, of Oberg et al., titled "Operating System Independent Integrity Verification," which is incorporated herein by this reference in its entirety.

This application is related to U.S. Utility application Ser. No. 14/051,923 filed on even date herewith, of Oberg et al., titled "Componentized Provisioning," which is incorporated herein by this reference in its entirety.

This application is related to U.S. Utility application Ser. No. 14/052,080 filed on even date herewith, of Forsberg et al., titled "Flexible Policy Arbitration Control Suite," which is incorporated herein by this reference in its entirety.

This application is related to U.S. Utility application Ser. No. 14/052,169 filed on even date herewith, of Saidi et al., titled "Polymorphic Virtual Appliance Rule Set," which is incorporated herein by this reference in its entirety.

GOVERNMENT RIGHTS

This invention was made in part with government support under contract number M67854-12-C-2408, awarded by the United States Marine Corps Systems Command. The United States Government has certain rights in this invention.

BACKGROUND

Traditional system architectures for computing platforms, and mobile computing systems in particular (such as smart phones, tablet computers, wearable devices, and others), have a monolithic, vertical software design in which execution of applications stored on the file system, device drivers, and software stacks, is controlled by the operating system kernel. Traditional hardware architectures include the co-located system components and resources as a monolithic, fixed system. A consequence of traditional system software architectures is the co-location of the software into a single general purpose environment, resulting in several million lines of software code for a single system. While this may provide a convenient architecture to develop applications, the general purpose design results is a highly complicated, co-mingled architecture in which it is extremely difficult to manage and ensure control of the device for specific functions and in the presence of vulnerabilities. As computing platforms may be used to access and control other devices and systems, the same management and control implications are present.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 9A-9B illustrate a simplified flow diagram of at least one embodiment of a method for provisioning an electronic device as disclosed herein;

FIGS. 9C-9D illustrate simplified depictions of an electronic device during different stages of the component provisioning method of FIGS. 9A-9B;

FIG. 17 is a simplified flow diagram of at least one embodiment of a method for creating policy artifacts as disclosed herein;

DETAILED DESCRIPTION OF THE DRAWINGS

Figure 1:
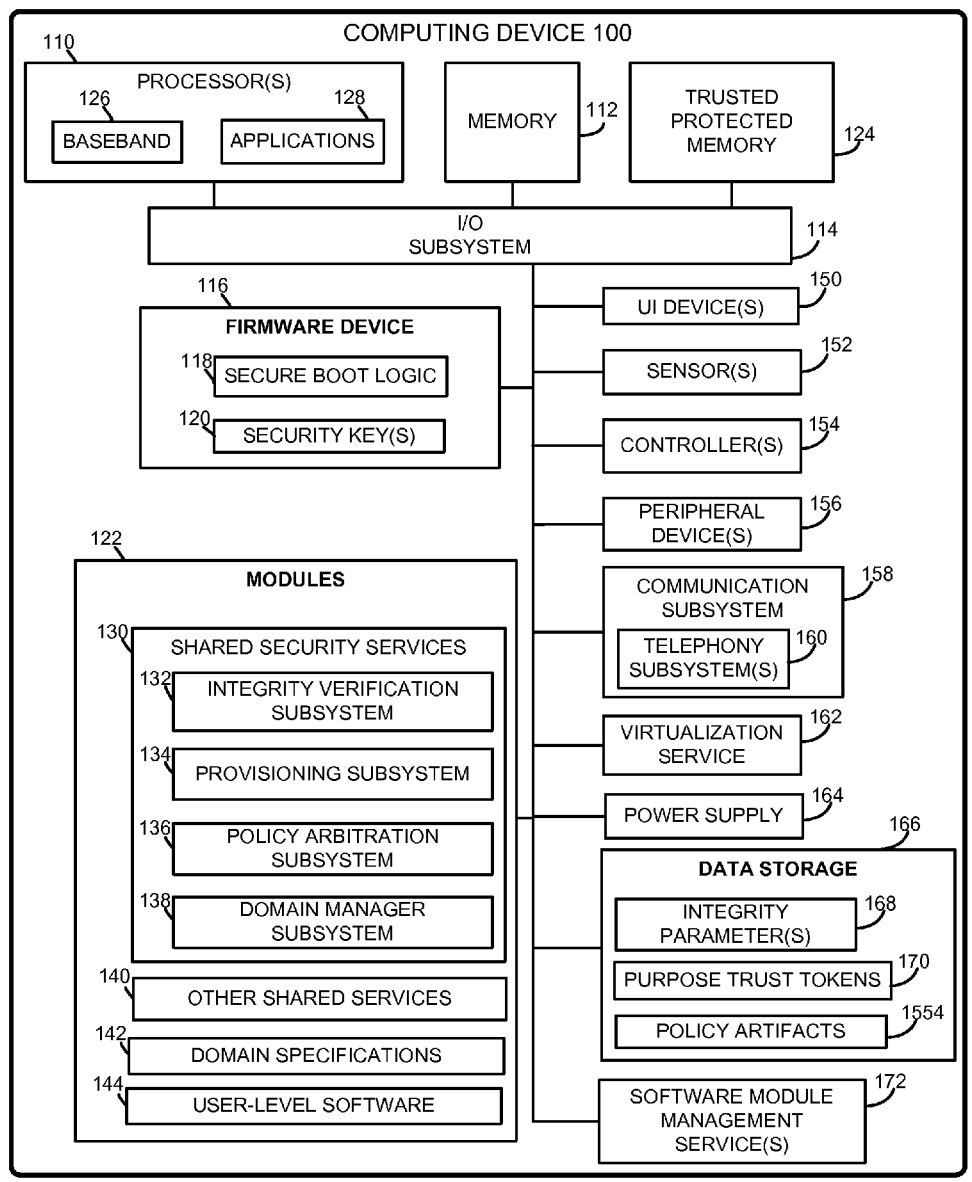
FIG. 1 is a simplified block diagram of at least one embodiment of a system architecture for a computing device or platform as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Existing mobile device management ("MDM") and other policy solutions implement static, monolithic security policies that are designed for the traditional architectures. As a result, these solutions are unable to dynamically control the use and sharing of resources, e.g., based on the purpose of an installed component and the current context of its use/operation. For example, traditional policy solutions are unable to detect whether, in a given circumstance, a device or a component thereof is being used for a specific purpose, such as a personal matter or a business-related transaction. As such, these solutions result in inflexible and often over-restrictive policy as the lack of context means they must always enact the most protective measures.

Polymorphic computing system architectures composed of provisioned, verified and policy controlled components or "domains" either physically co-located and/or networked together for one or more defined purposes are disclosed herein. A system domain manager provides selective activation of one or more components or domains in accordance with a semi-dynamic policy arbitration subsystem that may transform the system into a specific, purpose defined computing device. In some embodiments, this polymorphic computing architecture can be delivered on a general purpose device that, when provisioned with on and off device components and configured with purpose derived system policy, becomes a purposed system. The purposed system architecture is polymorphic in that system components can be activated, deactivated or re-provisioned in response to authenticated user control or contextual policy conditions.

Additionally, embodiments, of a polymorphic computing system architecture include software and hardware components that can be individually composed, provisioned and controlled for specific policy-defined purposes. In systems where multiple, co-existing provisioned domains or modules are simultaneously sharing resources, a policy manager, policy engine and policy arbitrator assures compliance to defined policy without requiring each domain to have prior knowledge of the other domains. Embodiments of the system include provisioned trust tokens and policy artifacts that can be generated by collecting the natural language expressions of purpose, policy and context for the system. The natural language expressions use an ontology framework for automated generation of purpose and anti-purpose based policy artifacts, rule sets and trust tokens that are configured to realize the desired purpose and preclude the possibility of the associated anti-purpose.

In some embodiments, MILS (Multiple Independent Levels of Security) concepts can be applied to these and other computing environments to provide a modular, component-based approach to secure system architectures, component provisioning, policy provisioning, and purpose/policy enforcement, and system certification. In general, a MILS-based platform is comprised of components that share physical resources while creating strongly separated exported resources. When composed "additively," these resources form a distributed resource sharing substrate, which may be referred to as a MILS platform. In high assurance applications, the use of a separation kernel is a component of the MILS platform. The separation kernel architecture provides for a functionally "distrusted" system of individual, separated components with well defined, limited communication channels between the components ("distrusted" in the sense that the individual components are not assumed to be trusted from a security standpoint). As used herein, a "well-defined" communication channel may refer to, among other things, one or more signal paths, which can be implemented in hardware or software, and may be implemented as a logical interface between two logical (e.g., virtualized) units, where the interface is clearly defined so that the entities on either end of the communication channel or channel are known and unchangeable, and the type of communications that are permitted to be sent over the communication channel/channel are also known and unchangeable. Once each of these well-defined communication channels or channels has been validated as such, it need not be continuously re-validated.

There are few, if any, integrity verification approaches that can reliably determine the integrity of operating systems, system files, libraries and other software at both at load time and at run time, as needed. Many existing techniques are either integrated with the operating system itself, or must be executed offline. As described in this disclosure, a physical or virtualized device block-based verification of firmware or software at load time or at run time can be leveraged to provide more robust and flexible integrity verification services that operate independently of the operating system.

In general, computer files can become corrupted as a result of, for example, storage media failures, transmission errors, write errors that occur during copying or moving of the files, or computer program bugs. Additionally, untrusted parties may intentionally modify computer files to insert malicious code during use, transmission or storage of the file. Accordingly, as used herein, "integrity verification" refers generally to the use of computerized algorithms, methods or procedures for determining whether the integrity and/or authenticity of a computer file (e.g., data and/or computer program instructions, software or firmware) has been corrupted or otherwise compromised.

As disclosed herein, a component provisioning subsystem 134, 254, 850 can be realized, for example, upon a MILS-based platform. For example, aspects of the component provisioning subsystem 134, 254, 850 can be realized by operational components of the system architecture to achieve particular component-specific purposes. In the abstract, the architecture defines components (e.g., subjects/objects/domains/applications/subsystems) and interactions between the components. Isolation and information flow control policies govern the existence of the architectural components on the platform and their interactions with system resources and other components. Isolation policies provide that only controlled, well-defined interfaces (thus limiting the type and scope of interaction) are allowed for direct interaction between components. Furthermore, the data allowed to pass through these interfaces can be controlled by the "trusted" side of the connection or by a "trusted" component inline of the connection. Information flow control policies define explicitly permitted causality or interference between the components. Whereas current mobility policy and MDM solutions are only as secure as their parent process, the disclosed approach can provide a peer-based architecture in which peer components (such as those found in a virtualized system) are isolated from one another so as to be protected from other peer components should any of the components be compromised. Among other things, a peer-based policy architecture as disclosed herein enables individual components' policies to exist without prior or current knowledge of other individual component policies.

In some embodiments, the component provisioning subsystem 134, 254, 850 can be employed to provide a high assurance of security for "multiple-personality" computing devices. In such devices, different user-level execution environments (e.g., personal and enterprise domains, or "unclassified" and "classified" domains) may be isolated from one another using the MILS-based techniques, so as to, for example, simultaneously protect personal privacy and enterprise security (e.g., address the "need to protect") while also enabling appropriate data sharing (e.g., the "need to share"). For instance, one domain may allow a mobile device user to access personal records such as e-mail, medical data, or financial reports, but deny access to other domains, while another domain may permit access to data and applications involving very highly confidential or secret business information, processes or operations, but deny such access to other domains. To do this, embodiments of the component provisioning subsystem 134, 254, 850 may cooperate with domain isolation, encryption, policy, and other related security technologies developed by SRI International, which can be embedded into smart phones and other mobile platforms, as described in more detail below and in other patent applications of SRI International, including the related patent applications identified above. Some examples of high assurance, multiple-personality mobile devices that have been developed by SRI International were mentioned in the press release, "SRI International Begins Final Development of Commercial Trusted Mobility Devices for U.S. Marine Corps," Apr. 8, 2013.

As disclosed herein, a flexible, distributed policy architecture can be realized, for example, upon a MILS-based platform. Such a policy architecture can be realized by operational components of the architecture to achieve a particular system purpose. In the abstract, the policy architecture defines components (e.g., subjects/objects/domains/applications) and interactions between the components. Isolation and information flow control policies govern the existence of the architectural components on the platform and their interactions with system resources and other components. Isolation policies provide that only controlled, well-defined interfaces (thus limiting the type and scope of interaction) are allowed for direct interaction between components. Furthermore, the data allowed to pass through these interfaces can be controlled by the "trusted" side of the connection or by a "trusted" component inline of the connection. Information flow control policies define explicitly permitted causality or interference between the components. Whereas current mobility policy and MDM solutions are only as secure as their parent process, the disclosed approach can provide a peer-based architecture in which peer components (such as those found in a virtualized system) are isolated from one another so as to be protected from other peer components should any of the components be compromised. Among other things, a peer-based policy architecture as disclosed herein enables individual components' policies to exist without prior or current knowledge of other individual component policies.

Some embodiments of the disclosed policy arbitration subsystem are embodied in a context-aware device (e.g., a mobile device equipped with one or more "environment" sensors, such as a GPS, accelerometer, and/or others). Such embodiments can extend a MILS-based policy architecture by enabling semi-dynamic policy implementations in the context-aware device. For example, the policy arbitration subsystem can manage and enforce the embedded policies of isolated, distributed architectural components that are designed for specific purposes. Such policies may be statically pre-defined, e.g., as information flow control channels between isolated MILS-based components. As used herein, "policy" may refer to, among other things, an expression of enforcement, monitoring, and/or other capabilities that are needed on the computing device to ensure that the computing device or a component thereof operates according to a defined purpose and does not perform the associated anti-purpose. For example, a policy may define criteria for sharing and/or protecting information and components of the computing device under various conditions and contexts. The policy may be implemented, for example, as a set of rules, instructions, data values, parameters, or a combination thereof, which may be stored in, for example, a database or table. As used herein, "policy provisioning" or "domain provisioning" may refer to, among other things, the process of provisioning a domain for use on a computing device in a way that the domain can coexist with other domains that may have conflicting policies (e.g., by installing new policy artifacts for the domain, as described herein); whereas "purpose provisioning" or "component provisioning" may refer to, among other things, provisioning a domain or other type of component for use on a computing device in accordance with a domain- or component-specific purpose, which may be unique to the domain/component (e.g., during installation of a new component on the computing device). Where the term "provisioning" is used herein without the "purpose" or "policy" modifiers, "provisioning" may refer more generally to the process of configuring a domain or component for use on a computing device (e.g., including purpose provisioning and/or policy provisioning). Moreover, where the term "purpose" is used, it may refer to, among other things, a purpose that is associated with a domain policy that is provisioned by, for example, the disclosed policy arbitration subsystem (e.g., a "domain purpose"), or a purpose that is associated with a component or component resource, which may be provisioned by, for example, the disclosed provisioning subsystem (e.g., a "component purpose"). The intended use of these terms should be apparent from the context, where not otherwise explained.

In some embodiments, references to "policy provisioning" and "policy arbitration" relate to systems and rule sets for handling "well defined" shared system services (e.g., system services that require a system API and integrated trigger/enforcement capability), although other embodiments of the disclosed policy arbitration subsystem can operate in a distributed environment, e.g., across computing systems. As described in more detail below, in some embodiments, "component purpose provisioning" can be applied to shared system services (where each shared system service is a provisionable component, for example), to component owners/stakeholders, to "real" (well-defined) component resources, or to abstract component resources. Such component resources may be shared across a network with an external resource receiver, shared locally on the device/platform 100 as global system resource, or shared exclusively across a set of components, or may be a private resource known only to a single component. When shared across a network with an external resource receiver, the component resource may be provided with attestation and integrity of the component purpose rule set and digitally signed by the purpose enforcement engine for verification by any component resource receiver. In addition, confidentiality may be incorporated and accommodated by using a suitable encryption technique (e.g. if the purpose enforcement engine or purpose rule has the resource receiver's public key, or even a pre-shared key associated with the rule and receiver). Encryption and integrity implementations may even be layered or unique to each purpose rule set (e.g. encryption key A with rule 1 and key B with rule 2 may be combined serially).

Illustrative System Architecture

Referring now to FIG. 1, an illustrative computing device/platform 100 is embodied as a computing device configured with a modular, virtualized system architecture, as described in more detail below. It should be understood, however, that the computing device/platform 100 may be any type of computing device or platform, e.g., a device that has a virtualized architecture, a traditional system architecture, or a traditional system architecture configured to provide some virtualization features. For example, the computing device/platform 100 may be embodied as any type of personal computer (e.g., desktop, laptop, net book, e-reader, tablet, smart phone, body-mounted device, or mobile appliance), a server, server farms hosted in the cloud, an enterprise computer system, a network of computers, the network infrastructure itself, a combination of computers and other electronic devices, or other types of electronic device, including wearable computing devices, smart appliances, medical monitoring and sensing devices, commercial personal devices, health monitoring devices, embedded scientific and sensing devices, UAV's (unmanned aerial vehicles), SUAV's (small unmanned air vehicles), other types of unmanned vehicles, and other safety critical systems.

In some embodiments, the disclosed architectures and subsystems extend the purpose/anti-purpose concepts discussed in Denker et al., "Policy-Based Downgrading: Toward a Semantic Framework and Automated Tools to Balance Need-to-Protect and Need-to-Share Policies" (IEEE International Symposium on Policies for Distributed Systems and Networks, 2010) to a MILS-enabled architecture. For instance, MILS-based components and policies that are only designed to achieve a particular "purpose" (or desired function) may in some contexts result in realizing an "anti-purpose" of the system (an unintended consequence). As an example, a banking application may need to share account information with others to achieve a defined "purpose," (e.g., to effectuate a transfer of funds), but in doing so, the degree of granularity of the shared information may violate a security policy "anti-purpose"—e.g., "I would like to pay my bills, but I don't want the payee to know my account balance or have the right to change the dollar amount." As another example, a high-resolution GPS (Global Positioning System) location of an asset may need to be used by a security-vetted domain to achieve a defined "purpose," but in doing so, the required amount of detail of the shared location information may violate a security policy "anti-purpose" of the domain—e.g., "I would like certain trusted people to know the specific location of the asset . . . but other people do not need to know exactly where it is located." In this case, the disclosed domain manager subsystem may restrict access to or downgrade the GPS data provided to other domains while the domain requiring higher-resolution location information is activated.

Some embodiments of the disclosed architectures and subsystems are embodied in a context-aware device (e.g., a mobile device equipped with one or more "environment" sensors, such as a GPS, accelerometer, and/or others). Such embodiments can extend a MILS-based architecture by enabling semi-dynamic provisioning implementations in the context-aware device. For example, the various subsystems can, alone or in combination, manage and enforce the embedded policy and purpose rule sets of isolated, distributed architectural domains and other components that are designed for specific purposes. Such policies/purposes/rule sets may be statically pre-defined, e.g., as information flow control channels between isolated MILS-based components. As used herein, terms such as "policy" and "purpose rule sets" may refer to, among other things, an expression of enforcement, monitoring, and/or other capabilities that are needed on the computing device/platform 100 to ensure that the computing device/platform 100 or a component thereof operates according to a defined purpose and does not perform the associated anti-purpose. For example, a purpose rule set may define criteria for sharing and/or protecting information and/or components of the computing device under various conditions and contexts. The purpose rule set may be implemented, for example, as a set of rules, instructions, data values, parameters, or a combination thereof, which may be stored in computer memory in, for example, a database or table.

In some embodiments, one or more security keys 120 used by the secure boot logic 118 and/or other modules 122 may be stored in the firmware device 116. The security keys 120 may include, for example, one or more public keys used in a digital signature scheme, which may be employed to authenticate one or more integrity parameters 168. The integrity parameters 168 may include trusted block device hashes, which may be computed at initial installation of a software module 122 by a trusted party. The integrity parameters 168 may also include current block device hashes that are computed during use of the computing device/platform 100, e.g., at software load time. More generally, the integrity parameters 168 can include or reference information (such as hash values) that can be evaluated by the secure boot logic 118 and/or other modules 122 to check the integrity of executable components of the computing device/platform 100 (including, but not limited to, the component provisioning subsystem 134, 254, 850) at load time or at run time. The integrity parameters 168 and the use thereof by the computing device/platform 100 are described in more detail in Oberg et al., U.S. patent application Ser. No. 13/872,865.

Each or any of the disclosed subsystems of the trusted computing base may be embodied as a suite of software components, such as API (Application Programming Interface) extensions. However, some embodiments extend beyond software-only implementations. For example, some embodiments enable policy or purpose-based component controls in systems that are designed with advanced materials in which physical properties are modified in specific contexts, such as temperature, radio frequency (RF) fields, electro-magnetic fields, and/or others. In some instances, the physical properties themselves may be a realization of a physics-based embedded policy designed for a specific purpose. Where an "anti-purpose" would otherwise result, embodiments of the disclosed architectures may deny access by the component to selected parts of the system. For example, component-based power control can in itself be a realization of the MILS-based "isolation" policy. As such, powering down a GPS or radio receiver is one form of isolation. Thus, in some cases, each or any of the disclosed subsystems of the trusted computing base, alone or in combination with other subsystems of the trusted computing base, may be used to implement low level resource management (e.g., device management that extends beyond the software/application layer to hardware/firmware layers) and other similar concepts, where low-level control of system components can achieve a desired "purpose" and deny the "anti-purpose."

The illustrative computing device/platform 100 includes at least one central processing unit or processor (e.g., a microprocessor, microcontroller, digital signal processor, etc.) 110, memory 112, trusted protected memory 124, and an input/output (I/O) subsystem 114. In the illustrated embodiment, the processor(s) 110 include a baseband processor 126 and an applications processor 128. In various embodiments, features of the baseband processor 126 and the applications processor 128 may be located on the same or different hardware devices (e.g., a common substrate). In general, the baseband processor 126 interfaces with other components of the device/platform 100 and/or external components to provide, among other things, wireless communication services, such as cellular, BLUETOOTH, WLAN, and/or other services. In general, the applications processor 128 handles processing required by software and firmware applications running on the computing device/platform 100, as well as interfacing with various sensors and/or other system resources 210. However, it should be understood that features typically handled by the baseband processor 126 may be handled by the applications processor 128 and vice versa, in some embodiments.

The processor(s) 110 and the I/O subsystem 114 are communicatively coupled to the memory 112 and the trusted protected memory 124. The memory 112 and the trusted protected memory 124 may be embodied as any type of suitable computer memory device (e.g., volatile memory such as various forms of random access memory). More specifically, the illustrative trusted protected memory 124 is configured to provide component isolation in accordance with the MILS-based techniques, as described in more detail below with reference to FIG. 3.

The I/O subsystem 114 may include, among other things, an I/O controller, a memory controller, and one or more I/O ports. In some embodiments, the I/O subsystem 114 may form a portion of a system-on-a-chip (SoC) and be incorporated, along with the processor(s) 110 and other components of the computing device/platform 100, on a single integrated circuit chip. As such, each or any of the components coupled to the I/O subsystem 114 may be located on a common integrated circuit chip, in some embodiments.

The illustrative I/O subsystem 114 is communicatively coupled to a number of hardware, firmware, and software components, including a firmware device 116, a number of executable modules 122, a number of user interface devices 150 (e.g., a touchscreen, keyboard, virtual keypad, microphone, etc.), one or more sensors 152 (e.g., optical sensors, motion sensors, location sensors, global positioning system (GPS) receivers, digital cameras, and the like), controllers 154 (e.g., memory controllers, I/O controllers, network interface controllers, graphics controllers, etc.), other peripheral devices 156 (e.g., cameras, audio recorders, modems, data storage interfaces, displays, speakers, and other peripheral devices), the communication subsystem 158, a virtualization service 162, a power supply 164 (e.g., a battery and/or power management unit), one or more data storage devices 166, and one or more software module management services 172. Illustratively, integrity parameters 168 and purpose trust tokens 170 (described below) are embodied, at least temporarily, in the data storage device 166, however, it should be understood that other data components may at least temporarily reside in the data storage device 166, alternatively or in addition. The illustrative firmware device 116 is embodied as a persistent storage device such as a non-volatile or read-only memory device (e.g., NAND or NOR flash memory). In the illustrative embodiments, the firmware device 116 stores secure boot logic 118. The secure boot logic 118 includes the set of computer routines commonly known as, for example, the bootloader, Unified Extensible Firmware Interface (UEFI), or Basic Input/Output System (BIOS). The secure boot logic 118 enables the computing device/platform 100 to start its operation once electrical power to the device is switched on, or to restart its operation in response to a user command. In some embodiments (e.g., traditional system architectures), the secure boot logic 118 loads and starts an operating system and communicates with the various other components and devices that are coupled to the I/O subsystem 114. In the illustrative virtualized mobile device architecture, however, the secure boot logic 118 loads and starts the virtualization service 162 directly from the firmware device 116, independently of or prior to launching any operating systems. As used herein, "operating system" may refer to, among other things, traditional desktop or laptop operating systems, mobile device operating systems, network operating systems, real time operating systems (RTOS) (which may be used to control, for example, unmanned or "driverless" vehicles, safety critical systems, such as insulin pumps and other medical devices, and/or others.

In the illustrative computing platform depicted by FIG. 1, the modules 122 include shared, modular security services 130 and other shared, modular services 140 that, together with the virtualization service 162, form the trusted computing base (TCB). The shared security services 130 illustratively include an integrity verification subsystem 132, the component provisioning subsystem 134, a policy arbitration subsystem 136, and a domain manager subsystem 138. The shared security services 130 are described in more detail with reference to FIG. 2. The other shared services 140 include system-level services, such as device drivers, which are, in more traditional system architectures, typically provided by the operating system kernel. As used herein, "shared service" may refer to a firmware or software-based executable module that allows operating systems and other executable applications and processes to interface with the shared system resources of the computing device/platform 100, which may include, for example, physical or hardware resources such as one or more of the processors 110, memory 112, memory 124, I/O subsystem 114, and/or any of the devices and components that are coupled to the I/O subsystem 114, whether such components are coupled directly (e.g., via bus) or over a network.

In the illustrative device/platform 100, the shared services 140 are virtualized at the module level, so that in a given virtualized execution environment of the computing device/platform 100, the shared services 140 each map to a corresponding system resource. For example, some of the shared services 140 may be embodied as device drivers that each map to a physical device driver for a different hardware component of the computing device/platform 100. By modularizing and isolating the shared services 140 independently of any particular component or domain, access to the shared resources of the computing device/platform 100 can be monitored, controlled and restricted at the module level. In general, the modules 122 are illustrated as such for discussion purposes, and such illustration is not intended to imply that any specific implementation details are required. For example, any of the modules 122 may be combined or divided into submodules, subprocesses, or other units of computer code or data as may be required by a particular design or implementation of the computing device/platform 100.

Domains and Components

In FIG. 1, the domain specifications 142 represent runtime specifications for individual, specially partitioned execution environments that can be executed by the virtualization service 162 during operation of the computing device/platform 100. As used herein, "domain" may be used to refer to, among other things, a machine-executable unit that can request access to one or more system resources, where such accesses can be controlled by the trusted computing base, e.g., by the policy arbitration subsystem 136. For example, some domains may be embodied as very small, specialized functional units. Additionally, each of the individual security services 250 and/or shared services 220 (FIG. 2) may be embodied as domains, in some cases. Other domains may be embodied as "user domains" through which a person, such as an end user, may interact with the computing device/platform 100. The domains 260, 270 (FIG. 2) are examples of user domains, as explained further below.

The domain specifications 142 for each domain specify one or more executable modules that are permitted to execute in the domain to request access to one or more shared system resources 210. For example, the domain specifications 142 for each user domain may specify user-level software 144 that is permitted to execute in the user domain. The user-level software 144 includes, for example, an operating system and one or more user-level software applications. Thus, with respect to the domain specifications 142, the term "modules 122" may refer to module or modules (e.g., the user-level software 144) that is associated with the domain specification 142 rather than the specification itself. Each domain specification 142 may define a different "purpose" or "personality" of the computing device/platform 100, as may be needed or desired, depending on the particular design, purpose, or usage context of the computing device/platform 100. Moreover, individual components within a domain may separately and/or independently establish different purposes that govern their operation and use in different contexts.

The domains 260, 270 are examples of components that may be provisioned by the component provisioning subsystem 134, 254, 850 for use on the computing device/platform 100 and/or computing system 800. Other examples of components include individual user-level or system-level software applications, firmware, hardware, and/or combinations thereof. In some embodiments, the component provisioning subsystem 134, 254, 850 manages component-specific purposes and associated rule sets during operation and use of the components on the computing device/platform 100, such that the individual components can operate without a priori knowledge of other components' purposes and/or policies/rule sets. In doing so, embodiments of the component provisioning subsystem 134, 254, 850 can manage individual component purposes without changing or adversely affecting the enforcement of the purposes of other components. As a result, each component's "purpose" can be enabled while the "anti-purpose" is reliably denied, independently of the purposes of other components of the device/platform 100. Moreover, some embodiments have the flexibility to enable the component-specific purposes and deny the corresponding anti-purposes in specific contexts as detected by a context aware platform. In these and other ways, it can be said that aspects of the disclosed component provisioning subsystem 134, 254, 850 can independently component provision and control the behavior and activities of specific components of a device without managing the entire device.

To address these issues, in some embodiments, the disclosed policy arbitration subsystem manages the policies of all executable components of the computing device, such that the individual components can operate without a priori knowledge of other components' policies. In doing so, embodiments of the disclosed policy arbitration subsystem can manage each domain's policy without changing or adversely affecting the enforcement of the policies of other domains. As a result, each domain's "purpose" can be enabled while the "anti-purpose" is reliably denied. Moreover, some embodiments have the flexibility to enable the purpose and deny the anti-purpose in specific contexts detected by a context aware platform, using a semi-dynamic policy arbitration suite as described in more detail below. In these and other ways, it can be said that aspects of the disclosed policy arbitration subsystem can independently control the behavior and activities of specific components of a device without managing the entire device.

Figure 16:
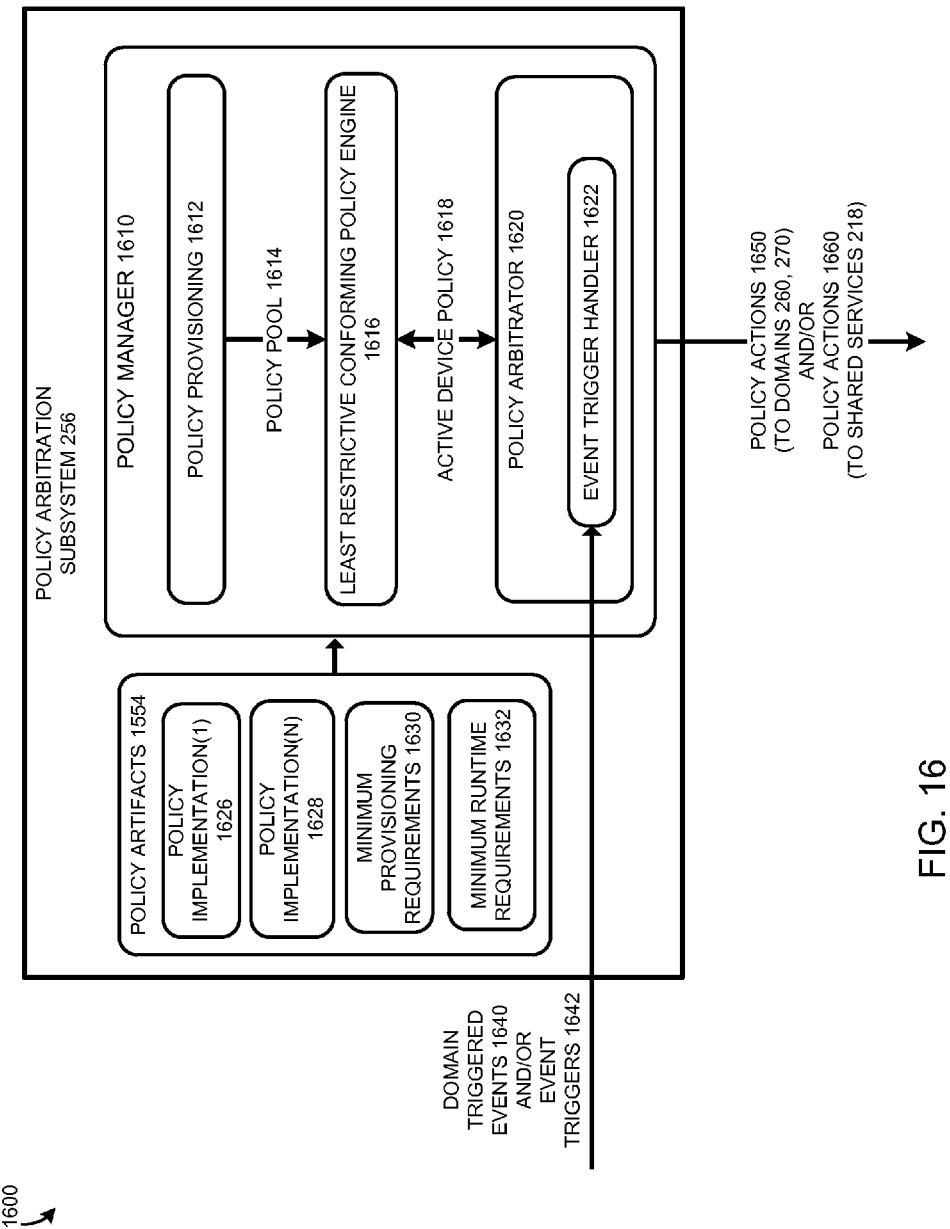
FIG. 16 is a simplified module diagram of at least one embodiment of a policy arbitration subsystem as disclosed herein.

Referring to FIG. 16, a policy manager 1610 of the disclosed policy arbitration subsystem 136, 256 is charged with executing and enforcing all of the disparate domain policies of all of the existing domains that are provisioned on the device during operation and use of the device. To do this, in some embodiments, the policy arbitration subsystem 136, 256 or more particularly the policy arbitrator 1620 acts as a supervisory or higher-privileged authority with respect to the domains, and the policy arbitration subsystem 136, 256 assumes that all of the domains that are provisioned on the device are peers to one another. In these embodiments, no domain's policy has a higher priority than any other domain's policy from the standpoint of the policy arbitration subsystem 136, 256, and it is the policy arbitration subsystem 136, 256's job to ensure that the domain-specific policies are properly reconciled and collectively enforced on the device.

In some embodiments, policy artifacts 1554, discussed below, are only known to the issuing domain and the policy arbitration subsystem 136, 256. That is, using the isolation strategies described herein, the domain-specific policies can be kept confidential from other domains. In some cases, the submission of a policy artifact 1554 by a domain 260, 270 to the policy arbitration subsystem 256 and the acceptance of the submitted policy by the policy arbitration subsystem 256 creates a form of a "social contract" or mutual agreement between the domain 260, 270 (and the corresponding set of respective stakeholders that created the policy artifact) and the policy arbitration subsystem 136, 256 that, in exchange for the assurance provided by the policy arbitration subsystem 136, 256 that the domain's policy will be reliably enforced in all relevant contexts, the domain 260, 270 cedes control of the enforcement of its policy to the policy arbitration subsystem 136, 256.

As described in more detail below, the trusted computing base, e.g., the policy arbitration subsystem 136, 256, alone or in combination with other subsystems of the trusted computing base, can adapt or extend "static" domain policies to a multiple-domain environment in which different domains 260, 270 execute independently of one another and execute independently of the policy arbitration subsystem 136, 256. In some cases, the domains 260, 270 may be configured and provisioned by different entities or "stakeholders" (e.g., outside agents such as application service providers or third-party MDM providers). As such, or for other reasons, each of the domains 260, 270 may have its own policy or set of policies that are applicable only to that particular domain and not to other domains. Thus, in many cases, each of the domains 260, 270 may be internally unaware of the policies of the other domains 260, 270 and may even be unaware of other domains 260, 270 that exist on the computing device/platform 100. Accordingly, the policy arbitration subsystem 256 acts as a mediator in that it resolves conflicts between domain-specific policies at the "global" device level, and controls access to the system resources 210 by the domains in accordance with the domain-specific policies as reconciled at the global, device level.

Isolation

Figure 2:
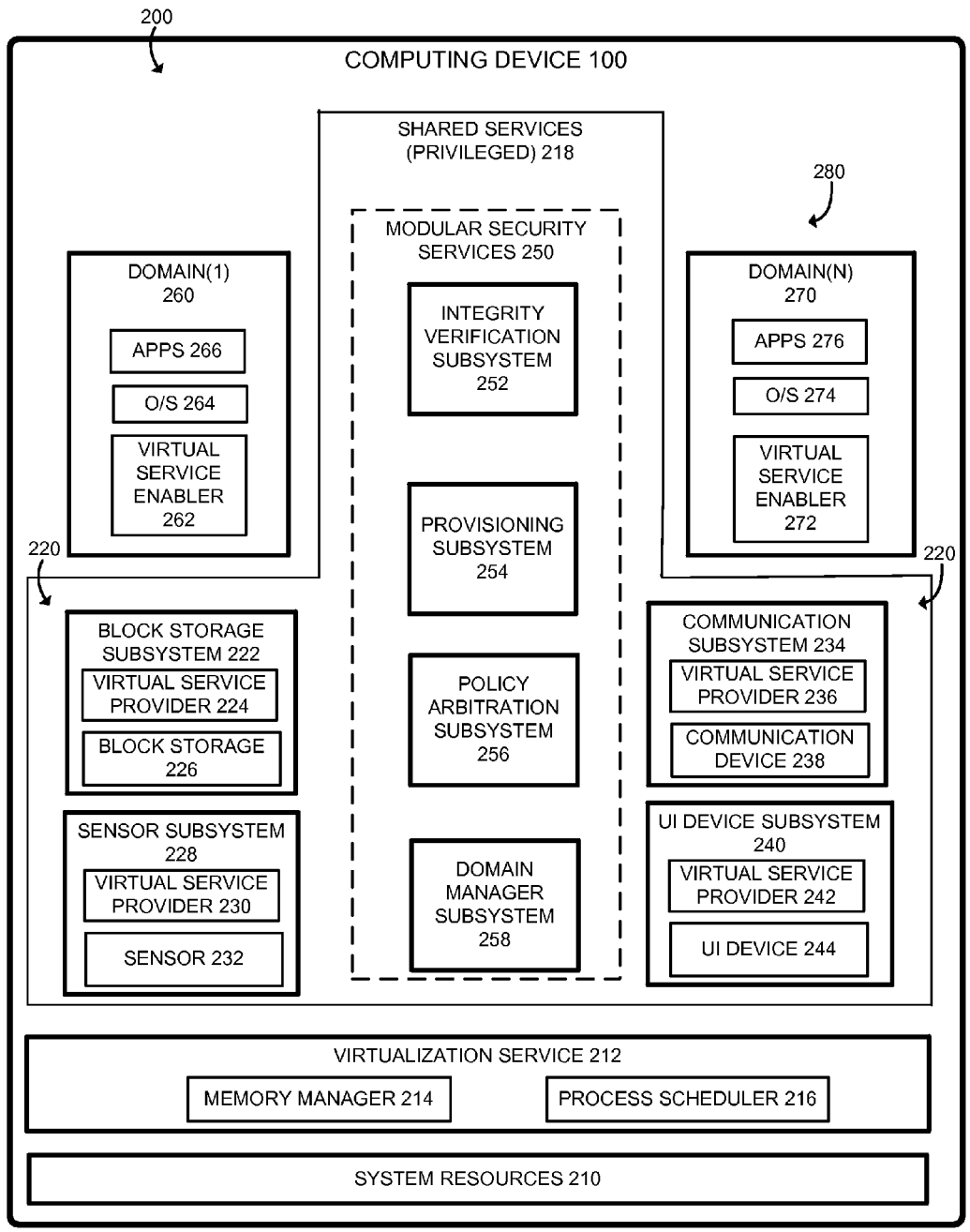
FIG. 2 is a simplified module diagram of at least one embodiment of a virtualized execution environment of the computing device of FIG. 1.

In the illustration of FIG. 2, the other shared services 220 include executing instances of a block storage subsystem 222, a sensor subsystem 228, a communication subsystem 234, and a user interface device subsystem 240. Other system services, such as audit services, encryption services, and/or many others, may be similarly modularized and virtualized, although not specifically shown. The illustrative shared services 218 are both memory-isolated and process-isolated from the domains (which, as illustrated, include at least a domain(1) 260 and a domain(N) 270). Additionally, the domains 260, 270 are both memory-isolated and process-isolated from each other and from the executing instances of the components 212, 218 of the trusted computing base. As such, the illustrative domains 260, 270 are independently executable and independently controllable by the trusted computing base 212, 218 or more specifically, by the virtualization service 212 interacting with the share security services 250 and with the other shared services 220. While only two domains are shown in the illustration, it should be understood that the computing device/platform 100 may support any number ("N") of domains 260, 270 according to the requirements of a particular design of the computing device/platform 100.

Virtualization

The illustrative virtualization service 162 is embodied as a type of hypervisor or separation kernel system (e.g., with paravirtualized guest operating systems or with hardware-based virtualization extensions), which is launched by the secure boot logic 118 directly from the firmware 116 rather than by another operating system. For example, the virtualization service 162 may be embodied as a "thin" hypervisor, which may refer to a type of hypervisor that is designed to be "small," in the sense that only the core functions that are needed to establish virtualization on the computing device/platform 100 are included in the hypervisor. For example, in the illustrative embodiment, many if not all of the shared services 130, 140 are not built into the hypervisor but operate at a level of abstraction above the hypervisor (e.g., as "middleware"). In some embodiments, some components of the shared services 130, 140 are built into the hypervisor (e.g., communication channels which allow the "secure" connection between two components/modules/domains).

In some embodiments, however, the virtualization service 162 may include a more traditional hypervisor, virtual machine manager (VMM), or similar virtualization platform. In some embodiments, the virtualization service 162 may be embodied as a "bare metal" hypervisor, which can execute directly from the system hardware (e.g., by a communication subsystem rather than the secure boot logic 118 or an operating system).

In general, the virtualization service 162 is embodied as a privileged software component that facilitates and manages the virtualization of the shared resources of the computing device/platform 100. In some embodiments, portions of the virtualization service 162 may be firmware-based rather than software-based. The virtualization service 162 allows the domains 260, 270 (FIG. 2) defined by the domain specifications 142 to execute concurrently or serially on the computing device/platform 100 in isolated, virtualized execution environments. To increase the strength of the social contract, or for other reasons, some embodiments may utilize a priority-based schedule to ensure triggers and other event-based policy control subsystems are processed first and/or exclusively, e.g., to reduce (or eliminate) the security vulnerability during the small gap between an event triggering and the resulting action to be performed.

As mentioned above, in the illustrative embodiments, the virtualization service 162 is launched directly by the secure boot logic 118 rather than by an operating system. In other embodiments (e.g., traditional system architectures), the virtualization service 162 may be launched by an operating system or by system hardware (e.g., a communication subsystem). In any case, the virtualization service 162 executes in a higher-privileged system mode of the computing device/platform 100, as opposed to a lesser-privileged mode. As such, in operation, the virtualization service 162 may have substantially full control of the system resources of the computing device/platform 100. Further, the other components of the trusted computing base (e.g., the shared security services 130 and the other shared services 140) may, when called upon by the virtualization service 162, also have substantially full control of one or more of the system resources of the computing device/platform 100 with which they are designed to communicate. That is, due to their modularity, the shared services 130, 140 may each be capable of controlling only a specific resource or a specific feature of a resource of the computing device/platform 100, in some embodiments. In some embodiments, the modularized control of the system resources by the trusted computing base 130, 140, 162 is aided by the use of well-defined communication channels, as described herein.

Referring now to FIG. 2, an embodiment of a modular, virtualized execution environment 200 that may be established on the computing device/platform 100 is shown. At runtime, an executing instance of the virtualization service 212 interfaces with the system resources 210 (e.g., processor (s) 114, memory 112, 124, I/O subsystem 114, and/or devices 116, 150, 152, 154, 156, 158, 166) through one or more submodules or subprocesses referred to herein as a memory manager 214 and a process scheduler 216 (which are also part of the trusted computing base). The memory manager 214 allocates virtual memory to each of the executing instances of the domains 260, 270 and shared services 218 that corresponds to their respective assigned physical memory (e.g., trusted protected memory 124), so as to implement and maintain the memory isolation technology described herein. The individual instances of the domains 260, 270 and shared services 218, and/or individual executing components thereof, may be referred to herein as "components" 280 for ease of discussion. The process scheduler 216 schedules and regulates communications between the components 280 and the virtualization service 212 over the well-defined communication channels as described herein, so as to implement and maintain the process isolation technology described herein.

Figure 3:
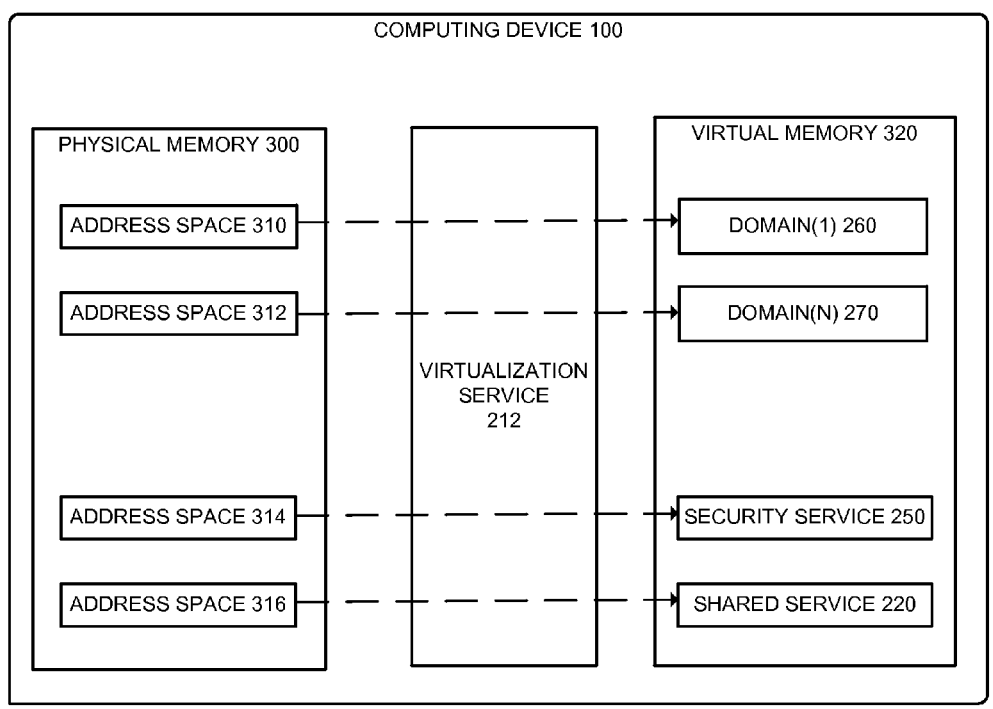
FIG. 3 is a simplified block diagram of a portion of the virtualized execution environment of FIG. 2, illustrating at least one embodiment of a memory isolation scheme as disclosed herein.

Referring now to FIG. 3, an embodiment of the memory isolation features of the illustrative device/platform 100 is shown. The computing device/platform 100 includes physical memory 300 (e.g., trusted protected memory 124) which is abstracted to virtual memory 320 by the virtualization service 162. The physical memory 300 includes a number of physical address spaces 310, 312, 314, 316. When the physical memory resources are virtualized by the virtualization service 212 (in conjunction with a modular shared service 220, in some embodiments), the components 280 are each mapped to separate, isolated portions of the physical memory 300. The assignment of physical memory address spaces to components 280 (e.g., shared services 220, security services 250, domains 260, 270) and the assignment of security labels to memory addresses may be performed at the time that the computing device/platform 100 is created and provisioned (e.g., by an original equipment manufacturer, OEM, or dynamically created, e.g., via a Trusted Platform Management (TPM)), for example. In some embodiments, unique security labels may be associated with each of the memory addresses to facilitate the security features provided by the security services 250. For example, the policy arbitration subsystem 256 may use such security labels to determine whether to permit a domain 260, 270 to perform a read or write memory access to a portion of the physical memory 300.

Figure 4:
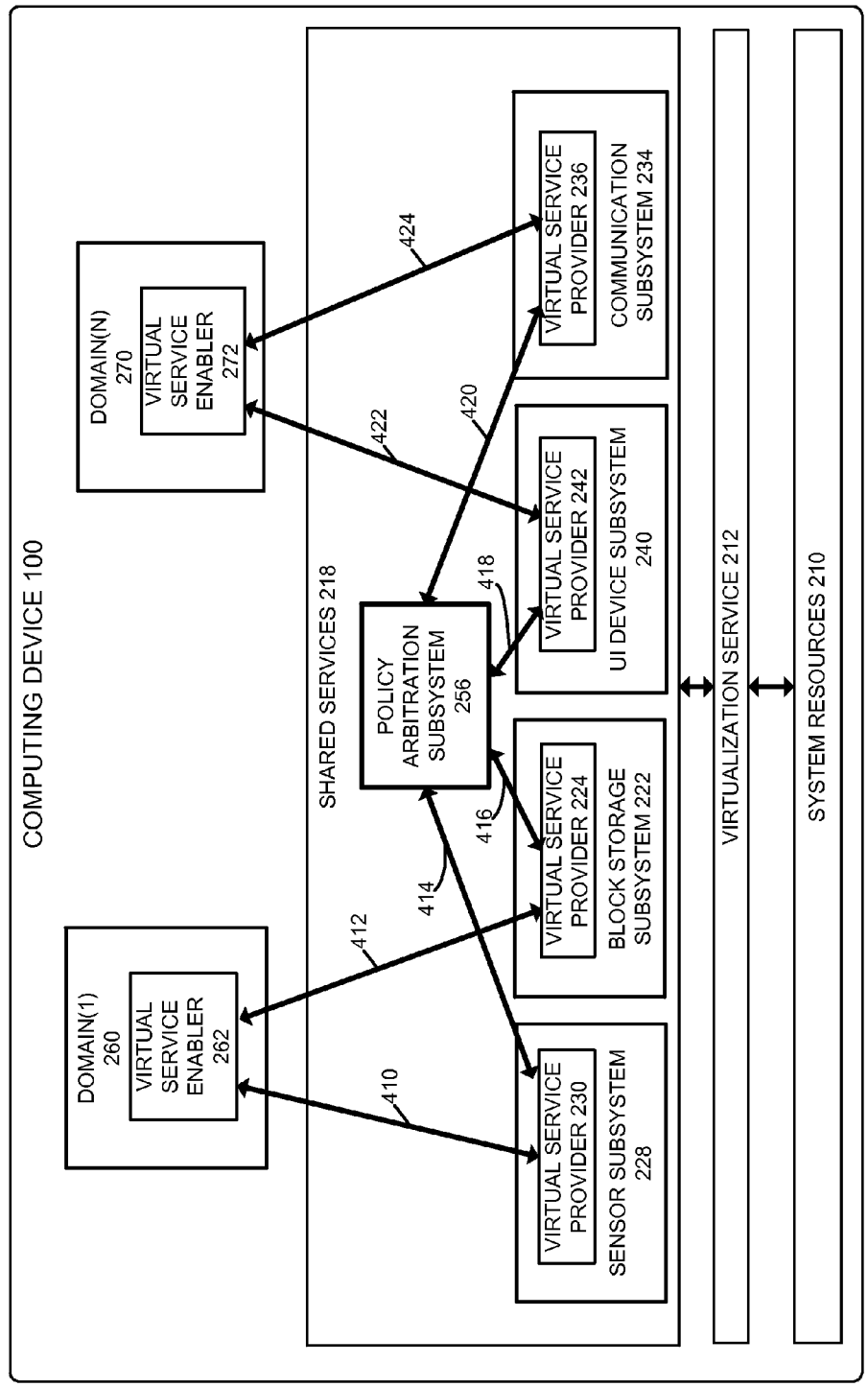
FIG. 4 is a simplified module diagram of an illustrative portion of the virtualized execution environment of FIG. 2, illustrating at least one embodiment of an information flow control scheme as disclosed herein.

Referring now to FIG. 4, a simplified example of the process isolation or "information flow" isolation features of the illustrative device/platform 100 is shown. FIG. 4 illustrates a MILS-based embodiment comprising architectural components (e.g., components 210, 212, 222, 228, 234, 240, 260, 270), and explicitly defined interactions between the components (e.g., arrows 410, 412, 414, 416, 418, 420, 422, 424, 426, 428), where the presence or absence of an arrow is significant (e.g., the absence of an arrow indicates the absence of a communication channel). The bidirectional arrows 410, 412, 414, 416, 418, 420, 422, 424, 426, 428 each represent a well-defined communication channel that may be unidirectional for some domains 260, 270 or shared services 218 and bidirectional for other domains 260, 270 or shared services 218, depending upon the applicable security policy. As used herein, "well-defined" refers to a communication channel (e.g., any suitable type of wired, wireless, or logical signal path) that only has two possible endpoints (e.g., a source and destination or vice versa) and cannot be modified by any domains 260, 270 or shared services 220. For instance, in some embodiments, hardware restrictions may be provided by a computing device's original hardware design (e.g., an I2C bus layout or intra-bus connects within an SoC). In the context of software virtualization of a communication bus, a privileged controller (e.g., a hypervisor supervising single-service access to an approved hardware resource) can restrict access to a communication channel by different "users" (e.g., domains 260, services 218), rather than designing the device hardware to include additional buses for each special purpose channel (e.g., lx physical bus per virtualized service). In other words, the well-defined communication channels may be embodied as, for example, hypervisor-supervised secure multiplexed communications over a single bus/physical transport or as multiple independent buses that each ensure singleton security.

Thus, in the embodiment of FIG. 4, each of the domains 260, 270 can only access the system resources 210 through the respective defined communication channels 410, 412, 414, 416, 418, 420, 422, 424, 426, 428 and can only do so through the virtualization service 212 and shared services 218. However, the arrangement shown in FIG. 4 is by no means the only possible arrangement of communication channels. For example, in other embodiments, the domains 260, 270 may communicate with the shared services 220 through the policy arbitration subsystem 256 (e.g., communications may be monitored by the policy arbitration subsystem 256 for policy compliance). Further, it should be understood that similar communication channels exist between components of the modular security services 250 and other shared services 218, even though not explicitly shown in the drawings.

Unique security labels may be programmatically associated with each of the well-defined communication channels so that the components of the trusted computing base can monitor communications that are sent between the different components 280 (e.g., domains 260, 270 and shared services 218) of the computing device/platform 100. For instance, the policy arbitration subsystem 256 can mediate the communications that occur over the channels 410, 412, 414, 416, 418, 420, 422, 424, 426, 428 according to applicable policies, in accordance with the requirements of the computing device/platform 100. The assignment of communication channels to the components 280 and the assignment of security labels to communication channels may be performed at the time that the computing device/platform 100 is designed and/or provisioned (e.g., by an original equipment manufacturer or OEM). For example, the communication channels may be established at or around the time that the memory partitions for the domains 260, 270 and shared services 218 are created.

Some embodiments of the illustrative device/platform 100 are modularized in the sense that at runtime, each of the running instances of the domains defined by the domain specifications 142, as well as the components of the trusted computing base 130, 140, 162, are both memory-isolated (e.g., data separation) and process-isolated (e.g., information flow control) from one another. To do this, as illustrated by FIG. 3, at installation time, the shared services 220, shared security services 250, domains 260, 270, and the virtualization service 212 are each allocated and assigned to their own address space in physical memory (e.g., block storage). Further, as illustrated by FIG. 4 and described below, only well-defined (e.g., by static firmware-enforced or physical hardware restrictions) communication channels exist between the modules 122 and the virtualization service 212, so that module communications can be tightly controlled according to the requirements of the current configuration of the computing device/platform 100. As such, in some embodiments, the modular, virtualized architecture described herein represents an application of certain aspects of the MILS architecture mentioned above.

Virtualization Subsystems

The illustrative data storage device 166 is embodied as persistent physical storage, e.g. as a block device, which can read and write data in blocks having a fixed or nominal size (e.g., 512 bytes or a multiple thereof). As such, the data storage 166 may include one or more hard drives, optical drives (e.g., CD- or DVD-ROM), compact flash memory (e.g., memory sticks or memory cards), and/or other such devices.

In some embodiments, the integrity parameters 168 used by the secure boot logic 118 and/or other modules 122 are stored, at least temporarily, in the data storage 166. In some embodiments, portions of the security keys 120, the virtualization service 162 and/or the modules 122 may reside at least temporarily in the data storage 166, as well. Portions of the security keys 120, any of the modules 122, the virtualization service 162, and/or the integrity parameters 168 may be copied to the memory 112 during operation of the computing device/platform 100, for faster processing or other reasons.

As noted above, the communication subsystem 158 may communicatively couple the computing device/platform 100 to other computing devices and/or systems by, for example, a cellular network, a local area network, wide area network (e.g., Wi-Fi), personal cloud, virtual personal network (e.g., VPN), enterprise cloud, public cloud, Ethernet, and/or public network such as the Internet. For instance, any or all of the various subsystems of the trusted computing base may be used in the context of "cloud" virtualized services, in some embodiments. The communication subsystem 158 may, alternatively or in addition, enable shorter-range wireless communications between the computing device/platform 100 and other computing devices, using, for example, BLUETOOTH and/or Near Field Communication (NFC) technology. Accordingly, the communication subsystem 158 may include one or more optical, wired and/or wireless network interface subsystems, cards, adapters, or other devices, as may be needed pursuant to the specifications and/or design of the particular computing device/platform 100.

As shown in FIG. 1, the illustrative communication subsystem 158 includes one or more telephony subsystems 160, which enable the computing device/platform 100 to provide telecommunications services (e.g., via the baseband processor 126). The telephony subsystem(s) 160 generally include a longer-range wireless transceiver, such as a radio frequency (RF) transceiver, and other associated hardware (e.g., amplifiers, etc.). To provide voice communication services, the telephony subsystem 160 may include an audio subsystem, which may include, for example, an audio CODEC, one or more microphones, and one or more speakers and headphone jacks. In some embodiments, other wireless communication subsystems (e.g., Ethernet, BLUETOOTH, wireless LAN (WLAN), etc.) and/or other services (e.g., GPS) may interface with the baseband processor 126 alternatively or in addition to the applications processor 128.

The computing device/platform 100 may include other components, sub-components, and devices not illustrated in FIG. 1 for clarity of the description. In general, the components of the computing device/platform 100 are communicatively coupled as shown in FIG. 1 by electronic signal paths, which may be embodied as any type of wired or wireless signal paths capable of facilitating communication between the respective devices and components.

The software module management service(s) 168 may include, for example, third-party platform management services (e.g., MDM services) or similar services that may be in communication with the computing device/platform 100 over a network or a variety of different types of networks and communication media, via the communication subsystem 158. Such services 172 may be used to, for example, develop, manage, and implement security policies for the computing device/platform 100, such as enterprise security policies or mobile device BYOD (bring your own device) policies.

The illustrative domain manager subsystem 258 represents an executing instance of the domain manager subsystem 138, which defines rules and specifications for, and in operation (258) controls and manages, the initialization, execution, activation, and deactivation of the domains 260, 270 globally, e.g., at the computing device level. An illustrative example of the domain manager subsystem 258 is described in more detail in the aforementioned related application, Saidi et al., U.S. application Ser. No. 14/052,169.

The domain manager subsystem 258 can switch operation of the computing device/platform 100 from a highly sensitive domain (e.g., an enterprise domain) to a less-sensitive domain (e.g., a personal/social use domain), or vice versa, in response to a triggering event (e.g., dynamically, or in real time). Such a triggering event may include, for example, the receipt of user input such as tactile or speech input, a gesture, a specific software command, or a user name and password. The detection of certain inputs from one or more of the sensors 152 may also act as a triggering event. For example, if the computing device/platform 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing device/platform 100.

Shared Services

Using these technologies, the virtualization service 212 in conjunction with the shared services 218 controls the use and sharing of the various system resources 210 by the domains 260, 270, according to the security policies or requirements of the computing device/platform 100. For instance, the trusted computing base 212, 218 can mediate software module communications so that the system resources 210 may each be accessed and used by only one of the domains 260, 270 at any given time. As an example, if the user of the computing device/platform 100 is operating in an "enterprise" user domain and the user is a lawyer recording a deposition or a police officer videotaping a crime scene, the trusted computing base 212, 218 can ensure that, while the enterprise domain is using the device's camera, the camera cannot be accessed by the user's "personal" user domain, e.g., to take pictures or video.

Virtualized software services may be provided by any virtual service provider 224, 230, 236, 242, such as those to which the policy arbitration subsystem 256 can control access, including local software or hardware services (e.g., encryption services, network access, touchscreen display, audio input or output, etc.). At runtime, the virtualization service 212 communicates with the virtual service provider modules 224, 230, 236, 242 that are embedded in the shared services 220, and the virtual service enabler modules 262, 272 that are embedded in the domains 260, 270, respectively. The virtual service providers 224, 230, 236, 242 translate and map the virtualized operations of their respective shared service 220 to its physical counterparts, in order to provide access to a corresponding system resource 210 to, e.g., a domain 260, 270. Similarly, the virtual service enablers 262, 272 translate and map the virtualized operations of their respective domains 260, 270, to enable the domains 260, 270 to utilize (or "consume") system resources to which access is provided by the service providers 224, 230, 236, 242. Together, the virtualization service 212, the modularized virtual service providers 224, 230, 236, 242, and the modularized virtual service enablers 262, 272 provide a level of abstraction between the components 280 (e.g., each of the domains 260, 270 and the shared services 218) and the system resources 210. In other words, the virtualization service 212, the virtual service providers 230, 242, and the virtual service enablers 262, 272 provide (e.g., hardware) abstractions of some or all of the system resources 210, for each of the domains 260, 270 and the shared services 218. As shown by FIG. 4 and described in more detail below, the policy arbitration subsystem 256, alone or in conjunction with other modular security services 250, oversees the communications between the virtual service providers 230, 242, the virtual service enablers 262, 272, and the system resources 210 through the virtualization service 212.

In the example execution environment of FIG. 2, the trusted computing base, which generally operates in the privileged mode of the computing device/platform 100, includes the executing instance of the virtualization service 212 and the executing instances of the shared services 218. In some embodiments, the privileged shared services 218 are implemented as middleware that interfaces with the virtualization service 212 to control and manage the execution of the various domains 260, 270. The shared services 218 include the executing instances of the modular shared security services 250 and the other shared services 220.

The other shared services 220 communicate with the virtualization service 212 through a respective virtual service provider 224, 230, 236, 242 to provide their respective hardware abstractions in a modular way. For instance, the block storage subsystem 222 virtualizes the I/O communications with block storage devices 226 (such as the firmware 116 or data storage 166). The block storage subsystem 222 thereby acts as a virtual device driver service that can be called upon by other modules of the trusted computing base or by the domains 260, 270, through the virtualization service 212, to move data out of block storage and into random access memory or vice versa. As an example, the integrity verification subsystem 252 may, through the virtualization service 212, communicate with the block storage subsystem 222 to obtain one or more of the integrity parameters 168.

The sensor subsystem 228, the communication subsystem 234 and the user interface device subsystem 240 operate similarly, in that they provide access to their respective system resources 232, 238, 244 through modularized abstractions (e.g., virtual drivers). For example, the domain manager subsystem 258 may obtain sensor data from the sensor subsystem 228 through its interface with the virtualization service 212 and the virtual service provider 230. As another example, the integrity verification subsystem 252 may send integrity data (e.g., an indication of whether a particular software module 122/280 passed or failed an integrity check) to a mobile device management system by interfacing with the virtualization service 212 and the virtual service provider 236. Through this modularization of the system architecture and the isolation techniques described herein, embodiments of the computing device/platform 100 can confine security issues to the components 280 and/or system resources 210 that may be affected.

In the illustrative execution environment 200, the domains 260, 270 are embodied as user domains that execute as "guests" of the virtualization service 212. That is, the user domains 260, 270 execute in a lower-privileged mode as to not be able to bypass or reconfigure the memory or process isolation provided by the virtualization service 212. As a result, the domains 260, 270 are lesser-privileged execution environments than that provided by the higher-privileged virtualization service 212. The operating systems 264, 274 and software applications 266, 276 executing in each of the domains 260, 270 may be the same or different. For instance, in some embodiments, the domain 260 may execute the ANDROID operating system while the domain 270 may execute the QNX operating system, or the domains 260, 270 may execute different versions of the same operating system. As another example, the domain 260 may execute a self-contained e-mail program and a web browser without a typical operating system, while the domain 270 may execute an electronic medical records system but not e-mail or web browser applications.

The illustrative security services 250 operate independently but in conjunction with one another and with the other shared services 220 and the virtualization service 212, to provide security features for the various domains 260, 270 running on the computing device/platform 100. For instance, the integrity verification subsystem 252 may be called upon by the virtualization service 212 to check the integrity of a module or component of the computing device/platform 100, e.g., at load time or at run time, and/or in response to a triggering event. An illustrative example of the integrity verification subsystem 252 is described in the aforementioned Oberg et al., U.S. patent application Ser. No. 13/872,865.

The illustrative provisioning subsystem 254 represents an executing instance of the component provisioning subsystem 134, 850, which defines, verifies, and maintains the component configuration for the device and each of the individual domains 260, 270, according to component-specific purposes. An illustrative example of the component provisioning subsystem 254 is described in more detail below with reference to FIGS. 5-12.

The illustrative policy arbitration subsystem 256 represents an executing instance of the policy arbitration subsystem 136, which, among other things, defines the protocols for, and in operation (256), regulates the electronic communications between the domains 260, 270 and the virtualization service 212. The policy arbitration subsystem 256, alone or in combination with one or more of the shared services 218, mediates these communications in accordance with security policies that may be specifically applicable to the individual domains 260, 270. An illustrative example of the policy arbitration subsystem 256 is described in the aforementioned Forsberg et al., U.S. patent application Ser. No. 14/052,080.

The methods and processes disclosed herein and illustrated in the drawings are simplified for discussion purposes, but it should be understood that the device/platform 100 and/or the computing system 800 may undertake any of the disclosed methods or processes concurrently or in parallel, e.g., for each of the executing domains 260, 270. For example, the device/platform 100 and/or the computing system 800 may perform an analysis of any policy artifacts 1554, domain triggered events 1640 and/or event triggers 1642 that it receives from any or all of the domains 260, 270, in whatever order or sequence they may occur.

In some embodiments, communication channels similar to those shown in FIG. 4, described above, are defined between the domains 260, 270 and the component provisioning subsystem 254 so that communications such as various event triggers can only be sent from the domains 260, 270 to the trusted computing base or subsystems thereof over the defined communication channels, and the triggers cannot be sent from the domains 260, 270 directly to any of the system resources 210 (that is, without going through the trusted computing base). In this way, the configuration of communication channels enables the subsystems of the trusted computing base to act as intermediaries to, for example prevent event triggers, which may have been initiated by potentially untrusted (or assumed untrusted) domains 260, 270, from reaching the system resources 210 without the proper vetting (which may be performed by the component provisioning subsystem 254 and/or other components of the trusted computing base).

Beyond Virtualization

Portions of this disclosure describe embodiments that are adapted for use on a mobile computing platform that has a modular, virtualized system architecture. Some embodiments of modular, virtualized mobile computing platforms can be configured with multiple user-level execution environments, each of which may be tailored for a different use or application of the mobile device. A mobile platform designed with such an architecture can, for example, address security issues that commonly arise when personal mobile devices are used for business purposes or vice versa. Nonetheless, it should be appreciated that the disclosed approach is not limited to virtualized mobile platforms; rather, aspects of the disclosed approach can be used in traditional and/or virtualized platforms to, for example, extend a static, global policy to a more flexible implementation in which multiple independent and potentially conflicting component-specific policies can be mitigated using a variety of techniques.

Integrity Verification

Figure 5:
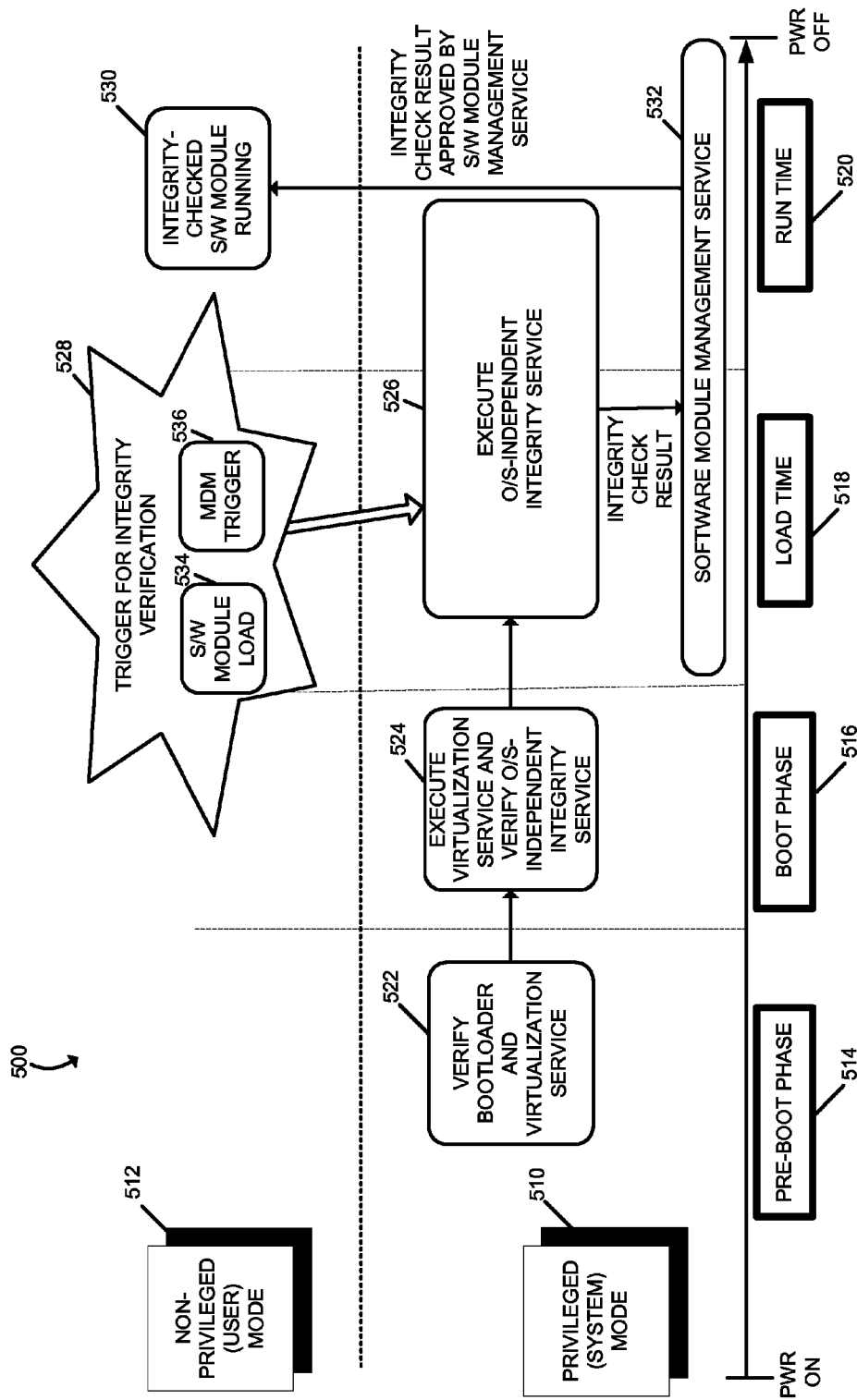
FIG. 5 is a simplified flow diagram of at least one embodiment of a process for launching the integrity verification subsystem of FIG. 1.

Referring now to FIG. 5, an embodiment of an integrity verification process 500 for the computing device/platform 100 is shown. As discussed above, embodiments of the computing device/platform 100 have a privileged or system mode 510 and a non-privileged or user mode 512. At least the secure boot logic 118 executes in the privileged mode 510. In the illustrative embodiments, the virtualization service 212 and the shared services 218 also execute in the privileged mode, while the user domains 260, 270 execute in the non-privileged mode 512. Illustratively, the operation of the computing device/platform 100 is divided into phases: a pre-boot phase 514, a boot phase 516, a load time phase 518, and a run time phase 520.

The pre-boot phase 514 occurs just after the computing device/platform 100 is powered on, and is executed by the processor 110. The integrity of the secure boot logic 118 (which may be embodied as a chain of "bootloaders," where each bootloader stage verifies a subsequent link) is verified during the pre-boot phase 514, as shown by step 522. To do this, the processor 110 may use a security key 120 to verify a digital signature of the next stage boot image. For example, a public key stored in SoC ROM may used to verify the digital signature of a subsequent boot image, where the digital signature has been previously generated by the corresponding private key). As used herein, "boot image" refers generally to a computer file that contains the system components that are needed in order for the processor 110 to boot the computing device/platform 100. For example, the secure boot logic 118 and/or portions of the virtualization service 162 and shared services 130, 140 may be part of the boot image, in some embodiments.

The boot image may be created and written to the firmware device 116 at the time that the computing device/platform 100 is made or provisioned (e.g., by an OEM). The security key 120 may be a public key of a digital signature scheme that is also written into the firmware device 116 by the manufacturer of the SoC or the computing device/platform 100, or another certifying authority. As used herein, "digital signature" refers to a mathematical scheme that can be used to demonstrate the authenticity of a computer file. In general, a signing algorithm is used to create the digital signature based on the computer file and a private security key (which should be kept secret by the certifying authority). A verifying algorithm can then be used to verify the digital signature based on the digital signature and a public key. Some examples of digital signature schemes include the RSA (Rivest-Shamir-Adleman) algorithm and hash trees (tree data structures in which each non-leaf node is labeled with the hash of the labels of its child nodes).

A hash of the boot image, rather than the boot image, itself, may be used as input to the signing algorithm, to create the digital signature. For example, the OEM or other certifying authority may generate a hash tree of the known, good boot image (where each "leaf" of the hash tree includes a hash of a block of the boot image), and then digitally sign the hash tree. Any suitable hash algorithm, including cryptographic hash functions like SHA-1, MD5, SHA-* (e.g., SHA-256 and SHA-512), or other secure hash algorithms, may be used to generate the hash tree for the boot image.

The digitally signed hash tree can be used to verify that the boot image was created by a known party, and that the boot image has not been altered since its original creation. The processor 110 can thus verify the authenticity of the secure boot logic 118 using the public key 120 and the verifying algorithm of the digital signature scheme. The processor 110 can verify the integrity of the secure boot logic 118 by comparing the hash of the secure boot logic 118 (or one or more blocks thereof) to the corresponding value(s) in the hash tree. Any difference between the known good version of the boot image and the current version of the boot image will cause the corresponding hash values to differ, and will thus cause the comparison to fail. If the integrity of the secure boot logic 118 is confirmed, the processor 110 executes the secure boot logic 118.

The secure boot logic 118 verifies the integrity of the virtualization service 162 in a similar way. That is, the secure boot logic 118 compares a hash value generated from one or more blocks of the virtualization service 162 to the corresponding hash value in the hash tree of the verified boot image. If the secure boot logic 118 is able to successfully verify the integrity of the virtualization service 162, the secure boot logic 118 starts up the virtualization service 162, thereby initiating the boot phase 516 of the computing device/platform 100. If the integrity check of either the secure boot logic 118 or the virtualization service 162 fails, the computing device/platform 100 will not boot successfully.

Once verified and booted, the executing instance 212 of the virtualization service 162 performs an integrity check of the integrity verification subsystem 132 in a similar way, at step 524. That is, the virtualization service 162 hashes or obtains a hash value for one or more blocks of the integrity verification subsystem 132 and compares the current hash values to the trusted hash values stored in the corresponding leafs of the hash tree of the verified boot image. Alternatively or in addition, a modular service such as the block storage subsystem 222 may compute the current hash values of one or more blocks of the integrity verification service 132 as the blocks are loaded from persistent storage into memory 112, and provide the current hash values to the integrity verification subsystem 132.

If the integrity check of the integrity verification subsystem 132 fails, the virtualization service 162 may respond in accordance with the applicable security policy. For example, the virtualization service 162 may display a message on a user interface device 150 (e.g., a display) of the computing device/platform 100 to inform the user that the integrity check failed and ask if the user wishes to continue booting the computing device/platform 100. As another example, the virtualization service 162 may continue booting the device/platform 100 but allow only certain domains 260, 270 or portions thereof to boot (e.g., domains or applications executable therein that are not considered essential to the security of the computing device/platform 100).

If the integrity check of the integrity verification service 132 is successful, the integrity verification service 132 may be launched by the virtualization service 162. Depending on the applicable security policy for the device/platform 100 and/or the domains 260, 270, the integrity verification service 132 may perform an integrity check each time a software module is loaded into memory, or may perform integrity checks only for certain software modules or types of software modules, or may perform integrity checks in response to certain triggering events, either during load-time or run-time of a software module. For instance, the loading of a software module from persistent storage into memory 112 may act as a triggering event (step 534), in some cases. In some embodiments, a message received by the virtualization service 162 from a mobile device management service or other software module management service (step 536) may trigger an integrity check. For example, the computing device/platform 100 may receive a mobile device management command from a mobile device management service and initiate an integrity check in response to such command. During run-time, certain system-level commands executed by the software module may trigger an integrity check. As an example, if a software module attempts to send data off of the mobile computing device or access a suspicious web site, such activity may trigger an integrity check.

The integrity verification service 132 performs the integrity checks in a similar manner as described above and in more detail below with reference to FIG. 6. The integrity verification service 132 may report the results of its integrity checks to, for example, one or more of the software module management services 172 (step 532). Such services 172 may include, for example, third-party mobile device management services and/or similar services. In some embodiments, software module management services 172 may be embodied as portions of the virtualization service 162 and/or other services of the trusted computing base of the computing device/platform 100. In any case, a software module management service 172 may determine how to respond to the results of the integrity check and provide instructions to the virtualization service 162 or the integrity verification subsystem 132, accordingly. In other embodiments, the integrity verification service 132 itself may contain such logic. For instance, either the integrity verification service 132 or the software module management service 172 may initiate the execution of an integrity-checked software module (step 530), if the integrity check is successful or in some cases, even if the integrity check is not successful. For example, depending upon the applicable security policy, some software modules may be approved for execution even if their integrity check is unsuccessful. If it is determined (e.g., by the integrity verification service 132 or the software module management service 172) that the integrity check failed and the software module should not be executed, the integrity verification service 132 may (in conjunction with the user interface device subsystem 240, in some embodiments) inform the user by presenting a message on a user interface device 150, fail to complete the load of the software module, or take some other action consistent with the applicable security policy.

Figure 6:
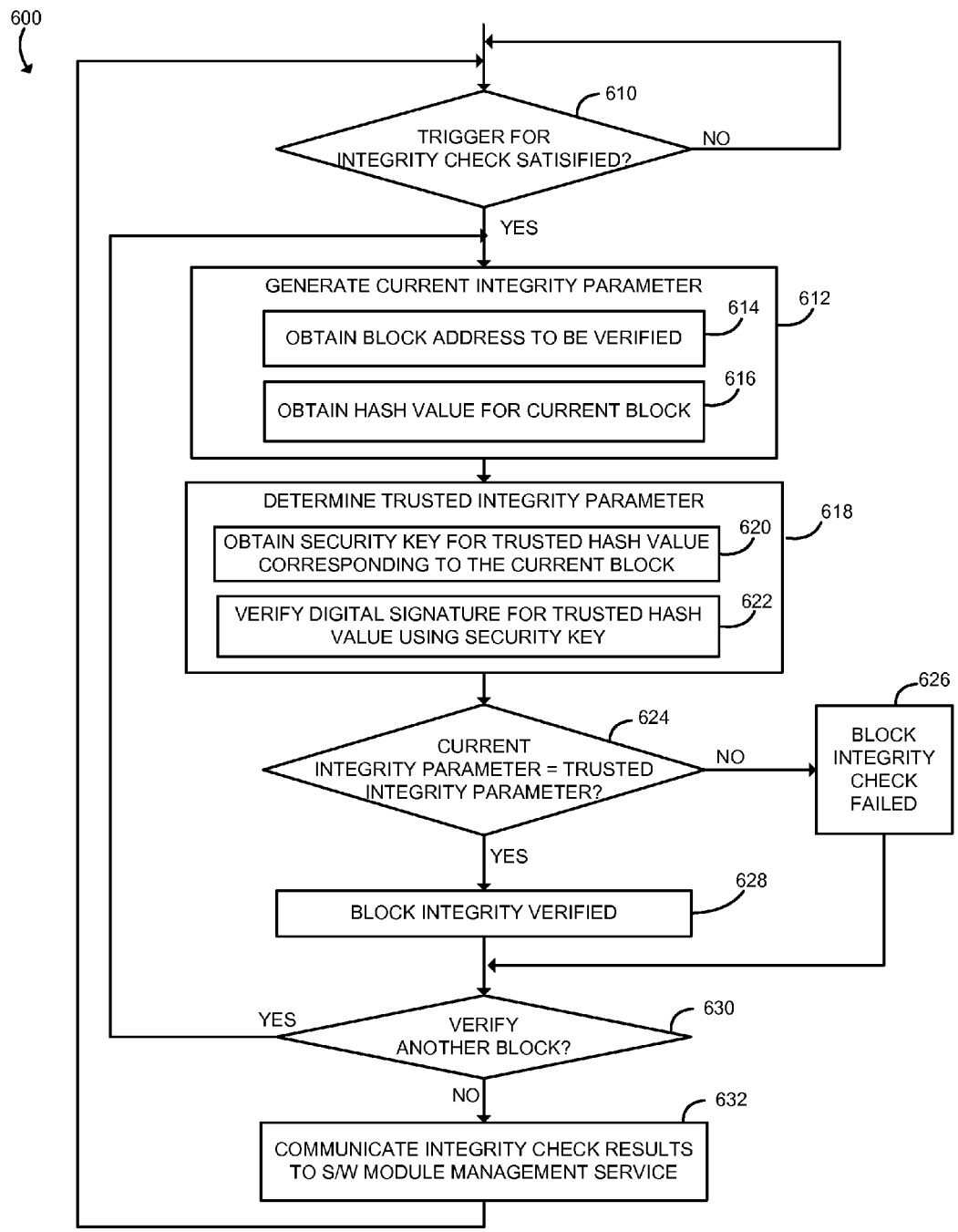
FIG. 6 is a simplified flow diagram of at least one embodiment of a method for integrity verification.

Referring now to FIG. 6, an illustrative method 600 for verifying the integrity of a software module is shown. The method 600 may be embodied as computerized programs, routines, logic and/or instructions, which may be executed by the computing device/platform 100, e.g., by the integrity verification subsystem 132, 252. At step 610, the method 600 monitors the execution environments of the computing device/platform 100 (e.g., the domains 260, 270) for an event in response to which integrity verification is to be initiated. As discussed above, the triggering event may include, for example, the loading of a software module or a specific type of software module into random access memory for execution, the receipt of a message or command from a software module management service 172, or another type of triggering event. In this way, fine-granularity integrity verification can be provided. That is, the method 600 can be selectively executed by the virtualization service 162 or the integrity verification subsystem 132, 252. For example, in some embodiments, the method 600 may be executed only for selected security-critical software components of the computing device/platform 100, or only for certain software components of a particular domain 260, 270.

If the computing device/platform 100 detects a triggering event, the method 600 generates a current integrity parameter at step 612. The current integrity parameter is generated or derived from the software module that is the subject of the integrity check. For instance, the current integrity parameter may include a hash value that is computed by applying a hash algorithm to one or more blocks of the software module to be verified. To do this, the block(s) of the software module are used as input to a hash function, and the resulting hash value(s) are used as the current integrity parameter. The hash function may be any of the cryptographic hash algorithms mentioned above, or another type of hash function. In more detail, at step 614, a block address of a portion of the software module stored in a block device is obtained from, e.g., the virtualization service 212 or the block storage subsystem 222. At step 616, the method 600 obtains the hash value that corresponds to the block address obtained at step 614. In some embodiments, the method 600 may simply obtain the hash value from the block storage subsystem 222. The obtained hash value may be calculated when requested by the integrity verification subsystem 252 (e.g., "on the fly"), or calculated opportunistically and cached when the block is read from persistent storage. Further, highly optimized hardware that provides persistent block storage may calculate and store hashes so that negligible computational overhead is incurred. In other embodiments, the method 600 may read the portion of the software module stored at the block address into memory and compute the hash value at that time.

At step 618, the method 600 determines the trusted integrity parameter that corresponds to the same block of the software module as is used to determine the current integrity parameter at step 612. If the software module being integrity-checked is part of the boot image, the trusted integrity parameter may be determined from the hash tree of the boot image, which is trusted due to its earlier integrity verification, as described above with reference to step 522 of FIG. 5. In some embodiments, the trusted integrity parameter may be a digitally signed hash value that is created by the developer of the software module or another trusted party. In that case, the signed hash value may be appended to the software file during transmission or download. The method 600 may verify the digital signature associated with the hash value using, for example, a public key provided to the computing device/platform 100 at some earlier time by the software developer or another trusted party, such as a mobile device manager service 172. It should be appreciated from the foregoing discussion that the modular system architecture of the computing device/platform 100 allows different portions of the boot image to be signed by different trusted parties during the provisioning of the computing device/platform 100. Thus, the security key 120 may include a number of different security keys corresponding to the number of trusted parties providing components for the provisioning of the computing device/platform 100.

At step 624, the method 600 compares the current integrity parameter to the trusted integrity parameter to determine whether the current version of the software module, which is the subject of the current integrity check, is the same as the trusted version of the same software module, from which the trusted integrity parameter was generated. Of course, this comparison assumes that the same hash algorithm is used to both create the trusted integrity parameter in the first place and to compute the current integrity parameter at a later time. In some embodiments, the integrity parameters may be stored as binary hashes and compared for differences. In other embodiments, the integrity parameters may be stored as ASCII encoded strings and a conventional string comparison function may be used. If the method 600 determines that the integrity parameters do not match, the method may conclude that the integrity check failed at step 626 and proceed to step 630. If the method 600 determines that the integrity parameters match, the method 600 may conclude, at step 628, that the integrity check was successful and proceed to step 630.

At step 630, the method 600 determines whether to verify another block of the current version of the software module that is the subject of the integrity check. To do this, the method 600 may consult an applicable security policy and/or consider the software module type. For instance, the method 600 may perform integrity checks on multiple blocks of software modules that are considered important to the security of the computing device but only perform an integrity check on one or a small number of blocks for software modules that are considered less security-critical or less of a security risk. If the method 600 determines that an integrity check should be performed on another block of the software module being verified, the method 600 returns to step 612. In some embodiments, where multiple blocks are integrity checked, the hash values for the multiple blocks may be computed serially or in parallel and compared individually or as a set. Further, where multiple blocks are integrity-checked and not all of the blocks pass the integrity check, the method 600 may determine whether the software module passed or failed the integrity check based on an applicable security policy or set of security rules. At step 632, the method 600 communicates the integrity check results to the requesting process, e.g., a software module management service 172, and returns to step 610.

Example Usage Scenarios—Integrity Verification

Embodiments of the above-described integrity verification techniques can provide operating system independence and component-specific, event-driven or "on demand" integrity verification that has many potential applications. For example, some embodiments of the integrity verification service 132, 252 can be used by mobile device management services and other third parties for auditing purposes, particular since they may do so without requiring direct software read access. Additionally, using the foregoing approaches, security-critical software modules may be periodically integrity checked to, for example, detect sideloading or run-time compromise attacks. Some examples of such security-critical modules include, for example, software and firmware modules embedded in or installed on medical monitoring and sensing devices, health monitoring devices, unmanned vehicles and other remotely-controlled devices to control the operation of such devices, data acquisition by the devices, and/or other functions. Further, software modules may be periodically checked to determine whether a software upgrade or other modification is needed.

As another example, some versions of the integrity verification subsystem 132, 252 can be utilized by software application developers, or application providers, to check the integrity of their applications as a prerequisite or precondition to their distribution. For instance, application providers may require an integrity check prior to the release of digital media content or before enabling additional licensed features (e.g., prior to releasing content governed by digital rights management (DRM) or other sensitive content, or prior to unlocking advanced application capabilities or features). In some cases, applications providers may wish to bundle content, additional plug-ins, capabilities, features, or third-party content licenses with a version of the integrity verification subsystem 132, 252. A third party license agreement may restrict the usage of the content or features based on the agreement terms of use, and the integrity verification subsystem 132 may be used to enforce the contractual restrictions.

To further demonstrate this potential, consider a media content provider application that provides streaming of multiple levels of inexpensive, standard and premium content (some of which may be advertisement-subsidized, subject to basic retransmission/licensing, or subject to per-user view fees). The content provider may restrict the availability of certain features (e.g., high definition) unless various integrity assurances can be provided. As an example, an application may permit multiple different levels of content streaming that are conditioned upon the successful completion of integrity checks initiated by the integrity verification subsystem 132, 252. Some content may not be subject to any restrictions, but other content (e.g., premium or subscription-based content) may be only permitted to be streamed onto certain types of secure devices that have been updated with the latest patched software. In addition, the content provider may desire to audit the full software stack of the computing device on demand, if unusual streaming behavior is detected. Aspects of the integrity verification subsystem 132, 252 may be used for these and other purposes. For example, application providers may wish to bundle the integrity verification service 132, 252 with their application as a means to ensure that the application is operating in compliance with the applicable terms of service and within the terms of third party licensing agreements.

The illustrative integrity verification subsystem 132, 252, which operates outside of the control of the operating system or other service that is being inspected (to provide independent remote attestation), is by no means limited to benefitting only mobile applications. Embodiments of the subsystem 132, 252 can be integrated into virtualized personal computer or server farm operating systems (e.g., cloud-based computing services). The integrity verification subsystem 132, 252 can be used to detect when a node (e.g., a website host in a server farm/cloud) is compromised in a manner that alters content (e.g., by the injection of malware).

In a similar manner, any digital content, perhaps in the form of software/firmware upgrades and security patches, audio video media, etc., can be published and verified in a distributed cloud environment. In other words, versions of the integrity verification subsystem 132, 252 can be integrated with distributed and virtualized services, such as cloud networks. In such a scenario, the integrity subsystem 132, 252 may publish the existing and/or recently-generated integrity parameters to a cloud-based integrity service. The cloud-based integrity service (or more simply put, an authorized software agent or computer program) may perform integrity checks on content continually, e.g., wherever and whenever the content is replicated in the cloud. The integrity verification subsystem 132, 252 may be configured to receive notifications from the integrity service whenever specific types of content are created by the user (e.g., taking a picture, recording notes, etc.), or when a file download occurs, for example. The integrity verification subsystem 132, 252 may then generate or record the integrity parameters associated with the content (i.e., integrity parameters generated at content creation, or when the content is "shared"). If the integrity parameters are generated at the creation of the content, the integrity verification service 132, 252 may check to make sure that the content did not change between the time of creation and the share event. Further, when a user shares a piece of content, the integrity verification subsystem 132, 252 may be notified (e.g., by the content-sharing service), and in response to the notification, the integrity verification subsystem 132 may send the integrity parameters to an audit subsystem or relay the integrity parameters directly to interested consumers (e.g., a cloud-based content integrity parameter database that a cloud integrity subsystem uses to check the content stored on its cloud nodes).

An audit subsystem may publish specific integrity check results (e.g., TWEETS or RETWEETS) to a particular subscriber of the audit service. For instance, in a messaging system like TWITTER, an integrity check may be triggered in response to a TWEET or RETWEET of content, and the result of the integrity check may be published to a cloud-based integrity service that is designed to ensure that all nodes are replicating content without modifications. The cloud-based integrity subsystem may, alternatively or in addition, periodically verify that content is replicated consistently across all nodes of the cloud service.

Additionally, some versions of the integrity verification service 132, 252 may be used by everyday consumers to check the integrity of their own content and provide virtually irrefutable attestation of the content's author/originator and the content's integrity as it is replicated across a distributed network. As an example, a user of a social media application may take a picture or post a document and then select 'share' on the content. Such content is often shared seamlessly with social or enterprise networks (such as FACEBOOK, TWITTER, and GOOGLE+, as well as company intranets and community court records, for example). While users typically need to enter a user name and password to use these applications, the sites can be hacked and thus, it can be difficult to determine whether the content share was actually performed by the user or by a hacker. In these cases, the integrity verification subsystem 132, 252 may cooperate with an auditing subsystem to more or less simultaneously 'share' the content ID and integrity parameters (e.g., hashes) with a cloud-based audit network to create an independent integrity attestation of the content and its originator.

A user may also "lease" content to commercial content providers (such as search engines and social networks), and the integrity verification service 132, 252 may be used in this context, as well. For instance, if a user posts a video file to a social network, the user may use the integrity verification service 132, 252 to periodically check the integrity of the video file. If the integrity check fails, the user may revoke the lease or take some other action to protect the user from misrepresentation and liabilities if their content is altered. In some form, this could allow for the remote attestation/verification of published content (advertisements, TWEETS, etc.) across a decentralized and distributed hosting network.

Componentized Provisioning

Many computer security measures focus on the need to protect sensitive information from unauthorized uses without fully considering the affirmative need to use and share such information in appropriate circumstances. As the number and types of potential security breaches is large and always changing, security measures are frequently over-restrictive, sometimes to the point of defeating the intended use or desired purpose of a computing device. Thus, while such measures may initially give users some confidence in the security of the device, the inability to accomplish desired objectives within the confines of the security protocol can lead to user frustration and even abandonment of the security scheme.

Moreover, the traditional, monolithic architecture of mobile devices typically requires the operating system and preloaded software stack to be provisioned as a whole. For example, mobile devices are typically provisioned with a single operating system and a basic set of software applications, including phone, messaging, calendar, and email services. The end user and/or an authorized third party is not able to re-provision these base services or replace them with their own preferred services without "jailbreaking" or "rooting" the device (which typically voids the manufacturer's warranty). Componentized provisioning techniques as disclosed herein can enable mobile devices and other computing platforms to be selectively provisioned, component by component, according to user-defined component- and/or context-specific purposes. As such, individual components of the traditional monolithic software stacks can be separately and independently provisioned to individual hardware components or a set of hardware components either residing on the device or under its control.

As described in more detail below, embodiments of the component provisioning subsystem 134, 254, 850 as disclosed herein can separately and/or independently provision different components 280 of a computing platform (or groups of components) for different purposes, or provision the same component for different purposes in different domains 260, 270. In doing so, embodiments of the component provisioning subsystem 134, 254, 850 may provision a component or group of components 280 to be used in accordance with a specified purpose and also expressly provision the component not to be used for a specified or derived "anti-purpose." In some cases, the disclosed component provisioning subsystem 134, 254, 850 can receive and implement rules for the use and sharing of specific component resources, and such rules may be context-dependent (e.g., triggered by different operating contexts of the computing device/platform 100). As used herein, "components" may refer to, among other things, any provisionable operable or executable object or entity that may exist on the computing device/platform 100. A provisionable component 280 may include, for example, hardware, software, peripheral devices, subsystems, computer programming constructs, and/or others, including sub-components of vertical software stacks, user-installable components, non-user installable components, components that communicate with other devices (e.g., over a network), and components that are controlled or executed by the baseband processor 126. Some provisionable components 280 may create, access, operate on, receive or transmit component resources. As used herein, "component resource" may refer to, among other things, data, instructions, communications, computer programming constructs, or a combination thereof. As an example, a banking application may be a "component" that accesses component resources (e.g., user name, password, biometric identifier, account number, dollar amount, etc.), creates and transmits component resources (e.g., balance inquiry, transfer request, etc.), and receives and processes component resources (e.g., account balance information, transaction confirmation, etc.).

In embodiments in which the computing device/platform 100 is configured as a "multiple personality" device having multiple independent execution environments or "domains" as described above, the component provisioning subsystem 134, 254, 850 as disclosed herein can separately and independently provision each domain 260, 270 and/or separately and independently provision individual components within each domain 260, 270, according to one or more specified purposes. In doing so, the component provisioning subsystem 134, 254, 850 may allow permitted and unpermitted uses of components and component resources to be defined and enforced with a high degree of granularity, thereby alleviating the potentially adverse effects of monolithic, over-restrictive security policies and other existing, underspecified, generalized (e.g., monolithic) device provisioning mechanisms. Additionally, individual components can be provisioned differently for different domains 260, 270. For example, a banking application may be provisioned to allow the transfer of sensitive financial information to trusted external recipients in one domain, but the same banking application may be provisioned only to allow the viewing of such information on the provisioned device in another domain, where both domains are installed on the same device. In another representative example, a health application may be provisioned to allow the transfer of sensitive Health Insurance Portability and Accountability Act (HIPAA) information to trusted external recipients in one domain, but the same health application may be provisioned only to allow the viewing of such information on the provisioned device in another domain, where both domains are installed on the same device.

Again referring to FIG. 1, the illustrative component provisioning subsystem 134 is embodied as software, firmware, hardware, or a combination thereof, to perform component provisioning services for a computing device/platform 100. In some embodiments, the component provisioning subsystem 134 comprises a "suite" of computer programming constructs (e.g., both on and off-device.) For example, the component provisioning subsystem 134 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources (such as shared system resources 210). As noted above, embodiments of the component provisioning subsystem 134 or portions thereof may be implemented in or to control hardware components (e.g., as physics-based policies).

While not specifically shown in FIG. 1, it should be understood that portions of the component provisioning subsystem 134 can reside on other computing devices or computing systems, in some embodiments as a distributed component provisioning system. For example, a portion of the component provisioning subsystem 134 may be local to the computing device/platform 100, while another portion may be distributed across one or more other computing systems or devices that are in communication with the computing device/platform 100 by one or more electronic communication networks, via the communication subsystem 158, for example. In other embodiments, the component provisioning subsystem 134 may be located entirely on the computing device/platform 100.

Figure 7:
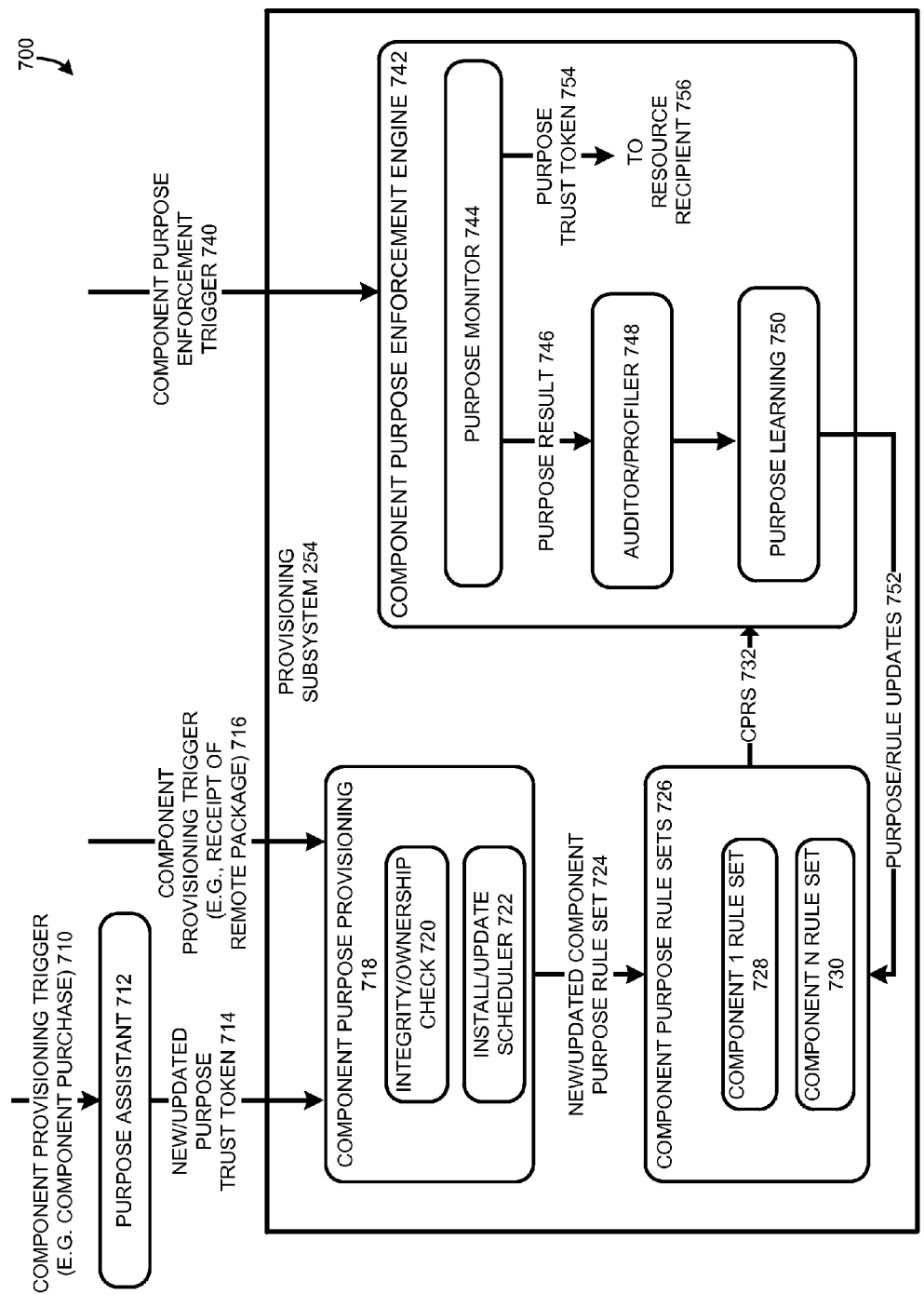
FIG. 7 is a simplified module diagram of at least one embodiment of a provisioning subsystem as disclosed herein.

Referring now to FIG. 7, an embodiment 700 of the illustrative component provisioning subsystem 134, 254 includes a number of computerized executable modules that, in some embodiments, may exist within an isolated domain (e.g., APIs, physics-based controls, software applications, RTOS, etc., as mentioned above) and configured to develop and implement component-specific purpose rule sets 726, 854, 1110 and component control as described in more detail below. The illustrative component provisioning subsystem 134, 254 is embodied as a component purpose provisioning module 718, component purpose rule sets 726, and a purpose enforcement engine 742. In some embodiments, a purpose assistant 712 interacts with the user to create a purpose trust token 714 in response to a provisioning trigger 710 (such as the purchase or downloading of a new or updated component 280). The purpose assistant 712 communicates the purpose trust token 714 to the component purpose provisioning module 718. While shown as a module that is external to the component provisioning subsystem 134, 254, it should be understood that the purpose assistant 712 may be incorporated as a part of the component provisioning subsystem 134, 254, in some embodiments. An embodiment of the purpose assistant 712 is described in more detail below, with reference to FIGS. 8 and 12.

Operation of the component purpose provisioning module 718 may be initiated or triggered by a provisioning trigger 710, which may result in the generation of a new or updated purpose trust token 714, or by another type of provisioning trigger 716. In general, any event the response to which requires provisioning of a component of the computing device/platform 100 may operate as a provisioning trigger 710, 716 or may result in the generation of a purpose trust token 714. As noted above, "component provision" or "component provisioning" may refer to, among other things, the process of installing and configuring a domain or other component 280 on a device in a way that it can be used to handle and share component resources in conformity with the component 280's purpose, which may be implemented as context- and/or resource-specific rules.

As described in more detail below with reference to FIG. 10, purpose trust tokens 714 may be used to authenticate a component's purpose as specified by an "owner" of the component or a component resource handled thereby. As such, purpose trust tokens 714 may embody owner credentials as well as an associated component purpose rule set. In other words, a purpose trust token 714 may embody an owner-specific rule set to govern the use, operation and control of a component in accordance with the owner-specified purpose. For example, a banking application may be component provisioned on a device to allow the transfer of sensitive financial information to trusted external recipients in one domain, but the same banking application may be component provisioned only to allow the viewing of such information on the provisioned device in another domain, where both domains are installed on the same device. Potential owners of components and component resources include, for example, end users, component providers, mobility policies, MDM services, and recipients of component resources. Provisioning triggers 716 may be similarly authenticated, and may also include automated events, such as the receipt of a new or updated application package identifier (e.g., a Uniform Resource Locator (URL) or Uniform Resource Identifier (URI)), from a remote source (e.g., connected by a network or Uniform Serial Bus (USB) cable, etc.).

In response to a purpose trust token 714 or a provisioning trigger 716 (e.g., at initial boot or as needed at runtime), the component purpose provisioning module 718 undertakes to component provision the component 280 associated with the purpose trust token 714 or the provisioning trigger 716, as the case may be, in accordance with its defined purpose. The end result of such provisioning by the component purpose provisioning module 718 is to establish a secure execution environment on the computing device/platform 100 for the execution of the component provisioned component 280, which, during use/execution of the component 280, enables the execution of system operations that are permitted by the component purpose and does not allow the execution of system operations that are not permitted by the component purpose (or which fall within a defined "anti-purpose" of the component 280).

The illustrative component purpose provisioning module 718 includes an integrity/ownership check module 720 and an install/update scheduler module 722. The integrity/ownership check module 720 verifies that a trusted boot of the platform the computing device/platform 100 has occurred. To do this, at initial start-up of the computing device/platform 100, the integrity/ownership check module 720 verifies the integrity of the components involved in the device boot up to and including the component provisioning subsystem 134, 254. At start-up and at runtime (e.g., in response to a provisioning trigger 716), the integrity/ownership check module 720 verifies the integrity of the component 280 (and any or all of the component's specified dependent and related subsystems/shared services/modules/components) before the component 280 is provisioned on the computing device/platform 100. An example of a "dependent" subsystem of a provisionable component may be a media application (e.g., NETFLIX, ITUNES, etc.) that specifies in its component provisioning configuration that an operating system cipher or software media decoding libraries have not been unaltered from the firmware default configuration (e.g., at boot). In this example, the OS cipher and software media decoding libraries would be the "dependent" components of the media application component. As another example, a banking application may specify certain secure protocols (e.g., Secure Socket Layer (SSL)/Transport Layer Security (TLS)) and/or Certification Authority (CA) trust certifications or security keys). In this example, the SSL/TLS and CA would be the dependent components of the banking application component.

In general, such integrity/ownership checking involves authenticating each component (e.g., each component in the boot sequence and/or the component 280 to be component provisioned) and the associated component purpose as having a trusted owner, and verifying that the component has not been altered since its receipt from the trusted owner. To verify that the component 280 has a trusted owner, the integrity/ownership check module 720 may authenticate user credentials (e.g., user name, password, etc.) or security keys (e.g., public keys such as Public Key Infrastructure (PKI) keys and/or others) using, for example, cryptographic techniques. Integrity and ownership checking may be performed according to one or more of the techniques described above and in Oberg et al., U.S. patent application Ser. No. 13/872,865, for example.

The install/update scheduler 722 analyzes the component purpose rule set 726 associated with the component to be provisioned, verifies that the component purpose rule set 726 does not have any unresolvable conflicts with other component purpose rule sets 726 associated with the same component (e.g., component purpose rule sets of other component owners), and initiates component provisioning of the component 280 or schedules such provisioning to occur at a later time (e.g., on the next boot), in accordance with its associated rule set. As a result, the new or updated/upgraded component 280 is installed on the computing device/platform 100 and its associated component purpose rule set 726 is made accessible to the purpose enforcement engine 742 for runtime enforcement. The new (as in the case of a newly installed component) and updated component purpose rule sets 724 may be added to a "global" compilation of component purpose rule sets 726. The compilation of component purpose rule sets 726 includes the individual component-specific rule sets 728, 730, for each of the "N" (where N is a positive integer) components 280 that are component provisioned on the device/platform 100.

The purpose enforcement engine 742 operates to enforce the component-specific purpose rule sets 726 as they are implicated from time to time by purpose enforcement triggers 740 that occur during operation/use of the device/platform 100. Purpose enforcement triggers 740 include, for example, requests to access component resources. Such requests may be initiated by other users, software applications, or devices (which may be referred to herein as "resource recipients"). As an example, a mobile device user may initiate, through a mobile banking application, an inquiry as to the current balance of the user's bank account. In this case, the user's balance inquiry acts as a purpose enforcement trigger 740.

The purpose enforcement engine 742 includes a purpose monitor module 744, an auditor/profiler module 748, and a purpose learning module 750. The purpose monitor module 744 monitors operation of the computing device/platform 100 and detects purpose enforcement triggers 740. The purpose monitor 744 determines which of the component purpose rule sets 726 (or context- or resource-specific rules thereof) are applicable to the purpose enforcement triggers 740, and evaluates the purpose enforcement triggers 740 in view of the applicable rule set or sets 726. As some components 280 may have multiple owners issuing component purpose rule sets 726, in some embodiments, the purpose monitor 744 may reconcile the rule sets of the various owners and determine whether the action requested by the purpose enforcement trigger 740 is permitted by the applicable rule sets, collectively. In other embodiments, the rule sets of the various owners may be compiled and reconciled prior to their entry in the global purpose rule sets 726 (e.g., by the purpose assistant 712). The purpose monitor 744 generates a purpose result 746, in response to each purpose enforcement trigger 740 that implicates one or more of the component purpose rule sets 726. The purpose result 746 may be embodied as a message, instruction, parameter, or data value, for example, which indicates whether the action requested by the purpose enforcement trigger 740 is permitted. If the purpose result 746 is favorable, indicating that the requested action is permitted at least in part, the purpose monitor 744 issues a purpose trust token 754 embodying the purpose result 746 to the resource recipient 756. In the above banking example, the purpose trust token 754 includes a purpose result 746 that indicates, to the banking application or directly to the resource recipient 756, that the request is permitted, and indicates any context- or resource-specific restrictions that are applicable to the request. For example, the purpose result 746 and thus the purpose trust token 754 may stipulate that the account balance information only be provided to the verified requester when the requester is not connected to a public (unsecured) wireless access point (and that such information is not provided when the requester is connected to other wireless access points). Thus, if the user connects to an unsecured wireless network, the purpose trust token 754 issued by the purpose monitor 744 may stipulate that the balance inquiry is to be denied, or may allow the user to override the restriction.

The auditor/profiler module 748 keeps track of purpose enforcement triggers 740 and the associated purpose results 746 determined by the purpose monitor 744, and stores them in memory (e.g., a log file), for auditing and learning. The purpose learning module 750 employs, for example, artificial intelligence based techniques, such as various supervised or unsupervised machine learning techniques, to (e.g., by executing background processes) observe and learn from the user's behavior in response to the purpose results 746. For example, after many instances of observing that a user overrides a particular component purpose rule in a particular operating context of the computing device/platform 100, the purpose learning module 750 may propose a modification to the rule, and if approved by the applicable component owners, incorporate corresponding purpose/rule updates 752 into the component purpose rule sets 726.

Figure 8:
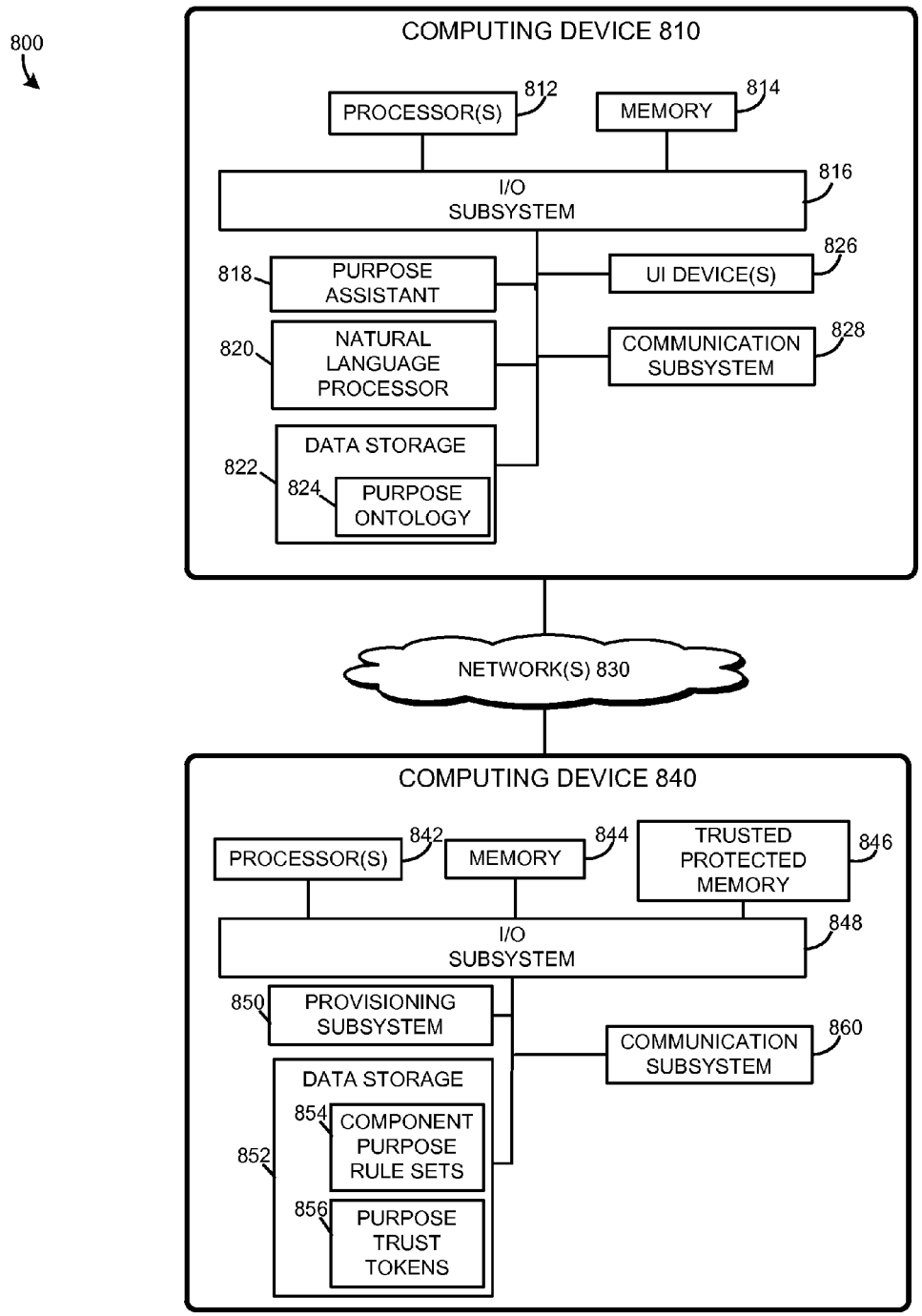
FIG. 8 is a simplified block diagram of at least one embodiment of a networked computing system, including a component purpose assistant and a component provisioning subsystem as disclosed herein.

Referring now to FIG. 8, an illustrative computing system 800 includes an embodiment 818 of the purpose assistant 712, embodied in a computing device 810, and an embodiment 850 of the component provisioning subsystem 134, 254, 850 embodied in another computing device 840. The computing devices 810, 840 are in communication with each other via one or more networks 830. For example, the network(s) 830 may communicatively couple the computing devices 810, 840 to each other and/or to other computing devices and/or systems by, for example, a cellular network, a local area network, wide area network, personal cloud, virtual personal network (VPN), enterprise cloud, public cloud, and/or public network such as the Internet. The illustrative computing devices 810, 840 and the network 830 are depicted in simplified form for ease of discussion. It should be understood that either or both of the computing devices 810, 840 may be configured in a similar manner to the computing device/platform 100 and have one or more similar components thereto. For example, the computing device 810 and/or the computing device 840 may include all or a subset of the components of the computing device/platform 100. In general, the components of the computing system 800 having similar or identical names to components shown in FIG. 1 and/or described above may be embodied in a similar fashion to the corresponding components described above. As such, reference is made here to the foregoing description and such description is not repeated here.

In the computing system 800, the purpose assistant 818 is in communication with a natural language processor 820, which applies a purpose ontology 824 to natural language purpose input of a user (e.g., a component or resource owner) to derive therefrom one or more policies, purposes, and/or anti-purposes to be implemented on the computing device 840 by the component provisioning subsystem 850 in connection with the component provisioning of a component 280 for use on the computing device 840. That is, the component provisioning subsystem 850 is extended by the purpose assistant 818 to facilitate purpose/anti-purpose generation by one or more stakeholders (e.g., end users, component owners, component providers, etc.). Similarly, signed purpose contexts, which in some embodiments may be formulated as signed purpose tokens, can be transferred across networks and heterogeneous computing systems/devices to, for example, provide assurance that a component purpose provisioned task/event has been verified/authorized by an active purpose enforcement engine for a given user and resource. In the banking example, a mobile user could be "pre-authorized" by a bank to transfer small increments of funds (e.g., up to a percentage of equity in their authorized account by a bank) to another mobile user/party without requiring an active authorization from a bank or credit issuer. Such a form of secure "pre-authorization" may allow for transfers to occur even offline (e.g., without the two parties being connected to a banking network, point of service (PoS) terminal, or the Internet).

In different embodiments, the purpose assistant 818 may have a number of different front end interfaces which will help gather component purpose context which will be used to create the component purpose rule sets 854. As such, the purpose assistant 818 may include a natural language parser, a step-by-step wizard-based solution, or direct definitions, for example. In any case, the purpose assistant 818 is configured to process the high-level, descriptive details about component purposes and policy requirements, derive the component purpose and anti-purpose, and then convert these into a component purpose rule set 854. The context provided by using high-level descriptions of the component purpose allow the component purpose rule sets 854 to be applied more flexibly in different operating contexts of the device 840.

For example, in some embodiments, the purpose assistant 818 is embodied as (or as a component of) a "virtual personal assistant," which can engage a person in a natural language dialog to achieve the goal of developing a component purpose rule set for a component to be purpose provisioned on the computing device 840. Such a virtual personal assistant may be embodied as a computerized application that employs natural language processing (NLP) and/or natural language understanding (NLU) techniques to interpret natural language input (e.g., conversational input or dialog, including spoken natural language dialog) received by one or more user interface devices 826 (e.g., a microphone, keypad, etc.), and generate a machine-readable semantic representation of the user's intended meaning of the natural language input. The machine-readable semantic representation of the user's natural language policy or purpose statement may be stored as a component purpose rule set 854, which may be embodied as machine-executable rules and/or computer program logic statements, for example.

Some aspects of virtual personal assistants, all or portions of which may be used in connection with or to implement one or more aspects of the purpose assistant 818, are described in at least the following patent applications of SRI International: Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" and Kalns, et al., U.S. patent application Ser. Nos. 13/891,858 and 13/891,864, both filed May 10, 2013, both entitled, "Rapid Development of Virtual Personal Assistant Applications."

Briefly, the conversational (e.g., unstructured) natural language policy or purpose inputs are received and processed by, for example, a user intent interpreter module of the natural language processor 820 or the purpose assistant 818, which analyzes the input and formulates therefrom a likely intended goal or objective of the user with regard to establishing a purpose or policy for a component to be purpose provisioned on the computing device 840. Such a goal or objective may be referred to as a "user intent." In some embodiments, the user intent may be formulated as an intermediate structured representation of the conversational natural language input. For example, if the natural language policy statement includes the phrase, "Only share account information when user is connected to a secure wireless network," the corresponding user intent may be formulated as, e.g., a combination of structured statements such as "ShareData(Account_Info, Secure_WAP)" and "ProtectData(Account_Info, All_Other_WAP)." The purpose assistant 818 analyzes the natural language input and/or the user intent as needed, and based on its analysis, executes one or more "task flows" (e.g., machine-executable routines) to generate the component-specific purpose rule sets 854. For example, the "ShareData (Account_Info, Secure_WAP)" and "ProtectData(Account_Info, All_Other_WAP)" statements may be translated to a series of lower-level machine-executable instructions that can be executed by the component provisioning subsystem 850. Additionally, the purpose assistant 818 may generate purpose trust tokens 856 for each of the component purpose rule sets 854 as described herein. The component purpose rule sets 854 and the purpose trust tokens 856 may be stored in the data storage 852.

Where spoken natural language is used to input a policy or purpose statement, the user intent interpreter module analyzes the words and/or phrases produced by, e.g., an automated speech recognition (ASR) system, which, generally converts speech to the corresponding text (e.g., words and phrases). In this case, the user intent interpreter module may apply, for example, a rule-based parser and/or a statistical parser to determine, based on the verbal context, the likely intended meaning of spoken words or phrases that have multiple possible definitions (e.g., the user may have intended the word "net" to mean "Internet" or "subnet," or something else, depending on the context). An illustrative example of a natural language understanding component that may be used in connection with or as a part of the user intent interpreter module is the SRI Language Modeling Toolkit, available from SRI International. In some embodiments, the user intent interpreter module combines the likely intended meaning, goal, and/or objective derived from the natural language input as determined with any multi-modal inputs (e.g., GPS location, etc.) and the purpose assistant 818 synthesizes the combination of natural language inputs and other multi-modal inputs to generate the component purpose rule sets 854.

The purpose ontology 824 is embodied as, for example, a database or knowledge base, which defines semantic relationships between various natural language terminology and their machine-readable counterparts. For example, the purpose ontology 824 may define "checking account" as referring to a specific banking account number of a specific user, or may define "my house" as referring to a specific wireless access point, or may define "all social media" as a list of social media sites/services (e.g., FACEBOOK, TWITTER, LINKEDIN, TUMBLR, etc.). In this way, the purpose ontology 824 facilitates not only purpose creation but also purpose maintenance, in that changes made to the ontology 824 can be automatically propagated to component purpose rule sets 854 that reference the ontology 824. Moreover, platform-specific configuration details can be reflected in the ontology 824, thereby allowing just the ontology 824, and not the individual component rule sets 854, to be updated in response to platform, operating system, or software upgrades.

Figure 9B:
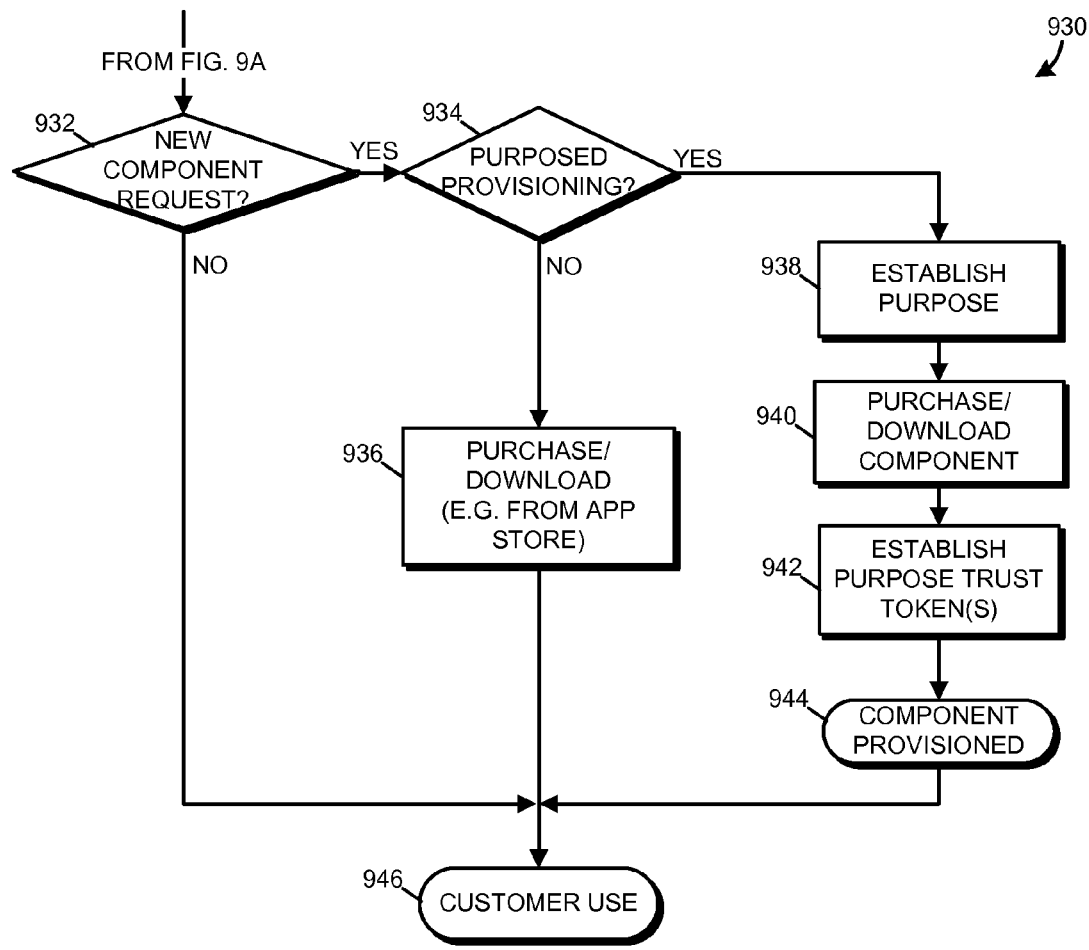
Figure 9D:
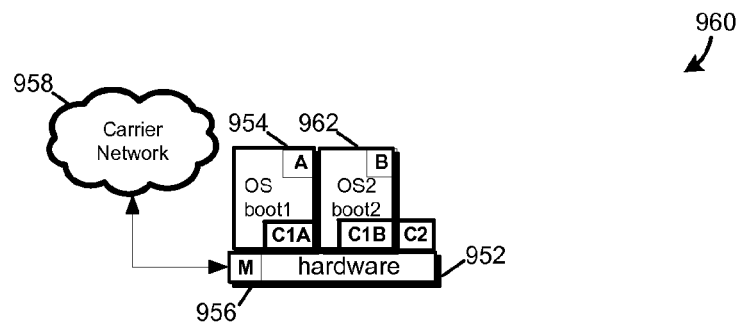

Referring now to FIGS. 9A-9B, an illustrative method 900, 930 for provisioning an electronic device (e.g., device/platform 100, device 810 and/or device 840) is shown. FIGS. 9C-9D illustrate simplified depictions 950, 960 of the electronic device/platform 100, 810, 840 during different stages of the provisioning method of FIGS. 9A-9B. The method 900, 930 may be embodied as computerized programs, routines, logic and/or instructions executed by the computing device/platform 100 or by the computing system 800 (by the component provisioning subsystem 850, for example). At block 910, the method 900 is initiated by the manufacture of the electronic device (e.g., a mobile/wearable/portable embodiment of the computing device/platform 100). In FIG. 9C, the status of the device is represented by the single block 952 (e.g., hardware only, with nothing installed). The device is initially provisioned (e.g., by the original equipment manufacturer (OEM) or telecommunications carrier) with a hardware security key (or set of keys) 120, boot extensions for the integrity checking 132 and provisioning 134 subsystems, and the initial software stack (e.g., loaded by the OEM/carrier). At this stage, components 954 (e.g., bootloader, operating system, native applications) are provisioned on the device.

At block 914, the computing device/platform 100 receives an initial provisioning trigger, which may be the purchase of the electronic device by a customer, for example. The initial provisioning trigger may be as simple as a power on of the device or the input/receipt of user credentials. At block 916, the platform/system 100, 800 determines whether the device is enabled for cellular telecommunications services. If the device is not enabled for cellular service, the method 900 proceeds to block 928, where user customization of the device is initiated. If the device is cellular enabled, the device is configured according to a selected carrier and/or cellular plan, at block 918. The carrier and/or cellular plan may be selected by the end user or an enterprise (e.g., a corporate administrator), for example. At block 920, the platform/system 100, 800 determines whether the device is to be provisioned with a new phone number or with an existing phone number. If the device is to be provisioned with a new phone number, the new phone number is obtained at block 922 (e.g., from the carrier), and at block 924 the device is provisioned for use with the selected carrier's cellular network. If the device is not provisioned with a new phone number, the method 900 proceeds to block

924 directly. Once the device has been provisioned for access to the carrier's cellular network, the device's cellular provisioning is complete, at block 926, and the platform/system 100, 800 proceeds to user customization of the device at block 928. In FIG. 9C, the status of the device now includes mobility (e.g. cellular service) 956 and a connection to a carrier network 958. User customization may include, for example, establishing the end user's preferred email service and email address, wireless networks, etc., as well as any other customizations (e.g., settings, preferences).

Referring now to FIG. 9B, the method 930 follows the method 900, in the illustrated embodiment. In other embodiments, the method 930 may operate in conjunction with or parallel to the method 900. For example, in some embodiments, the carrier set up (block 918) and/or carrier network provisioning (block 924) may be purpose provisioned according to the method 930. That is, in some embodiments, the method 900, 930 enables aspects of the cellular configuration of the device to be provisioned according to user-specified purposes as disclosed herein. At block 932, the platform/system 100, 800 determines whether a provisioning trigger in the form of a new component request has been received. The new component request may take the form of a request to download a new component or install a new component found/scheduled in persistent storage/cache (as may be the case in device implementations that schedule application, operating system, or other firmware updates based on the presence of a new or updated component in a defined storage location). For example, if a new component request is not received, the device begins or continues normal customer use at block 946. If a new component request is detected, the platform/system 100, 800 determines whether the component is eligible for purpose provisioning, at block 934. To do this, the platform/system 100, 800 may determine whether the new component has an associated purpose trust token. If the component is not to be purpose provisioned, the platform/system 100, 800 proceeds with the purchase or download (e.g., from an app store or app market) of the component (block 936) and normal customer use (block 946). In FIG. 9D, the device now includes multiple separately provisioned domains 954, 962 and other independently provisioned components C1A, C1B, and C2, where C1A represents a purposed provisioning of a component C1 for use within the domain A, C1B represents a different purposed provisioning of the same component C2 for use with in the domain B, and C2 represents another purpose provisioned component outside of the domains A and B.

If the new component is to be purpose provisioned, the platform/system 100, 800 proceeds to execute computer program logic to define the component-specific purpose (block 938) (e.g., via the purpose assistant 712), purchase and/or download the component (block 940), establish the purpose trust token(s) associated with the component and the component stakeholder(s) (block 942) for use by, e.g., the purpose enforcement engine 742, complete the component purpose provisioning (block 944), and begin or resume normal customer use (block 946).

Figure 10:
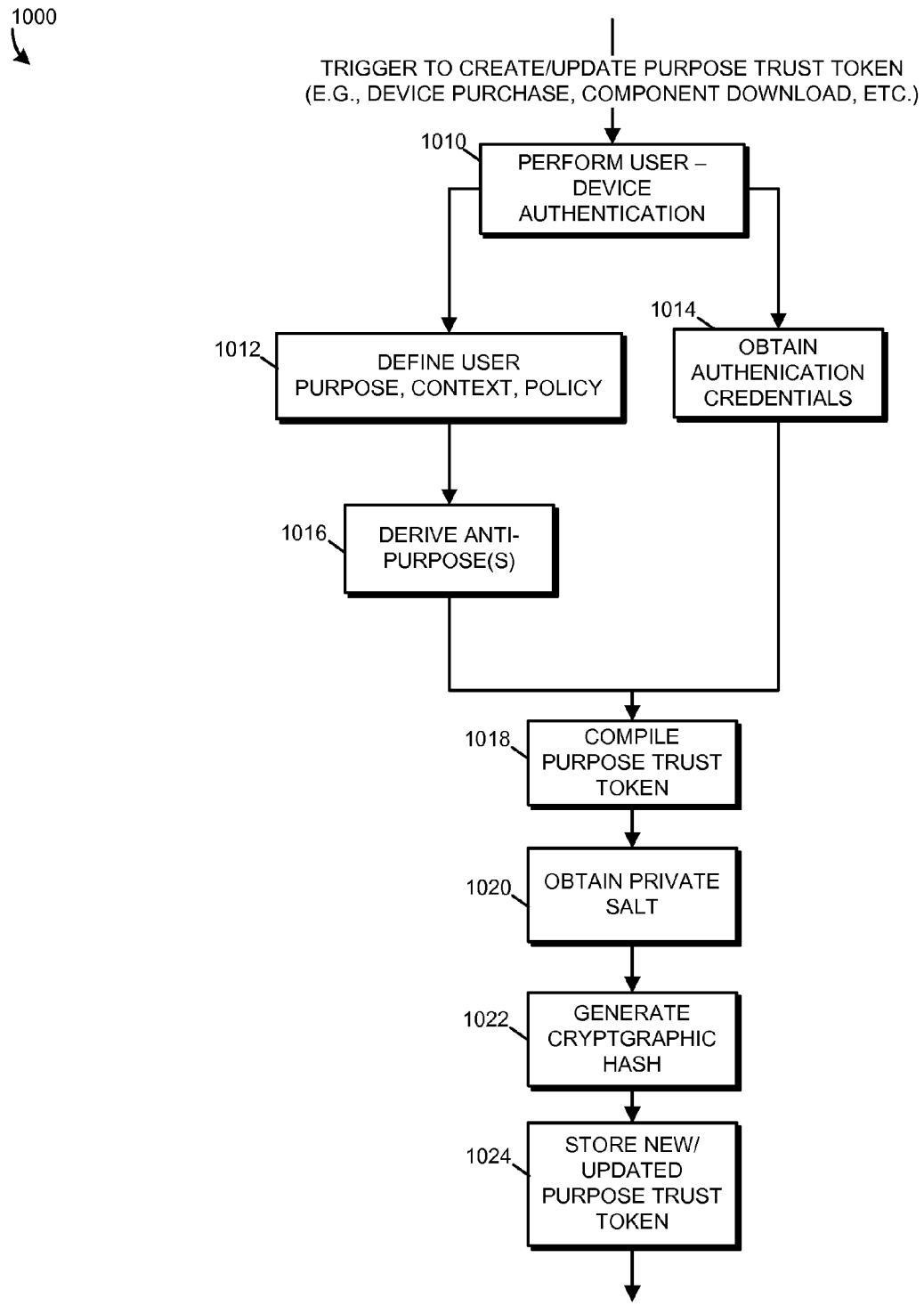
FIG. 10 is a simplified flow diagram of at least one embodiment of a method for creating or updating a purpose trust token as disclosed herein.

Referring now to FIG. 10, an illustrative method 1000 for creating or updating a purpose trust token is shown. The method 1000 may be embodied as computerized programs, routines, logic and/or instructions executed by the computing device/platform 100 or by the computing system 800 (by the purpose assistant 818, for example). At block 1010, the method 1000 is initiated by a trigger to create or update a purpose trust token (e.g., by the purchase of the device, by a component download, etc.). As discussed above, the purpose trust token may be embodied as an encrypted or otherwise secured element comprised of authenticated user credentials and user-defined component-specific purposes and policies (e.g., a component purpose rule set 726). In other words, the purpose trust token provides a trusted indication of the permitted and unpermitted users of its associated component in various operating contexts of the device. At block 1010, the platform/system 100, 800 authenticates the user to the device. To do this, the platform/system 100, 800 may verify a user name and password, fingerprint or other biometric identifier, or use other authentication techniques. At block 1012, the platform/system 100, 800 defines the component-specific purpose and any context-specific rules and policies related thereto. To do this, the platform may interact with the user using, for example the purpose assistant 512. At block 1014, the platform/system 100, 800 obtains the user authentication credentials to be incorporated into the purpose trust token to validate the purpose-based rules and policies as authentic to the user. These credentials 1014 may be unique or specific to the purpose context (trust token) or may be more globally defined, e.g., as a global/common user to device authentication 1010. In some instances, the user may not know the credentials, as they may be securely transferred to the device and stored by an automated process. In the banking example, a bank's automated teller machine (ATM) may authorize a user's device as well as the bank application component provisioned thereon via a unique code sent via, e.g., NFC, RFID (radio frequency identification), barcode, etc.

At block 1016, the platform/system 100, 800 derives the anti-purpose(s) associated with the purpose obtained at block 1012. To do this, the platform/system 100, 800 may refer to pre-established relationships between defined purposes and anti-purposes, which may be stored in, for example, a lookup table, database, or the purpose ontology 824. At block 1018, the platform/system 100, 800 compiles the purpose trust token from the defined purpose, context(s), policies, anti-purpose(s), and authentication credentials. As used herein, "context" may refer to, among other things, the current calendar date, the current time, the current geographic location, nearby wireless access points, cell tower locations, and/or other indicators of the current operating context of the platform/system 100, 800, as may be detected by sensors and/or other context-detecting mechanisms of the platform/system 100, 800. Thus, in some embodiments, the purpose trust token may include, for example, a date/time stamp and/or other context indicators.

At block 1020, the platform/system 100, 800 obtains a user-specific private salt (such as the user-supplied answer to a security question or some other user-supplied data). At block 1022, the platform/system 100, 800 executes a cryptographic hash function (e.g., a Secure Hash Algorithm) using the private salt and the purpose trust token as inputs. The output of the cryptographic hash function is stored as the new or updated purpose trust token, in a secure form (e.g. not easily derived or ascertained), at block 1024.

Figure 11:
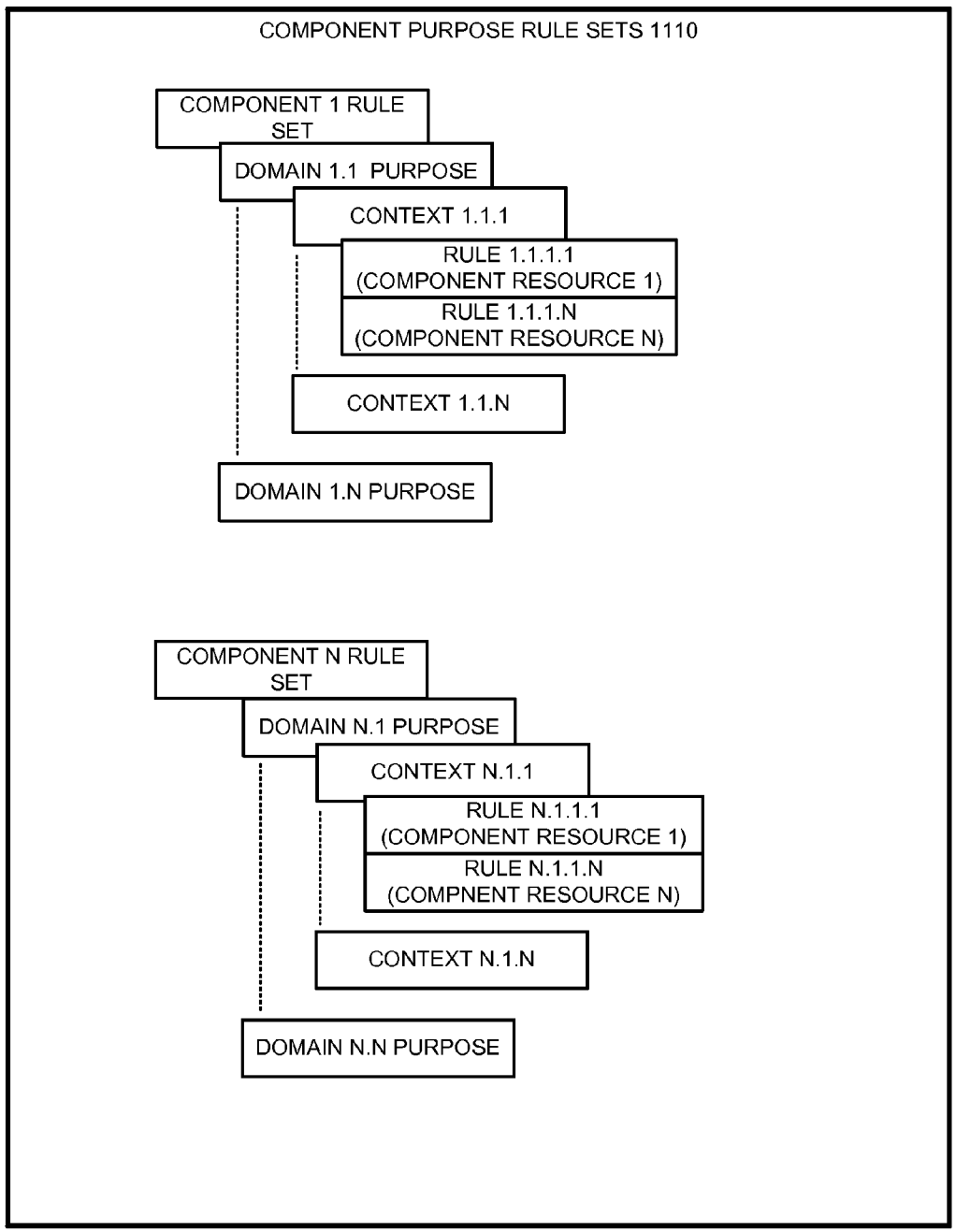
FIG. 11 is a simplified illustration of at least one embodiment of component purpose rule sets as disclosed herein.

Referring now to FIG. 11, a simplified illustration 1100 of component purpose rule sets 1110 is shown. In the illustrative example, a separate component rule set is defined for each of N provisionable components of the platform/system 100, 800. As shown, each component rule set may have a different set of rules for each domain 260, 270 in which the component is purpose provisioned. Further, each component rule set may have different rules that apply during different operating contexts of the platform/system 100, 800. Moreover, each component rule set may have different rules that apply to different component resources involve in the use or execution of the component. In this way, the component purpose rule sets 1110 allow for finer granularity and context-dependency of restrictions on the use of component resources, and for the release of restrictions when the conditions/context giving rise to the restrictions cease to exist. The component purpose rule sets 1110 may be embodied as, for example computer readable instructions, directives, or statements, which may be developed by the purpose assistant 712, 818 and processed by the component provisioning subsystem 254, 850 as described above.

Figure 12:
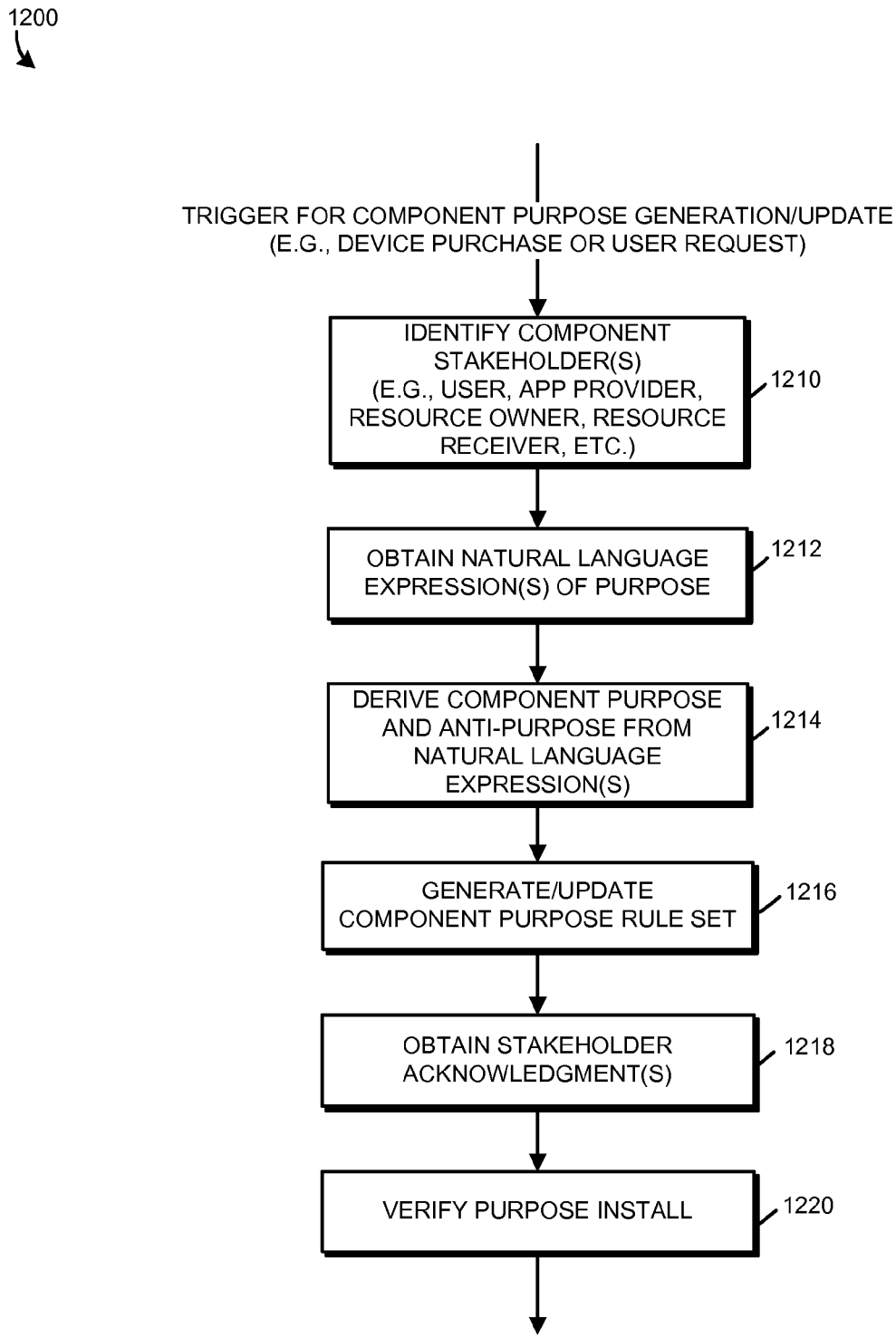
FIG. 12 is a simplified flow diagram of at least one embodiment of a method for creating or updating a component purpose as disclosed herein.

Referring now to FIG. 12, an illustrative method 1200 for creating or updating a component purpose is shown. The method 1200 may be embodied as computerized programs, routines, logic and/or instructions executed by the computing platform/system 100, 800 or by the computing device 810 (by the purpose assistant 818, for example). As described herein, the creation or updating of a component purpose may involve input from or negotiation among multiple stakeholders, such as the component owner and end user. Thus, in some embodiments, a component purpose represents an agreement among multiple parties as to how a component may be used by the end user and as to how the end user's component resources (e.g., personal/private data) may be used and shared by the component. However, certain types of purposes may be open-ended in that resource recipients 756 are not yet defined. Such may be the case where a component owner defines a purpose for use of the component on a device, but the component or the device is not yet configured for a specific end user. For instance, the component resources may include bank funds, personal IDs, social media IDs (e.g. FACEBOOK, LINKEDIN, SKYPE, etc. user IDs), and related private information that the resource/component owner may want to share on a limited basis in the future but with a common set of purpose conditions/restrictions. That is to say that some purpose conditions/restrictions may be applicable more generically to multiple different component resources, in some embodiments. For example, multiple different social media resources may have a common set of purpose conditions/restrictions (e.g., sharing of a user ID, but not a "friends," "followers," or "contacts" list; and not the user's date of birth, contact info, pictures, etc.). At block 1210, the method 1000 is initiated by the detection of an electronic communication comprising a request or trigger to generate a new or updated component-specific purpose for a component provisioned or to be provisioned on the platform/system 100, 800. For example, the method 1200 may be initiated by the purchase of an electronic device embodying the platform/system 100, 800, a user request (e.g., the purchaser or a system administrator), etc. At block 1010, the platform/system 100, 800 identifies the component stakeholders (e.g., the end user, component provider, device manufacturer, resource receivers, etc.). At block 1212, the computing device/platform 100 or computing system 800 (e.g., the computing device 810 operating the purpose assistant 818), obtains a natural language expression or expressions (from the various stakeholders) of the component-specific purpose. In some embodiments, the component-specific purpose contains a number of different elements that identify: the applicable provisionable components (in cases where a purpose spans multiple components), the applicable component resource identifiers (e.g. bank account numbers, etc.), the applicable resource owners (which may be tracked by publicly shared keys), the applicable resource receivers (which may receive purpose-approved resources but may not directly submit new purposes for the specified resources), and the purpose criteria and rule matching result/actions (e.g., the criteria for determining whether a purpose matches a purpose enforcement trigger event and the action to be taken if a match occurs).

At block 1214, the computing device/platform 100 or computing system 800 derives the component-specific purpose and anti-purpose from the received natural language expression(s). To derive the purpose and anti-purpose, the device/platform 100, 810 may apply the purpose ontology 824 to, for example, determine relationships between the stated purpose and purpose/policy/anti-purpose information contained in or referenced by the purpose ontology 824 and/or an associated knowledge base (which may include, for example, searchable database tables populated with specific data values, rules, and/or computer instructions that relate to natural language statements) and thereby map elements of the natural language expression to elements of the ontology 824 and/or associated knowledge base.

At block 1216, the device/platform 100, 810 generates or updates (as the case may be) the component purpose rule set, which, as discussed above, may include a number of different component-, resource- and/or context-specific rules. To do this, the device/platform 100, 810 may again refer to the purpose ontology 824 and/or an associated knowledge base to map the derived purpose and anti-purpose to their corresponding machine-readable semantic representations, instructions, and/or data values. At block 1218, the device/platform 100, 810 obtains acknowledgements from the identified stakeholders indicating approval of the new or updated component purpose rule set. Digital signatures or other methods may be used to authenticate and verify stakeholder approval. The new or updated component purpose rule set is then stored in a suitable data structure, e.g. a searchable database, in persistent storage, such as the data storage 852, and shared with all relevant interested parties (e.g., resource recipients, which may include the stakeholders). At block 1220, the device/platform 100, 810 verifies that the component purpose (implemented as a component purpose rule set) is compatible with other component purposes, and has been successfully installed on the device/platform 100, 810. In some cases, block 1220 is executed to confirm that, in the event that a time elapse occurs between the component purpose rule set generation and the completion of stakeholder acknowledgements, the new component purpose is still valid (e.g., the new purpose does not conflict with any purpose rule sets installed or updated during the time elapse).

Figure 13:
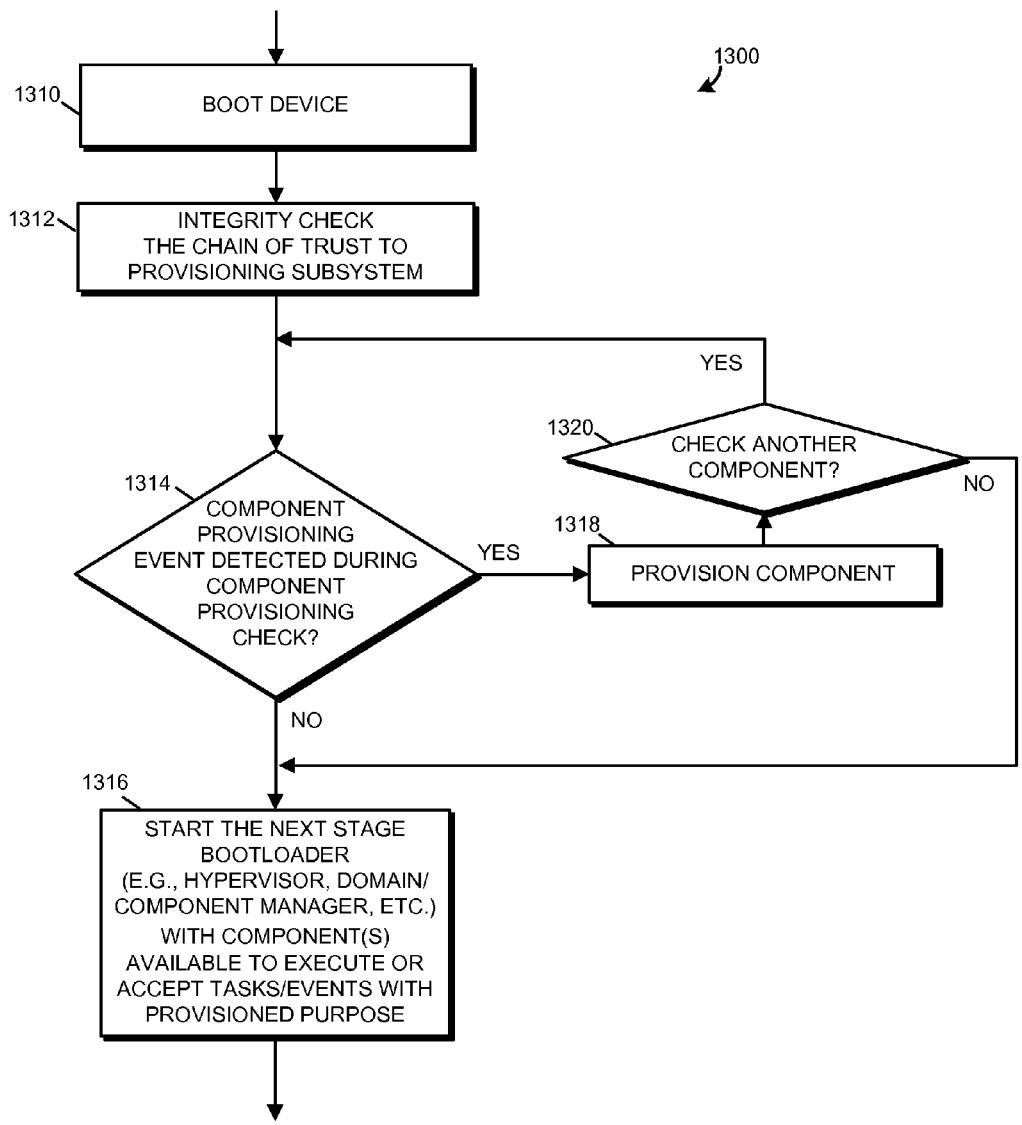
FIG. 13 is a simplified flow diagram of at least one embodiment of a method for booting an electronic device including the component provisioning subsystem as disclosed herein.

Referring now to FIG. 13, an illustrative method 1300 for booting an electronic device including a component provisioning subsystem 134, 254, 850 as disclosed herein is shown. The method 1300 may be embodied as computerized programs, routines, logic and/or instructions executed by the computing device/platform 100 or by the computing system 800 (by the virtualization service 162, 212 and/or other components of the trusted computing base, for example). At block 1310, the platform/system 100, 800 boots (e.g., in response to a power on event). As part of the boot process, the virtualization service 162, 212 (e.g., hypervisor) or pre-boot loader loads the component provisioning subsystem 134, 254, 850 into memory. To do this, the component provisioning subsystem 134, 254, 850 may be downloaded (e.g., from a networked server computer in "the cloud"), or a boot image may be loaded into memory from block storage, for example. At block 1312, the platform/system 100, 800 performs an integrity verification check on the chain of trust from the bootloader to the component provisioning subsystem 134, 254, 254, as described above. At block 1314, the platform/system 100, 800 executes a provisioning check to see if any components need to be purpose provisioned on the platform/system 100, 800, e.g., for a new domain or purpose. That is, if a component is already installed on the device, it may not need to be purpose provisioned. However, the component may need to be purpose provisioned (e.g., as an extension of a typical "user customization 928"), e.g., for a new domain or user. For example, an already installed email application may be purpose provisioned as disclosed herein for use in a personal domain with a user's GMAIL account and also separately purpose provisioned for use in an enterprise domain with an employer-issued email account.

If the platform/system 100, 800 detects a provisioning event (e.g., that there is a provisionable component needing to be provisioned, as indicated by, for example, a provisioning trigger 716 or purpose trust token 714), the method proceeds to block 1318. In some embodiments, the domain manager subsystem 138, 258 may determine active domains 260, 270 and initiate purpose provisioning of a domain that is available to run on the platform/system 100, 800 (e.g., certain "default" domains). If there are no components that need to be purpose provisioned, the platform/system 100, 800 proceeds to block 1316. For example, the platform/system 100, 800 can start (e.g., launches, initializes, and/or begins execution of) the next stage bootloader (e.g., hypervisor, domain/component manager, etc.) or the component (per operating system and component dependencies), at block 1316. For example, in some embodiments, a component may be an application operating system, subsystem, etc. that is arranged to start in a system dependent order or as needed on demand.

If it is determined at block 1314 that a component needs to be provisioned, the device/platform 100, 840 determines the provisioning configuration and purpose provisions the component for use on the device/platform 100, 840 using the techniques described herein, at block 1318. At block 1320, the platform/system 100, 800 checks to see if additional component provisioning needs to be performed. If there is additional provisioning checking to be performed, the method 1300 returns to block 1314. If no other components need to be checked for provisioning, the method 1300 proceeds to block 1316. Once purpose provisioning is complete, the purpose provisioned components are available to execute and/or accept or issue tasks/events in accordance with their provisioned purpose.

Figure 14:
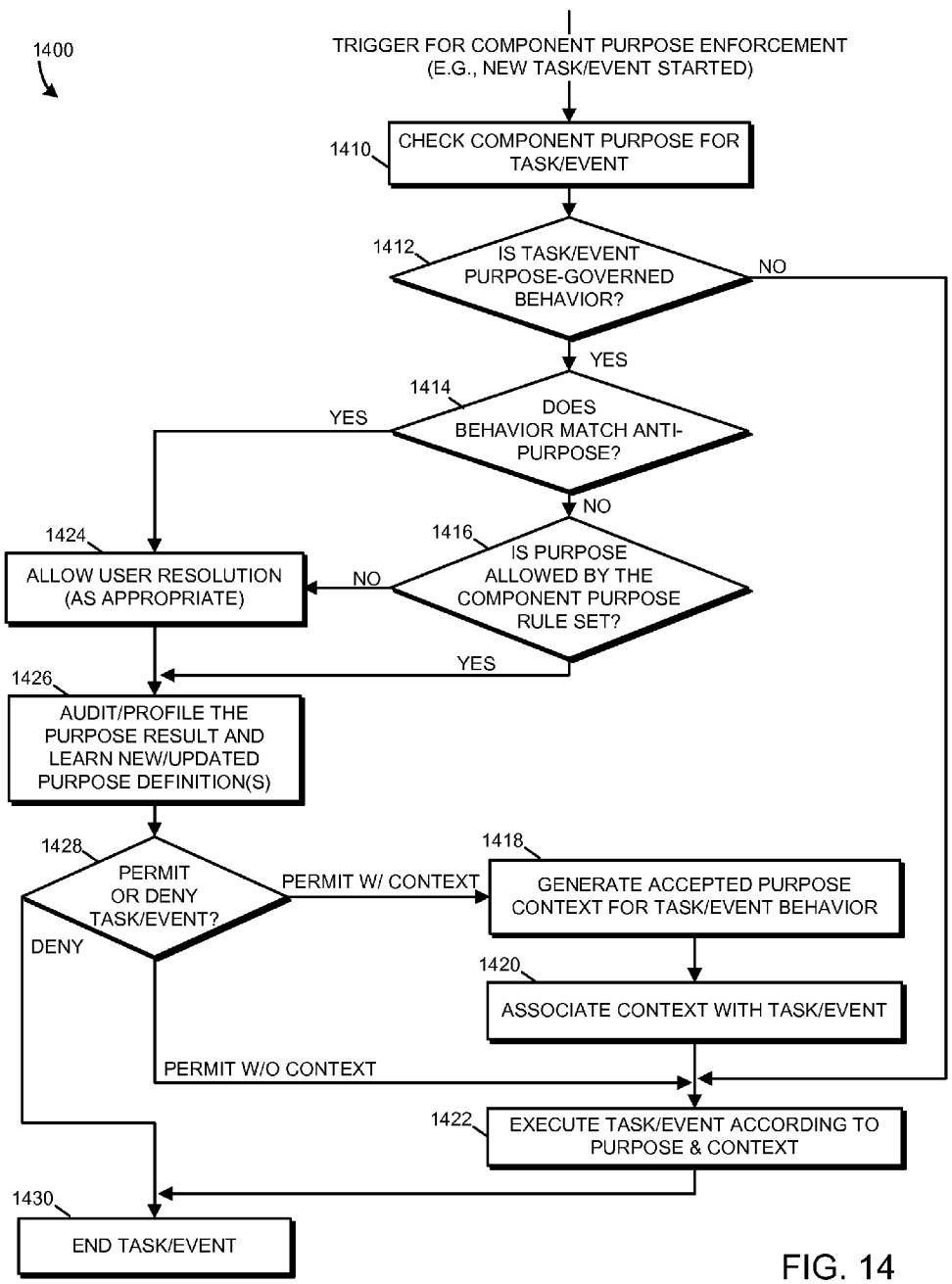
FIG. 14 is a simplified flow diagram of at least one embodiment of a method for enforcing a component purpose as disclosed herein.

Referring now to FIG. 14, an illustrative method 1400 for enforcing a component-specific purpose during operation of the platform/system 100, 800 is shown. The method 1400 may be embodied as computerized programs, routines, logic and/or instructions executed by the computing device/platform 100 or by the computing system 800 (by the component provisioning subsystem 134, 254, 850, for example). At block 1410, the method 1400 is initiated by an electronic communication indicating a request or trigger for component purpose enforcement, such as a new task or event that is received or started by an executing component. At block 1412, the platform/system 100, 800 identifies the type of task or event being requested by the component, to determine if the detected task/event is governed by any rules in the applicable component purpose rule set 726, 854. In some cases, new or unrecognized task/events may be evaluated and associated with a task/event type or classification. The task/event type may be used, for example, to distinguish task/events from one another at a higher level of abstraction (e.g., to categorize them), so that every individual task/event need not be separately analyzed. If the task/event is not governed by one or more of the component purpose(s) (where a component may have multiple different purposes as described herein), the platform/system 100, 800 executes the task/event as requested, at block 1422. If the task/event is governed by one or more component purpose(s), at block 1414, the platform/system 100, 800 compares the behavior of the component task/event to the anti-purpose(s) (1414) and then the purpose(s) (1416) defined for the component (e.g., as implemented in the component purpose rule set 726, 854). If the behavior of the task/event matches one or more of the defined anti-purpose(s) (block 1414) or does not match a purpose (block 1416), the platform/system 100, 800 allows a user, user agent, or VPA, for example, to resolve the conflict between the task/event behavior and the purpose/anti-purpose(s) (block 1424) and proceeds to block 1426. If the task/event behavior matches a purpose that is permitted by the component rule set (block 1416), the method 1400 proceeds to block 1426. At block 1426, the platform/system 100, 800 logs the task/event information and the result of the purpose/anti-purpose analysis (e.g., the purpose result 746), and determines whether to permit (e.g., without a purpose context), purpose permit (e.g., endorse the task with a purpose context) or deny the task/event (block 1428). As used herein, "purpose permit" may refer to, among other things, the platform/system 100, 800's ability to enable task/events with a purpose context that is not necessarily restrictive. For example, in some embodiments, the purpose context can serve as (and encapsulate) both a simple or fine grain (restrictive) description of the accepted task/event and/or as a guarantee of security by providing a digitally signed security context (e.g. token implementation).

At block 1426, the determination to permit, purpose permit, or deny the task/event may be based on user input received at block 1424, may be the result of machine learning conducted at block 1426 (e.g., the component purpose or anti-purpose may be modified based on, for example, a prior history of user or task/event behavior), or other criteria. If the platform/system 100, 800 determines that the task/event should be denied, the task/event is ended (e.g., application closed or terminated), at block 1430. If at block 1428 the platform/system 100, 800 determines that execution of the task/event should be permitted without purpose context/enforcement, the task/event is executed (block 1422). If at block 1422 the platform/system 100, 800 determines that execution of the task/event should be permitted, the platform/system 100, 800 may add a permissive/audit caveat to the purpose context and generate an "aggregate" purpose context as described below (modified as needed in accordance with the applicable component purpose(s), resource-specific rule(s), and/or context-specific rule(s)) at block 1418, associate the permitted context with the task event (block 1420), and execute the task/event in accordance with the purpose and context, at block 1422.

If at block 1414 the platform/system 100, 800 determines that the task/event's behavior does not match any of the anti-purposes associated with the component, the platform/system 100, 800 determines whether the behavior of the task/event matches a purpose in the component purpose rule set 726, 854, at block 1416. If there are no rules in the component purpose rule set 726, 854, the platform/system 100, 800 at block 1424 notifies the user that the requested task/event is associated with a purpose that is currently not implemented in the component purpose rule set 726, 854, and follows the path through blocks 1426, 1428, 1430 in a similar manner as described above. In this way, component purposes and rule sets can be dynamically created and modified at runtime, for example in response to component task/events that may not have been anticipated at the time the component was initially purpose-provisioned. If at block 1416 the platform/system 100, 800 determines that the task/event's behavior or purpose corresponds to a rule in the component purpose rule set 726, 854, the platform/system 100, 800 at block 1418 determines and annotates an acceptable operating context for the task/event behavior based on the purpose/anti-purpose rules matched in blocks 1414 and 1416 and any permissive or user resolution events in blocks 1424 and 1426. To do this, the platform/system 100, 800 analyzes the task/event behavior and applies the matching context-specific rules in the component purpose rule set 726, 854. Upon final compilation of the purpose context, portions of the context may include digital signatures from applicable rule matches. As an example, a bank may digitally sign a purpose rule that allows for transactions from a specific resource (account) owner to transfer less than X funds.

In addition, the entire context may be digitally signed as an endorsement of the applicable rules that were evaluated and enforced. This can, for example, provide a form of attestation to a "component resource receiver" that the purpose enforcement engine is operating. At block 1420, the platform/system 100, 800 associates the acceptable/approved context determined at block 1418 with the task/event (e.g., by generating a purpose trust token 754, 856). At block 1422, the platform/system 100, 800 executes the approved task/event in accordance with the approved purpose and context, and the task/event ends at block 1430.

The foregoing methods and processes are simplified for discussion purposes, but it should be understood that the computing device/platform 100 and/or the computing system 800 may undertake any of the foregoing methods or processes concurrently or in parallel, e.g., for each of the executing domains 260, 270 and/or any components thereof. For example, the computing device/platform 100 and/or the computing system 800 may perform an analysis of any provisioning triggers 710, 716 that it receives from any or all of the domains 260, 270 or other components 280, in whatever order or sequence they may occur.

Example Usage Scenarios—Componentized Provisioning

Embodiments of the above-described component provisioning techniques can provide dynamic, finer-grained control of components of electronic devices that has many potential applications. For example, some embodiments of the component provisioning subsystem 134, 254, 850 can be used to supplement and extend existing static mobile device policies that are managed by mobile device management services and other third parties to a virtualized, multiple-personality mobile computing platform or mobile virtual appliance. Purposed, component-specific provisioning as described herein is applicable to banking, financial, healthcare, medical, enterprise, and personal applications, among others.

In one example, a bank's mobile banking application includes an account access component for a bank account managed ("owned") by the bank. The component rule set associated with the account access component specifies that the end user cannot directly read or write data to the bank account (e.g., to prevent the user, or someone who has infiltrated the user's device, from attempting to hack into the bank's computing infrastructure). The bank provides a purpose trust token with the account access component when it is purpose provisioned. The purpose trust token may be used as part of the user authentication procedure, and may be unique to user. Further, the purpose trust token maybe only valid on the provisioned device (e.g., the user's device on which the banking application is installed). The token, and its provisioned purposes, may be mapped to only apply to certain bank accounts. Additional restrictive and permissive criteria may also be applied to a token so that, for example, it is only valid when used by a specific user domain (execution environment) or context). Further, the user may customize the token so that different rules apply in different contexts in which the account access component may be used. The user may customize the token so that his or her retirement accounts may be only be accessed with permission to read general information, and so that write or transaction access is denied unless the user is a trusted party, such as a fiduciary or wealth manager appointed by the user.

In another example, a user may customize a purpose trust token so that only certified medical professionals may unlock medical records stored on the user's mobile device. Further, a user's customized purpose trust token may permit only certain trusted parties (e.g., a beneficiary or appointed fiduciary) to access a living will or power of attorney stored on the user's device. Similarly, the user may create and share purpose trust tokens to allow only certified law enforcement officers to access the user's driver's license stored on the user's mobile device, or to allow only certified customs officers to access passport information. In some cases, tokens may have time or persistence limitations (e.g., tokens may expire after passage of a defined amount of time).

In still another example, purpose trust tokens may be used to control third party accesses to social media pages. Purpose trust tokens may be established so that third party logins to, e.g., FACEBOOK or LINKEDIN, permit the user's identity to be verified, but deny access to the user's entire Facebook profile.

Other applications of the foregoing provisioning techniques can be applied to smart appliances, mobile virtual appliances, etc. In a "smart home" environment, many traditional but now networked/smart appliances and devices (such as entertainment systems, home security systems, heating and cooling systems, kitchen appliances, clocks, vehicles etc.) can communicate with and thus be controlled by mobile electronic devices. For example, a home entertainment system may be purpose provisioned by the user's mobile device to be permitted to use the mobile device's music player application (e.g., ITUNES) and denied access to all other applications on the mobile device. Similarly, a home refrigerator may be purpose provisioned to be permitted to communicate grocery inventory data (e.g., RFID-tagged goods located in the refrigerator) to a grocery application on the user's mobile device, but denied access to all other applications on the mobile device. Such networked appliances and other devices may be provided with purpose trust tokens to continue to access their provisioned resources on the mobile devices long as the trust tokens are valid.

In still other applications, purpose trust tokens may be used to establish and rescind and transfer real time control of systems under control of the computing device. In systems where the mobile computing device may serve as a real time controller for networked or connected systems such as robotics, strategic unmanned aerial vehicles (SUAVs) and machine systems.

Policy Arbitration Subsystem

Figure 15:
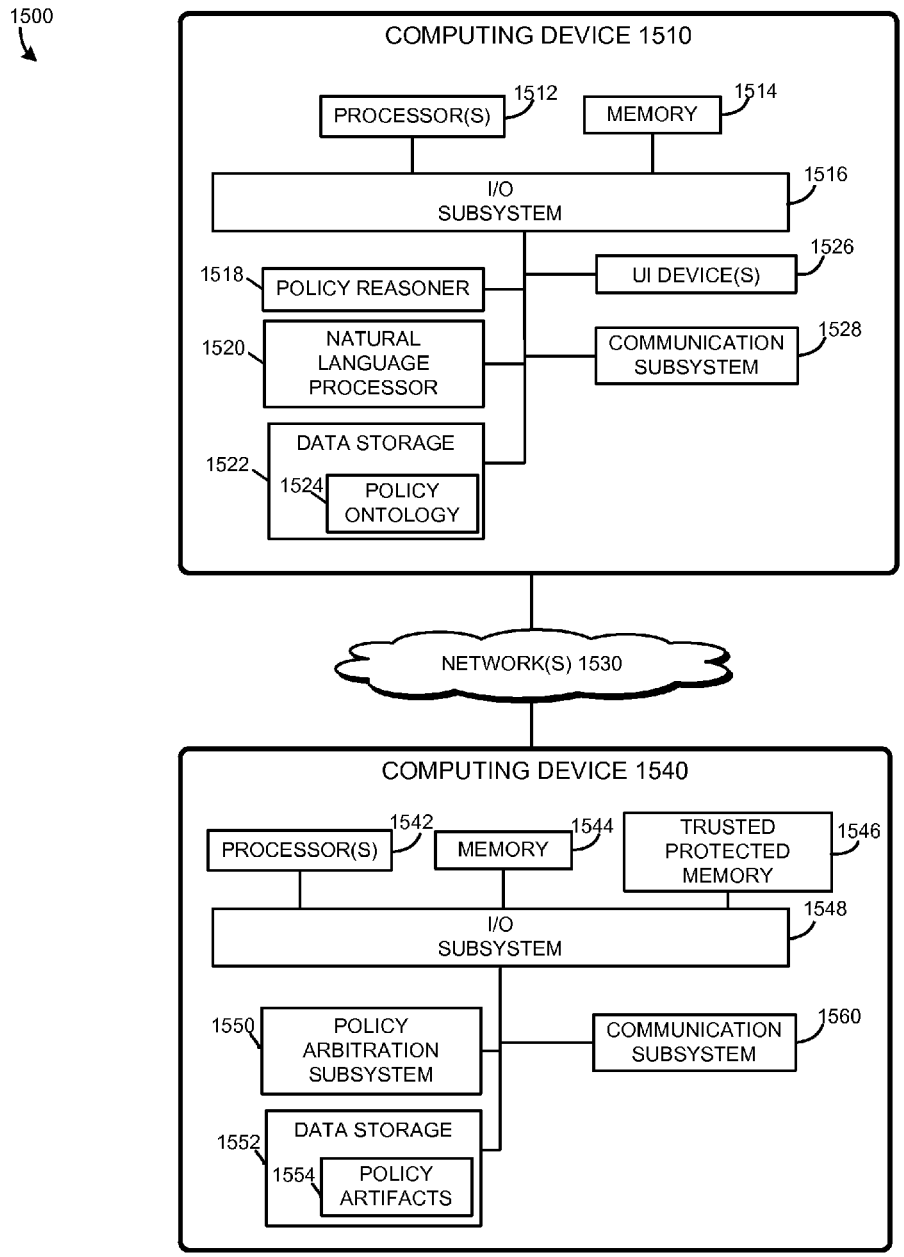
FIG. 15 is a simplified block diagram of at least one embodiment of a networked computing system, including a policy reasoner and a policy arbitration subsystem as disclosed herein.

Referring now to FIG. 15, an illustrative computing system 1500 includes a policy reasoner 1518 embodied in a computing device 1510, and an embodiment of the policy arbitration subsystem 1550 embodied in another computing device 1540. The computing devices 1510, 1540 are at times in communication with each other via one or more networks 1530 (i.e. during provisioning, policy updates, and status reporting back to the component provisioning subsystem 254). For example, the network(s) 1530 may communicatively couple the computing devices 1510, 1540 to each other and/or to other computing devices and/or systems by, for example, a cellular network, a local area network, wide area network, personal cloud, virtual personal network (VPN), enterprise cloud, public cloud, and/or public network such as the Internet. The illustrative computing devices 1510, 1540 and the network 1530 are depicted in simplified form for ease of discussion. It should be understood that either or both of the computing devices 1510, 1540 may be configured in a similar manner to the computing device/platform 100 and have one or more similar components thereto. For example, the computing device 1510 and/or the computing device 1540 may include all or a subset of the components of the computing device/platform 100. In general, the components of the computing system 1500 having similar or identical names to components shown in FIG. 1 and/or described above may be embodied in a similar fashion to the corresponding components described above. As such, reference is made here to the foregoing description and such description is not repeated here.

Referring now more specifically to FIG. 16, the illustrative policy arbitration subsystem 136, 256 is embodied as a number of computerized modules that, in some embodiments, may exist within an isolated domain (e.g., APIs, physics-based controls, etc., as mentioned above) that utilize the policy artifacts 1554 as described in more detail below. The illustrative policy arbitration subsystem 256 is embodied as a policy manager 1610, which includes a policy provisioning module 1612, a least restrictive conforming policy (LRCP) engine 1616, a policy arbitrator 1620, and an event trigger handler 1622. The policy provisioning module 1612 creates and maintains a policy pool 1614, which includes or contains references to the policy artifacts 1554 of all of the domains 260, 270 that have been successfully provisioned on the computing device/platform 100. The policy pool 1614 may be implemented as, for instance, a database, table, linked list, or similar suitable data structure. The LRCP engine 1616 applies conflict detection and solution finding algorithms to the policy pool 1614 to determine the active device policy 1618. The policy arbitrator 1620 more or less continuously applies the active device policy 1618 to the current operating context of the computing device/platform 100 and re-engages the LRCP engine 1616 as needed to handle changes to the policy pool 1614 caused by domain provisioning, policy updates, and domain deprovisioning. The policy event handler 1622 (discussed in more detail elsewhere in this document) receives and analyzes domain triggered events 1640 and/or event triggers 1642 to, among other things, determine if said event will cause an action based on the current active device policy 1618.

Policy "Suite"

Again referring now to FIG. 1, the illustrative policy arbitration subsystem 136 is embodied as software, firmware, hardware, or a combination thereof, to perform policy rule arbitration services during the operation of the computing device/platform 100. In some embodiments, the policy arbitration subsystem 136 comprises a "suite" of computer programming constructs (e.g., both on and off-device.) For example, the policy arbitration subsystem 136 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources. As noted above, embodiments of the policy arbitration subsystem 136 or portions thereof may be implemented in or to control hardware components (e.g., as physics-based policies).

Thus, while not specifically shown in FIG. 1, it should be understood that portions of the policy arbitration subsystem 136 can reside on other computing devices or computing systems, in some embodiments as a distributed policy system. For example, a portion of the policy arbitration subsystem 136 may be local to the computing device/platform 100, while another portion may be distributed across one or more other computing systems or devices that are in communication with the computing device/platform 100 by one or more electronic communication networks, via communication subsystem 158, for example. In other embodiments, the policy arbitration subsystem 136 may be located entirely on the computing device/platform 100.

Policy Artifacts

As mentioned above, in some embodiments, each domain 260, 270 or other components 280, or group of domains or components, has its own defined policy, which may specify, for example, permitted accesses and uses of the various system resources 210 by the domains 260, 270 and/or other components 280 in different contexts. In some embodiments, these "domain-specific" (for ease of discussion) policies are embodied as policy artifacts 1554. The policy artifacts 1554 may be derived from natural language statements, and may include instructions relating to a purpose and an anti-purpose, as described above and in more detail below with reference to FIG. 17.

Policy Triggers

To provide scope for the various actions performed (as described below), embodiments of the disclosed policy arbitration subsystem use event triggers created by processing and monitoring the shared services subsystems described above. In some embodiments, event triggers are provided directly by the trusted domains (e.g., network, I/O, and domain management subsystems). In other embodiments, inline monitor domains can be used to provide trusted triggers. In any embodiment, some examples of triggers include but are not limited to timers, sensor input (i.e. GPS, accelerometer, proximity), I/O (i.e. touchscreen, buttons), network actions (i.e. magic packets, subnet, computer connectivity, WIFI access points), externally networked devices, and events created by the domain management subsystem (i.e. initialization, execution, activation, domain switch). Additionally, the policy artifact of a domain can contain triggers which the user domain can directly trigger (i.e. mode switch). As many triggers have bounded scoped (i.e. a region defined by GPS coordinates, a WIFI AP SSID (Service Set Identifier—e.g., a public name for a wireless network, a IP (Internet Protocol) subnet), mutual exclusive (non-overlapping) regions allows cases where policy restrictions to a trigger source can still allow detection and triggering events in non-restricted regions (as examples are provided below when discussing rule chains). While the interface is similar between these normal event triggers and domain event triggers, there are some differences. For example, in some embodiments the trusted status of the normal event triggers allows the disclosed policy arbitration subsystem to utilize other components within a Trusted Platform Module (TPM) to determine if items are mutually exclusive or not as required by the LRCP engine discussed below. In these embodiments, the policy arbitrator is simplified as it does not need to include the logic specific to each trigger or, discussed next, action. As user domains are part of the TPM, they may not be trusted to perform this logic for the policy arbitration subsystem. Furthermore, the policy arbitration subsystem may not know when the generic domain event trigger is mutually exclusive. As such, mutual exclusivity (or scope reduction) can occur if a domain event trigger cannot be triggered when the domain is not executing.

An example of a domain triggered event 1640 is an event that arises from the operation of a domain 260, 270, such as user-level software 144 executing in a domain requesting access to a system resource 210. As such, domain triggered events 1640 may include, among other things, application or operating system requests to activate the camera, obtain GPS information, send or receive a message, connect to a wireless access point, etc. An example of an event trigger 1642 is an event that arises out of the current operating context of the device, typically independently of any domain or component of the device. Event triggers 1642 may include information that is sensed or otherwise detected or obtained by any of the sensors 152, other peripheral devices 156, or communication subsystem 158. As such, event triggers 1642 may include, among other things, the detection or lack of detection of particular GPS locations, wireless access points, or IP addresses, or the occurrence of an activation or deactivation of a camera, microphone, or other system resource 210. In some instances, event triggers 1642 may be initiated by or result from the activities of a component of the trusted computing base, such as the virtualization service 162 or a shared service 218. For ease of discussion, domain triggered events 1640 and event triggers 1642 may be referred to herein collectively as "event triggers," "events," or "triggers."

Policy Actions

The policy artifacts 1554, 1800 contain rule chains of triggers and actions of different types. Some rules chains (e.g., "disable" actions) may completely restrict access to or use of a system resource 210, at least temporarily while the chain is in effect. Other rule chains (e.g., "filter" actions) may only partially restrict access to or use of a system resource 210. Further, some of the rule chains may be unconditional in that they apply in all circumstances, while others may be conditional, in that they are only enforced in response to a defined trigger event. For example, an artifact 1554, 1800 issued by an "enterprise" domain may contain a rule chain that completely disables a camera feature of the computing device/platform 100 for a "personal" domain when the computing device/platform 100 detects (using, e.g., an integrated sensor 152 or peripheral device 156, such as a GPS transceiver) that the device/platform 100 is at a particular geographic location (e.g., on company property). Similarly, the policy artifact 1554, 1800 issued by the personal domain may contain another rule chain completely disable a microphone of the computing device/platform 100 for the enterprise domain when the user has answered a telephone call in the personal domain. Another rule chain of the enterprise domain issued artifact 1554, 1800 may prevent the personal domain from connecting to a particular IP address when the device/platform 100 is in a particular geographic location (e.g., on company property). Another rule chain of the personal domain artifact 1554, 1800 may prevent the enterprise domain from connecting to the user's home wireless access point when the device/platform 100 is in a particular geographic location (e.g., within range of the user's home). Yet another rule chain of the personal artifact 1554, 1800 may prevent the use of a touchpad of the device/platform 100 for text messaging when the device/platform 100 determines (e.g., using an integrated sensor 152, such as the GPS) that the user is likely to be driving a vehicle.

In addition, the policy arbitration subsystem 256, which arbitrates communication channels, may provide for the downgrading or filtering of information on such channels to different domains. As an example, where the computing device/platform 100 captures GPS data, the policy arbitration subsystem 136 may permit the computing device/platform 100 to send highly accurate geographic location values to a security-vetted domain, but only permit the computing device/platform 100 to send rough approximations of the same geographic location information to un-vetted third party domains. Other sensors and data types can also benefit from the arbitration of content downgrading by performing similar per-domain resolution adjustments and other data manipulations.

Rule Chains, MPR, and MRR

To do this, the illustrative policy arbitration subsystem 256 stipulates that each domain's policy artifact includes a number of policy implementation options 1 to N (where N is any positive integer), as well as a set of minimum domain provisioning requirements 1630 and a set of derived minimum runtime requirements 1632. In general, the minimum provisioning requirements 1630 comprise essentially non-optional domain provisioning policies; e.g., conditions that must be satisfied in order for a domain to be successfully provisioned on a device both in terms of functionality and security requirements. For example, an enterprise domain may have a domain policy minimum provisioning requirement (MPR) that the device have access to GPS information. If an attempt is made to policy provision the enterprise domain on a device that does not have GPS capabilities, the MPRs will instruct the policy provisioning module 1612 that the policy provisioning attempt should fail, unless the MPRs are flagged as suggested or optional (as discussed later). Another example is a requirement that the policy artifact be updated by a certain event or time deadline to ensure a given domain's policy is regularly updated. Should the deadline expire, this MPR could trigger the domain to delete itself from the device. MPRs can also be hardware or platform requires such as non-bypassable DIT (Data-in-Transit) and DAR (Data-at-Rest), hardware encryption, or high-security key storage.

Similarly, the minimum runtime requirements 1632, derived from the active policy implementation selected from the policy artifact, comprise essential runtime policies; e.g., conditions that must be satisfied in order for a domain to be permitted to execute on a device. For example, a financial services domain may have a minimum runtime requirement (MRR) that no other domain can have access to or use any camera of the device while the financial services domain is running. If an attempt is made to launch the financial services domain while another domain is running that has access to the camera(s) of the device, the MRRs will instruct the policy arbitrator module 1620 that the financial services domain cannot run until the other domain is deactivated or releases access to the camera. Some other examples of system resources 210 that may be the subject of minimum runtime requirements include network services (which may be required to, for example, enable MDM services) and memory devices (which may be required to, for example, store and provide digital certificates or authentication keys). As with the MPRs, there may be some instances in which MRRs are flagged as suggestion or optional as the lack of the requirement will provide a degrade user experience but still fulfilling the security requirements. Like the above MPR example regarding a policy artifact to be updated by a deadline, a MRR could instead just not allow a domain with an expired policy artifact to execute or simply display a dialog every time the domain is activated.

Figure 18:
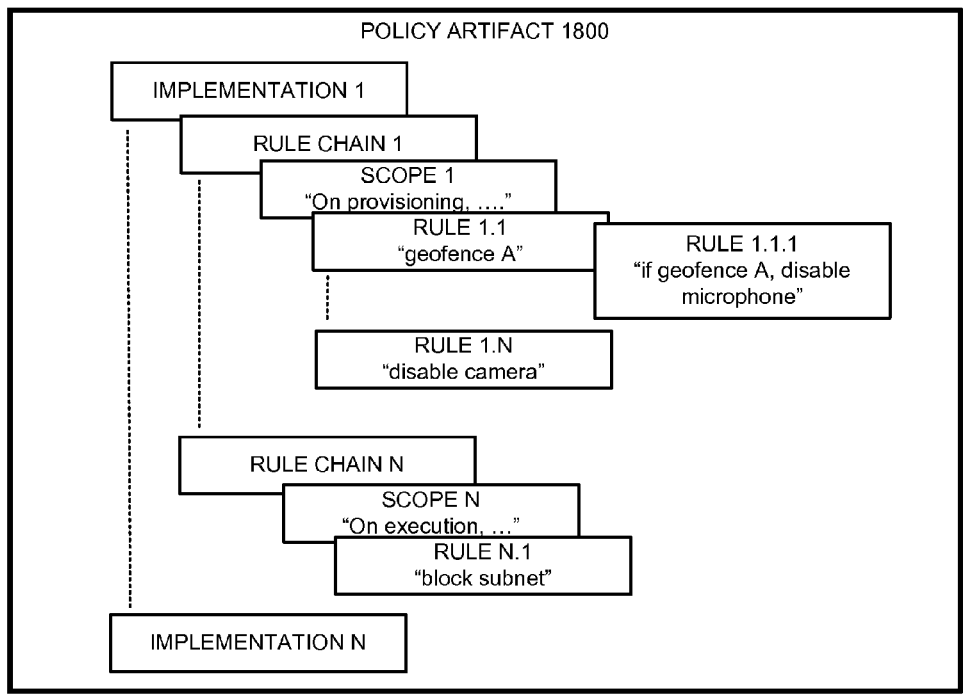
FIG. 18 is simplified illustration of at least one embodiment of a policy artifact as disclosed herein.

Referring now to FIG. 18, a simplified embodiment 1800 of the policy artifact 1554 is shown. The policy artifact 1800 comprises a number of policy implementation options (1 to N). Illustratively, the implementation option 1 includes a number of rule chains (1 to N), where each rule chain includes one or more scope conditions and one or more rules triggered by each scope condition. The policy implementation options allow the policy arbitration subsystem 256 to seek the least restrictive conforming policy across all of the policy provisioned domains on the device, and the rule chains enable the policy arbitration subsystem 256 the flexibility to tailor the least restrictive conforming policy to the current device context. Through the rule chains, the implementation options can specify, implicitly or explicitly, their requirements. For example, "Enterprise" may wish to block other domains from accessing a given subnet when connected to the corporate network. One implementation option could block said subnet whenever "Enterprise" can connect to a known corporate server thus may require the device to be capable of pinging the subnet address. However, an implementation option that stipulates, "block if connected to access point" may achieve the same end result without requiring the ability to ping the subnet, and can thus circumvent attempts to disable pinging. As an example, the rule chain 1 specifies a scope requirement "on provisioning," meaning that the rule chains 1.1 and 1.N are to be enforced when the domain is policy provisioned. Thus, in this example, the affected device is to geo-fence an area A and disable the device's camera when the domain is policy provisioned (where "geo-fence" may refer to a system-defined geographical area or the perimeter of such an area, which may be predefined or dynamically-generated). As a result, such geo-fencing and disabling of the camera may occur even if the domain is not currently executing on the device.

The rule chain 1 contains a second level, rule 1.1.1, which specifies that if A is geo-fenced, then the device's microphone is to be disabled. As such, disabling the microphone need only occur if the geo-fence condition is already met. Further, the rule chain N is implicated on execution of the domain and calls for blocking a subnet upon domain execution. As such, the subnet need only be blocked if the domain is executing (and not, for example, if the domain is merely policy provisioned, initialized, or has been deactivated). In this way, the rule chains allow for finer granularity and context-dependency of restrictions on the use of system resources, and for the release of restrictions when the conditions giving rise to the restrictions cease to exist.

Suggested, Optional Policy Requirements & Policy Overrides

At times, the stakeholder of a policy artifact may want to provide a suggested ability be present for the functionality the paired user domain. For example, in order for the "Entepriseˮ e-mail to function, the user domain needs access to the corporate mail server at a given address. If for some reason said server address has been restricted by another, pre-policy provisioned domain, this would cause a conflict that would prevent the successful policy provisioning of the "Enterprise" domain. As e-mail access may only be one of many features provided by the "Enterprise" domain, the stakeholder may simply make this a suggested or optional requirement. Should this policy be used, a warning may be displayed to the user notifying them of the functionality reduction, and the user may be allowed to override the conflict, thus allow the domain to be policy provisioned.

Cross Domain System Resource Sharing

In embodiments where the policy artifacts 1554, 1800 are policy provisioned per user domain and the user domains are unaware of the other domains on the device, a number of apparent limitations may appear should a stakeholder wish to have more than one domain on a device. For example, if a domain stakeholder desired to prevent "all other domains from accessing subnet A" in both domains, then domain 1 would prevent domain 2 from having access to subnet A and domain2 would likewise prevent such access by domain 1. To account for this, embodiments of the policy artifacts can be signed with an asymmetric key and the stakeholders can "share" a resource (i.e. network) with those domains having a matching key. In embodiments where policy artifacts are not shared with other domains, the policy arbitration subsystem may perform the comparison of keys and internally bond the specified resource of user domains with a successful match.

Policy Creation, Deployment, and Management

One application of the disclosed suite of utilities is in the enterprise BYOD market, corporations and other employers can configure a user domain with all of the tools and shortcuts required by their employees, along with the policy required by the corporation. As corporations often have different stakeholders (e.g., divisions, departments, job roles) for each employee, some embodiments of the policy arbitration subsystem may be dynamically configured for per-employee customization based upon roles, responsibilities or other factors. In such a system, stakeholders may contribute high-level policies to a corporate database. With each change to the policy storage database, an automated system updates all policy artifacts for the employees affected by the change. For example, if a certain department adds a requirement for a given IP address, then the policy artifacts for all employees of that department will be automatically updated as well. In turn, this may queue a policy artifact update (either by direct or private "domain store") for any employee that had previously policy provisioned a device.

Another application of the disclosed policy arbitration suite is to create general purpose, ready-to-use user domains as well as purpose-specific mobile appliances. In these applications, policy artifacts may be generic across users and the more generic, public "domain store" option for policy provisioning may apply. While a general purpose "personal" user domain may have very little included in its policy artifact, other embodiments, such as a financial institutions mobile appliance, may include heavy restrictions and requirements for privacy and security.

Policy Creation

Referring now to FIG. 17, an illustrative method 1700 for generating a policy artifact is shown. The method 1700 may be embodied as computerized programs, routines, logic and/or instructions executed by the computing device/platform 100 or by the computing device 1510 (by the policy reasoner 1518, for example). At block 1710, the method 1700 is initiated by the receipt by the device/platform 100, 1510 of an electronic communication containing a request or trigger to generate or update a policy (e.g., a domain-specific policy). In response to the request or trigger, the device/platform 100, 1510 identifies the relevant stakeholders. Such stakeholders may include, for example, the various internal organizations of the domain owner (e.g. division, department, job title, user-specific information). To enable the lookup of applicable stakeholders, identifying information of the end user may be contained in the request or trigger communication, or may be provided electronically by the stakeholder in response to the device/platform 100, 1510's acknowledgment of the trigger, for example.

At block 1712, the device/platform 100, 1510 obtains one or more conversational natural language expressions of a purpose or policy for a domain. As described above, the device/platform 100, 1510 may invoke a virtual personal assistant-type application to engage the stakeholder in a person-device conversational dialog exchange to obtain the needed information about the domain and the desired purpose or policy for the domain. At block 1714, the device/platform 100, 1510 derives the policy purpose and anti-purpose from the natural language expression(s) obtained at block 1712. As mentioned above, the "purpose" of a domain may include an expression of some beneficial activity that is desirable for the domain to perform, while the "anti-purpose" may include an expression of a harmful or potentially harmful activity that is desired to be precluded when the corresponding purpose is enabled. For example, a "purpose" may be expressed as "allow the enterprise domain to connect to the corporate subnet when I am on company property" while a corresponding anti-purpose may be to "prevent the personal domain from connecting to the corporate subnet."

In different embodiments, the policy reasoner 1518 may have a number of different front end interfaces that will help gather policy context, which may be used to create the policy artifact 1554. Such front end interfaces may include, for example, a natural language parser, a step-by-step wizard-based solution, or direct definitions. In any case, the policy reasoner 1518 can process the high-level, descriptive details about policy requirements and policy enforcement environment(s) (e.g., what could be used to define "work resources" for a particular user or to detected when the user is at "work"), derive the policy purpose and anti-purpose, and then convert these into a policy artifact 1554, which contains multiple implementations based on various options presented by the architecture and policy enforcement environments. The context provided by using high-level descriptions and overview of the enforcement environment(s) allow the various implementation options to handle possible resource restrictions that may be imposed by another domain that is already policy provisioned on the device/platform 100, 1510.

To derive the purpose and anti-purpose, the device/platform 100, 1510 applies the policy ontology 1524 to, for example, determine relationships between the stated purpose or policy and purpose/policy/anti-purpose information contained in or referenced by the policy ontology 1524 and/or an associated knowledge base (which may include, for example, searchable database tables populated with specific data values, rules, and/or computer instructions that relate to natural language statements) and thereby map elements of the natural language expression to elements of the policy ontology 1524 and/or associated knowledge base. At block 1716, the device/platform 100, 1510 generates or updates (as the case may be) the domain policy artifact 1554, which, as discussed above, may include a number of policy implementation options. To do this, the device/platform 100, 510 again refers to the policy ontology 1524 and/or an associated knowledge base to map the derived purpose and anti-purpose to their corresponding machine-readable semantic representations, instructions, and/or data values. The new or updated policy artifact is then stored in a suitable data structure, e.g. a searchable database, in persistent storage, such as the data storage 1552.

In another embodiment of the computing system 1500, the policy reasoner 1518 is in communication with a natural language processor 1520, which applies a policy ontology 1524 to natural language policy or purpose input of a user to derive therefrom one or more policies, purposes, and/or anti-purposes to be implemented on the computing device 1540 by the policy arbitration subsystem 1550. That is, the policy arbitration subsystem 1550 is extended by the policy reasoner 1518 to facilitate policy generation by one or more stakeholders (e.g., the domain owners various organizations that apply for the end user). For example, in some embodiments, the policy reasoner 1518 is embodied as (or as a component of) a "virtual personal assistant," which can engage a person in a natural language dialog to achieve the goal of developing a policy for the computing device 1540 or a component thereof. Such a virtual personal assistant may be embodied as a computerized application that employs natural language processing (NLP) and/or natural language understanding (NLU) techniques to interpret natural language input (e.g., conversational input or dialog, including spoken natural language dialog) received by one or more user interface devices 1526 (e.g., a microphone, keypad, etc.), and generate a machine-readable semantic representation of the user's intended meaning of the natural language input. The machine-readable semantic representation of the user's natural language policy or purpose statement may be stored as a policy artifact or set of policy artifacts 1554, which may be embodied as machine-executable rules and/or computer program logic statements, for example.

Some aspects of virtual personal assistants, all or portions of which may be used in connection with or to implement one or more aspects of the policy reasoner 1518, are described in at least the following patent applications of SRI International: Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" and Kalns, et al., U.S. patent application Ser. Nos. 13/891,858 and 13/891,864, both filed May 10, 2013, both entitled, "Rapid Development of Virtual Personal Assistant Applications."

Briefly, the conversational (e.g., unstructured) natural language policy or purpose inputs are received and processed by, for example, a user intent interpreter module of the natural language processor 1520 or the policy reasoner 1518, which analyzes the input and formulates therefrom a likely intended goal or objective of the user with regard to establishing a purpose or policy for the computing device 1540 or a component thereof (e.g., a domain 260, 270). Such a goal or objective may be referred to as a "user intent." In some embodiments, the user intent may be formulated as an intermediate structured representation of the conversational natural language input. For example, if the natural language policy statement includes the phrase, "Enterprise domain needs exclusive use of camera when I am on company property," the corresponding user intent may be formulated as, e.g., a combination of structured statements such as "DisableCamera (All_Other_Domains, Company_Location)." The policy reasoner 1518 analyzes the natural language input and/or the user intent as needed, and based on its analysis, executes one or more "task flows" (e.g., machine-executable routines) to generate the policy artifacts 1554. For example, the "Disable Camera (All_Other_Domains, Company_Location)" may be translated to a series of lower-level machine-executable instructions that can be executed by the policy arbitration subsystem 256 to assure that except for the enterprise domain, no other domain can use the camera when the computing device is located on company property. Furthermore, as the "Company_Location" could be defined as one or a combination of several different sensors (i.e. geo-fenced region, Wi-Fi AP SSID, NFC or BLUETOOTH trigger based on using device for site access), or user contextual operation (e.g., business functions performed on site, etc.), several compliant implementations can be formulated and included in the single policy artifact in case some devices have been restricted via other domain policies.

Where spoken natural language is used to input a policy or purpose statement, the user intent interpreter module analyzes the words and/or phrases produced by, e.g., an automated speech recognition (ASR) system, which, generally converts speech to the corresponding text (e.g., words and phrases). In this case, the user intent interpreter module may apply, for example, a rule-based parser and/or a statistical parser to determine, based on the verbal context, the likely intended meaning of spoken words or phrases that have multiple possible definitions (e.g., the user may have intended the word "net" to mean "Internet" or "subnet," or something else, depending on the context). An illustrative example of a natural language understanding component that may be used in connection with or as a part of the user intent interpreter module is the SRI Language Modeling Toolkit, available from SRI International. In some embodiments, the user intent interpreter module combines the likely intended meaning, goal, and/or objective derived from the natural language input as determined with any multi-modal inputs (e.g., GPS location, etc.) and the policy reasoner 1518 synthesizes the combination of natural language inputs and other multi-modal inputs to generate the policy artifacts 1554.

The policy ontology 1524 is embodied as, for example, a database or knowledge base, which defines semantic relationships between various natural language terminology and their machine-readable counterparts. For example, the policy ontology 1524 may define "corporate subnet" as referring to one or more specific internet protocol (IP) addresses associated with a company network, or may define "my house" as referring to a specific wireless access point, or may define "all social media" as a list of social media sites/services (e.g., FACEBOOK, TWITTER, LINKEDIN, TUMBLR, etc.). In this way, the policy ontology 1524 facilitates not only policy creation but also policy maintenance, in that changes made to the ontology 1524 can be automatically propagated to policy artifacts 1554 that reference the ontology 1524. Moreover, device-specific configuration details can be reflected in the ontology 1524, thereby allowing just the ontology 1524, and not the individual domain policies, to be updated in response to device, operating system, or software upgrades. Also, as mentioned earlier, the policy ontology 1524 can reference to a set of options used to create policy artifacts and multiple implementations of compliant policies.

Domain & Policy Provisioning

Where multiple domains exist on a device, the policy arbitration subsystem 256, the policy manager 1610, or more particularly the policy provisioning module 1612, is charged with ensuring that domains 260, 270 can only be policy provisioned or executed on the device if their policies can function compliantly without invalidating the requirements (and thus social contract) of the policies of other provisioned domains. However, in some cases, the policy manager 1610 may permit a domain to be policy provisioned on the device even if its policy has an unresolvable conflict with other existing domain policies but MPR requirements are still met. In other words, the domain may be policy provisioned, but not permitted to load or execute.

To perform its policy-mediating functions, the policy arbitration subsystem 256 maintains a global set of policy artifacts 1554, 1800, which may be referred to herein as an active device policy 1618 (FIG. 6). In some embodiments, the active device policy 1618 comprises a least restrictive conforming policy global set of policy implementation, as described in more detail below. The active device policy 1618 is dynamic in that at any given time, it reflects the set of policy rules that are currently active (e.g., actively being enforced) on the device/platform 100. As described in more detail below, the policy arbitration subsystem 256 continuously updates the active device policy 1618 as it receives domain triggered events 1640 and event triggers 1642 from the various domains 260, 270 or the trusted computing base (e.g., the shared services 218 or the virtualization service 212).

The policy artifacts 1554, 1800 may be embodied as computer readable instructions, directives, or statements that are submitted to the policy arbitration subsystem 256 from time to time by the policy provisioning subsystem of the various domains 260, 270, independently of one another and typically without knowledge of the policies of the other domains 260, 270, to define permitted and unpermitted accesses and uses of one or more of the system resources 210 by one or more of the domains 260. As such, the policy artifacts 1554, 1800 may affect the ability of any of the domains 260, 270, including the domain that issued the artifact 1554, 1800, to access and use a system resource 210. However, the policy artifacts 1554, 1800 may be specifically designed to protect the interests of the particular domain that issued the artifacts 1554, 1800 and its associated assets (e.g., data that is stored on the device/platform 100, 1510 or accessible to the device/platform 100, 1510 via the artifact-issuing domain), without regard to the other domains. Thus, some of the policy artifacts 1554, 1800 may be implicated only when the issuing domain is running on the computing device/platform 100, 1510 while others may be effective even if the issuing domain is not executing or active.

Figure 19:
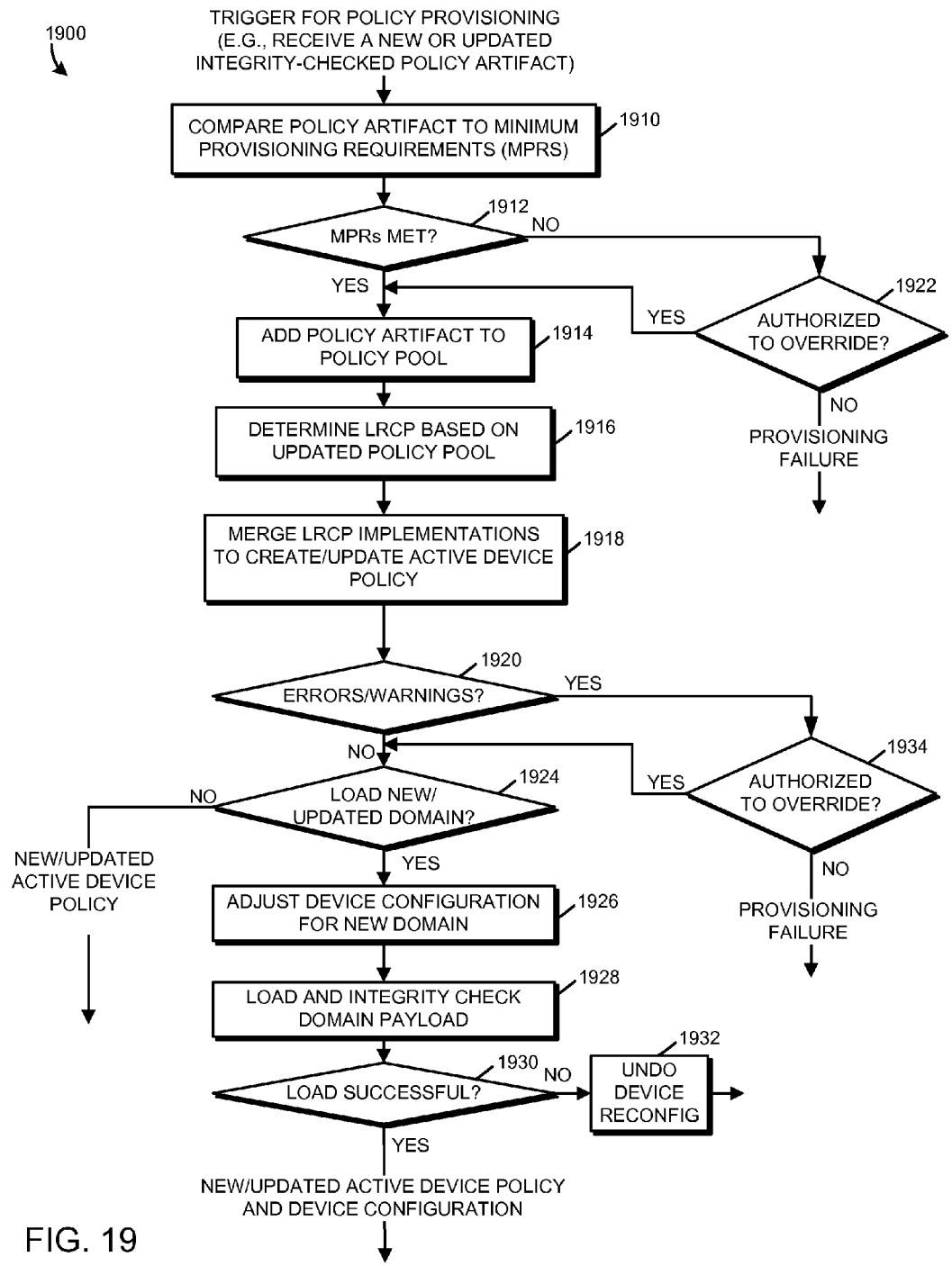
FIG. 19 is a simplified flow diagram of at least one embodiment of a method for policy provisioning of a computing device as disclosed herein.

Referring now to FIG. 19, an illustrative method 1900 for performing policy provisioning is shown. The method 1900 may be embodied as computerized programs, routines, logic and/or instructions executed by the computing device/platform 100 or by the computing device/platform 1510 (by the policy provisioning module 1612, for example). At block 1910, the method 1900 is initiated by the detection of an electronic communication comprising a request or trigger to start policy provisioning for a domain. For example, the method 1900 may be initiated by the policy provisioning module 1612 upon receipt of a new or updated ("candidate") policy artifact (which may have been integrity-checked) from a domain. At block 1910, the device/platform 100, 1510 compares the new or updated policy artifact to the minimum provisioning requirements for the domain, described above. If the candidate policy artifact does not satisfy the minimum provisioning requirements, the device/platform 100, 1510 determines at block 1922 whether the unsatisfied MPR can be overridden. If the unsatisfied MPR cannot be overridden, the domain policy provisioning fails and the method 1900 ends. If the unsatisfied MPR is permitted to be overridden (e.g., flagged as optional or suggested), the method 1900 proceeds to block 1914.

At block 1914, the MPR-approved candidate policy artifact is added to the policy pool 1614. The update to the policy pool 1614 triggers a re-determination of the least restrictive conforming policy, which occurs at block 1916.

An example of a method for making the LRCP determination is described in more detail below with reference to FIG. 10. Once the LRCP for all of the possible policy implementations 1626, 1628 in the policy pool 1614 has been determined, they are merged to update the active device policy 1618, at block 1918. The algorithms performed at blocks 1916, 1918 are designed to result in the reconciling of the new or updated policy artifact with all of the other domain policies existing on the device, so that none of the policies violates the requirements (or social contract) of any of the other domain policies, with, in some cases, the exception of those flagged as optional by the domain owner and stakeholders.

At block 1920, however, the device/platform 100, 1510 determines whether the merging of the LRCPs was successful; that is, whether the new or updated policy artifact can be reconciled with the policy artifacts in the existing active device policy 1618, or whether the requirements of the new or updated policy artifact conflict with other aspects of the existing active device policy 1618 in a way that cannot be resolved by, for example, adopting a different policy implementation 1626, 1628. If a conflict between the new or updated policy and the existing active device policy cannot be resolved in a manner that conforms to all of the domain policies, a notification is generated (e.g., an error or warning message). At block 1934, the device/platform 100, 1510 determines whether the conflict can be overridden in a similar manner as described above. If the conflict cannot be overridden, the policy provisioning process ends unsuccessfully and the policy artifact is rejected. In some embodiments, rejection of the new or updated policy artifact may require that the requesting domain not be policy provisioned on the device. If the conflict can be overridden, the new or updated policy artifact is accepted into the active device policy 1618, and if not already policy provisioned, the domain may be policy provisioned on the device. In some cases where a conflict is overridden, the domain may be policy provisioned but with restrictions that allow it to exist without conflicting with any of the other domain policies. For example, the domain may be permitted to load, initialize, or execute, but not as a background process (e.g., it can only be used "active") and only when other domains are not executing or active.

Referring to block 1924, the device/platform 100, 1510 determines whether to load a new or updated domain on the device in accordance with the policy artifact as accepted by the device/platform 100, 1510. Such may be the case if the trigger for initiating domain policy provisioning is the receipt of a new or updated policy artifact for a domain (or version thereof) that does not already exist on the device. If only the policy artifact for the domain is updated and not the domain itself, the method 1900 ends with the creation of the new or updated active device policy 1618. If the domain issuing the policy artifact needs to be loaded or updated on the device, the method 1900 adjusts the device configuration (e.g., a list of all domains policy provisioned on the device) to include the new or updated domain at block 1926, and loads and integrity checks the domain payload (e.g., the operating system, applications, or other components of the domain) at block 1928. Integrity checks as mentioned in the context of the method 1900 may be performed by, for example, the integrity verification subsystem 252, described above. At block 1930, the device/platform 100, 1510 determines whether the new or updated domain has been successfully loaded and if so, the method 1900 ends with the generation of the new or updated active device policy 1618 and the new or updated device configuration. If the new or updated domain is not successfully loaded, the device reconfiguration is reversed at block 1932 (e.g., the domain and its associated policy artifact are removed from the device configuration and from the active device policy 1618.

The LRCP engine 1616 considers the available implementation options 1626, 1628 for each domain and develops the active device policy 1618 by selecting implementation options for each domain that effectuate the purpose or policy of each domain without conflicting with the other domain purposes or policies. The event trigger handler 1622 may, in some cases, re-engage the LRCP engine 1616 from time to time to reconfigure the active device policy 1618 as may be needed in response to event triggers 1642 caused by changes in the policy pool (e.g., policy provisioning, policy update, deprovisioning).

Figure 20:
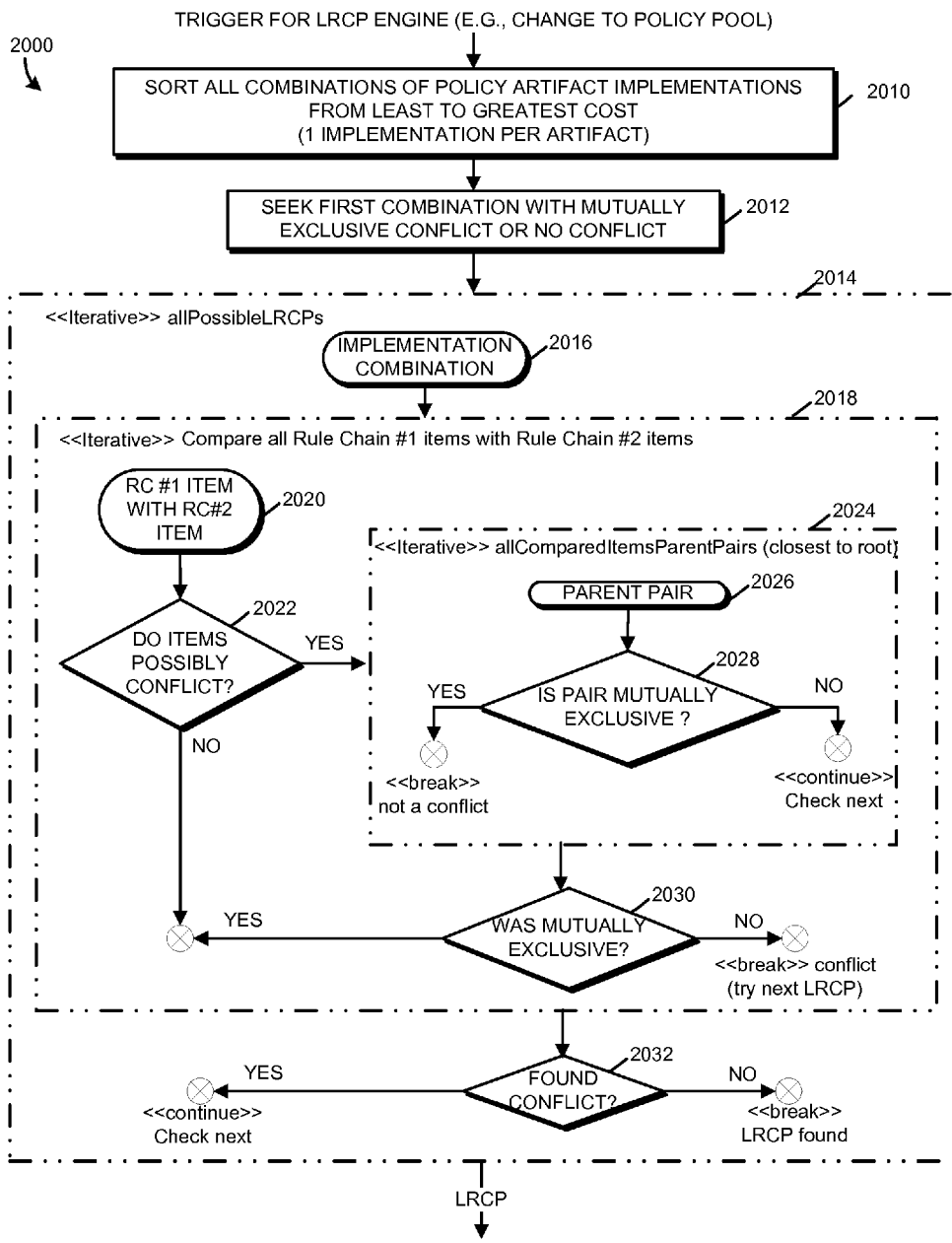
FIG. 20 is a simplified flow diagram of at least one embodiment of a method for determining a least restrictive conforming policy as disclosed herein.

Referring now to FIG. 20, an illustrative method 2000 for generating a least restrictive conforming policy is shown. The method 2000 may be embodied as computerized programs, routines, logic and/or instructions executed by the computing device/platform 100 or by the computing device 1510 (by the LRCP engine 1616, for example). At block 2010, the method 2000 is initiated by an electronic communication such as a notification that the policy pool 1614 has been updated with a new or updated policy artifact. The device/platform 100, 1510 begins by selecting the lowest cost implementation for each policy artifact and sorting all of the combinations of policy implementations (e.g., implementations 1626, 1628) from the set of policy artifacts from least to greatest cost. This enables the device/platform 100, 1510 to consider the lowest cost implementations first, and only consider higher cost implementations if an unresolvable conflict is found in the lower cost implementations. "Cost" as used herein, may refer to a measurable parameter that may be reflected in a data value that is assigned or associated with each implementation 1626, 1628. For example, a lower cost may indicate a less restrictive policy option and vice versa.

At block 2012, the device/platform 100, 1510 begins the process of iteratively seeking the first (e.g., lowest cost) combination of policy implementation options (e.g., "candidate" implementation options) that do not conflict or whose conflict is mutually exclusive. "Mutually exclusive" as used herein refers to policy conflicts that occur in different contexts and thus, are not true conflicts. For example, two domains may have policy rules that specify "when I am active, I have exclusive access to the microphone." Initially, these rules appear to conflict. However, further analysis of the rule chains may indicate that one of the domains can only be active when the other domain is not active. Thus, the conflict is mutually exclusive and the combination of the two policy implementation can be acceptable to both domains.

The iterative loops 2014, 2018, 2024 illustrate that each rule chain of each candidate implementation of each policy artifact of each domain is pairwise compared to determine whether a conflict exists, starting with the lowest level of each rule chain (blocks 2020, 2022). If no conflict is found at the lowest level of the rule chains being compared, the loop 2018 exits and the loop 2014 continues with examining the next rule chain combination in the current implementation combination. If the individual rule chain items being compared at block 2020 do potentially conflict, then the loop 2024 is initiated to backward-traverse the next-lowest level in each of the rule chains being compared (the parent pair 2026). If the comparison of the parent pair indicates that the lower-level pair conflict is mutually exclusive, the loop 2024 exits and the loop 2018 continues on with examining the next rule chain combination in the current implementation combination. If the comparison of the parent pair does not indicate mutual exclusivity, then the next lowest level parent pair is checked for mutual exclusivity. In the loop 2024, the rule chains are backward traversed until either mutual exclusivity is found or there is no higher level in the rule chains to compare. When the loop 2024 exits with a mutually exclusive determination, the loop 2018 moves on to the next comparison of the rule chain items for the current implementation combination. If the loop 2024 exits with a determination that an unresolvable conflict exists, the loop 2014 moves on to a comparison of the next implementation combination.

At block 2030, the device/platform 100, 1510 determines whether the current rule chain combination has a mutually exclusive conflict (or no conflict). If the rule chain combination has a conflict that is not mutually exclusive, the loop 2018 exits and the loop 2014 moves on to the next combination of implementation options. If the device/platform 100, 1510 determines at block 2032 that a mutually exclusive conflict exists between two candidate implementation options, then the method 2000 ends with the found LRCP as the combination of such candidate implementation options. The loop 2014 iterates through all of the available candidate implementation options until it either finds a combination of implementation options that has a mutually exclusive conflict or finds a combination of implementation options that has no conflict. If no such combination is found after all possible combinations have been examined, it is possible that the combination of domain policies may be unacceptable and need to be either rejected or accepted with revisions or acknowledgement of risk.

Policy Enforcement

As described in more detail below with reference to FIGS. 5-9, the illustrative policy arbitration subsystem 256 represents an executing instance of the policy arbitration subsystem 136, which, among other things, defines the protocols for, and in operation (256), regulates the electronic communications between the domains 260, 270 and the virtualization service 212. The policy arbitration subsystem 256, alone or in combination with one or more of the shared services 218, mediates these communications in accordance with security policies that may be specifically applicable to the individual domains 260, 270. Without requiring a priori component policies to be enforced cumulatively or additively at the global device level, the system is enabled to enforce each domain's "purpose" and deny the corresponding "anti-purpose." For example, the policy arbitration subsystem 256 may enforce a domain policy that requires information flow controls to prevent data from a highly secure domain from "leaking" over into another less-secure domain without proper encryption or other filtering (e.g., to prevent private or confidential data from being sent off of the computing device/platform 100 through e-mail or other services without VPN—Virtual Private Network), and a domain policy to prevent multiple domains 260, 270 from using a system resource 210 at the same time. For instance, rather than "summing" all of the domain policies to create a monolithic device policy, the policy arbitration subsystem 256 can enforce only the portions of each policy needing to be compliant according to the current operating context of the device.

As another example, the policy arbitration subsystem 256 may restrict access to particular hardware components by specific domains 260, 270 to deny an "anti-purpose" of the system. In particular, access by a domain 260, 270 to device drivers that control hardware components that are capable of capturing personal or confidential information (like the camera, phone, GPS, and microphone) may be selectively restricted. In other words, the policy arbitration subsystem 256 may not only prevent data from leaking from highly secure to less secure domains, but can also effectively control access to specific system resources based on a security policy or in response to "real-time" information, such as the current geographic location of the computing device/platform 100, the current time of day, and/or other aspects of the current context of the computing device/platform 100 that may be detected, for example, by sensors 152. For instance, the policy arbitration subsystem 256 may enforce a domain-specific access policy that governs the use of a system resource or the transfer of data/content from one domain 260, 270 to another domain 260, 270 based on the time of day, location, or based on a current context captured as a state of the computing device/platform 100.

A component of the policy arbitration subsystem 256 includes the detection of event triggered actions which may have originated from, but are not limited to, a user interaction (i.e. buttons, touchscreen), an environmental change (i.e. sensor change such as location or proximity, network availability or connection), changes in hardware (i.e. enabling or disabling of hardware components, battery state, physics-based policy), or system operation (e.g., policy provisioning, policy updates). In some cases, policy actions need to be enacted in order to control (i.e. deny, filter, and downgrade) similar items as those detected via triggers. Both of these functions may be provided via trusted components of the platform on device/platform 100. As previously mentioned, in some embodiments, the communication channels between the policy arbitrator 1620 and these trusted components are well-defined and not able to be spoofed or otherwise prevented or modified via an untrusted component. In some embodiments, these tasks can be performed by the virtual service providers 224, 230, 236, 242 of those functions. Other embodiments may use components inline between the main virtual service provider 224, 230, 236, 242 and connected virtual service enabler 262, 272. To minimize the specialized, per-service logic required by the policy arbitration subsystem 256, some embodiments utilize these trusted components to perform the comparison of actions and triggers with others in order to detect conflicts and mutually exclusive scoping, as discussed in more detail below with reference to the LRCP engine algorithm.

In cases where the active device policy 1618 is implicated by a domain triggered event 1640 or an event trigger 1642, the policy arbitrator 1620 determines an appropriate policy action as specified in the implementation include in the policy artifacts 1554. The policy arbitrator 1620 communicates policy actions 1650 to the affected domains 260, 270 and communicates policy actions 1660 to the affected shared services 218. The policy actions 1650, 1660 generally include messages or instructions that can be interpreted by the recipient (e.g., the domains 260, 270 or the shared services 218) and executed (e.g., by the trusted computing base) in order to control one or more of the system resources 210 to effectuate the policy or policies implicated by the event/trigger 1640, 1642. In some cases, policy actions 1650, 1660 may be embodied as electronic communications between the virtual service providers 224, 230, 236, 242 and/or the virtual service enablers 262, 272.

Figure 21:
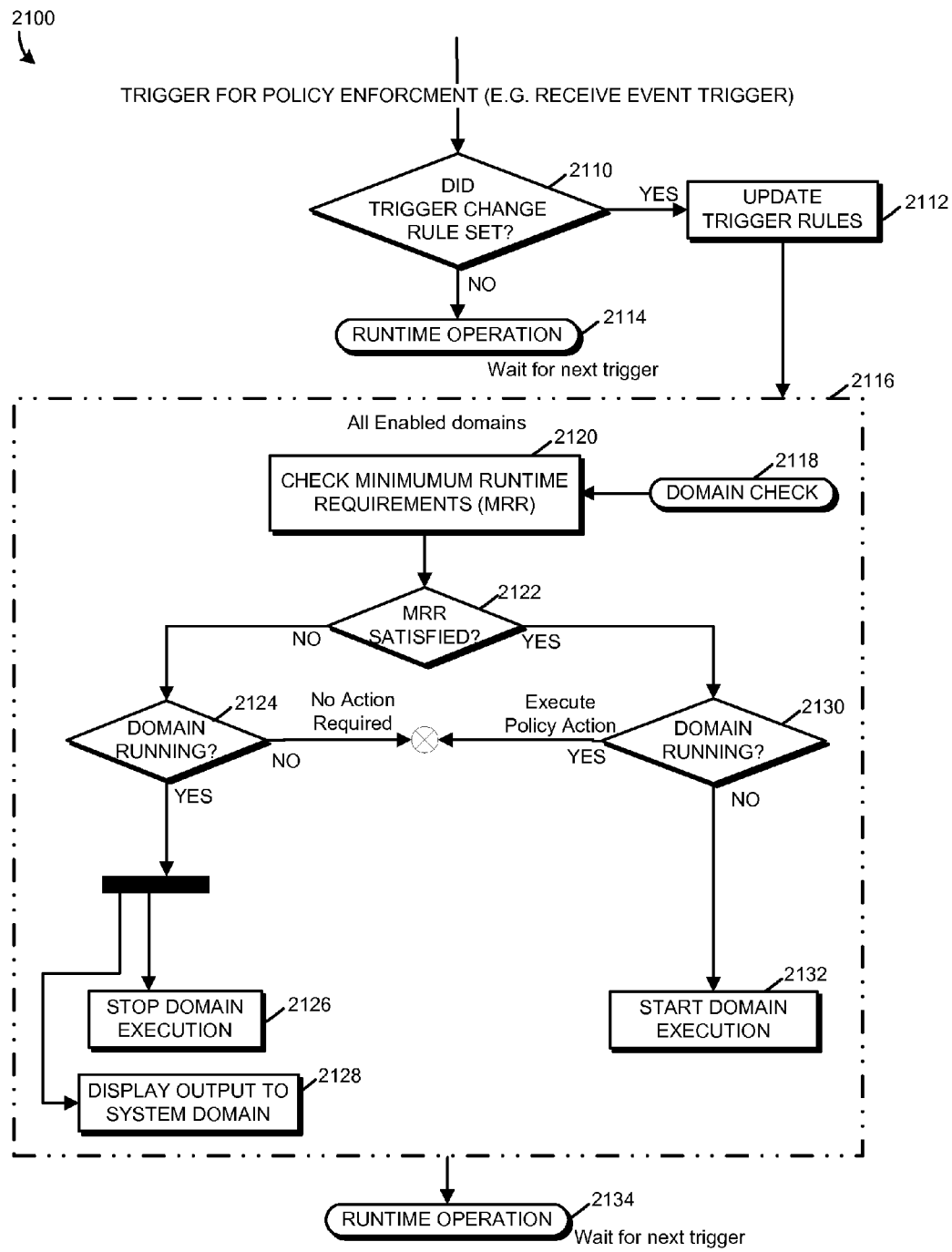
FIG. 21 is a simplified flow diagram of at least one embodiment of a method for handling an event trigger as disclosed herein.

Referring now to FIG. 21, an illustrative method 2100 for enforcing a policy in response to an event (e.g., a domain triggered event 1640 or an event trigger 1642) is shown. The method 2100 may be embodied as computerized programs, routines, logic and/or instructions executed by the computing device/platform 100 or by the computing device 510 (by the policy arbitrator 1620 and/or the event trigger handler 1622, for example). At block 2110, the method 2100 is initiated by an electronic communication indicating a request or trigger for policy enforcement, such as a domain triggered event 1640 or an event trigger 1642. At block 2110, the device/platform 100, 1510 determines whether the trigger causes a change to the current trigger rule set, e.g., the trigger matches the head of an active rule chain. If the trigger changes the current trigger rule set, the device/platform 100, 510 updates the current set of trigger rules accordingly at block 2112 and then initiates the loop 2116, which iterates for all of the domains that are enabled on the device, to determine whether operation of any of the domains is affected by the triggered action(s) completed by the policy enforcement. If the trigger does not change the current trigger rule set, the device/platform 100, 510 continues with normal runtime operation at block 2114. In the loop 2116, each domain is checked beginning at block 2118. At block 2120, a determination is made as to whether the domain's minimum runtime requirements are still satisfied in light of the occurrence of the triggered action(s). If the domain's MRRs are not satisfied, the device/platform 100, 510 determines whether the domain is currently actively running, at block 2124. If the domain is not currently running, no action is required with respect to that domain, and the loop 2116 proceeds to evaluate the next domain. If the domain is currently running, the device/platform 100, 510 stops execution of the domain at block 2126 and displays output to the system domain (or user interface to a limited set of the devices core functions including hardware and software state) to indicate that the domain's MRRs are no longer satisfied, at block 2128. Among other reasons, this can occur due to a required resource being restricted, a domain being disabled, or another system event. If at block 2122 the device/platform 100, 1510 determines that the domain's MRRs are satisfied in light of the triggered action(s), the device/platform 100, 1510 similarly determines whether the domain is currently actively running on the device, at block 2130. If the domain is currently running, the device/platform 100, 510 performs no action, and the loop 2116 moves on to evaluate the effect of the triggered action(s), if any, on the next domain. If the domain is not currently running, the device/platform 100, 510 may begin executing the domain in that its MRRs are satisfied, at block 2132, and the loop 2116 continues on to evaluate the effect of the trigger, if any, on the next domain. This particular event can happen when a domain is marked as enabled, as such event may act as a trigger in the platform's policy. When all of the enabled domains on the device have been evaluated as described above, the device/platform 100, 510 continues runtime operation until the next trigger, at block 2134.

Example Usage Scenarios—Policy Arbitration

Embodiments of the above-described policy management techniques can provide dynamic, finer-grained policy control that has many potential applications. For example, some embodiments of the policy arbitration subsystem 136, 256 can be used to supplement and extend existing static mobile device policies that are managed by mobile device management services and other third parties to a virtualized, multiple-personality mobile computing platform or mobile virtual appliance.

In one example, a device/platform 100 includes integrated phone and microphone features. Also, the exemplary device/platform 100 has two domains: a personal domain and an enterprise domain. The personal domain has a domain policy that specifies that the enterprise domain is not permitted to listen in on telephone calls that the user receives when the calls are taken by the user with the device/platform 100 in the personal domain. In the illustrated example, a phone call arrives and the user answers the call in the personal domain. The answering of the call acts as an event trigger. The policy arbitration subsystem receives the event trigger over a well-defined communication channel as described above. The policy arbitration subsystem analyzes the active device policy, and issues a policy action in the form of a disable microphone instruction for the enterprise domain. The policy arbitration subsystem sends the disable microphone instruction to the microphone virtual service provider. The microphone virtual service provider executes the command to disable the microphone only for the enterprise domain. As a result, the user of the device/platform 100 is permitted to talk securely on the microphone in the personal domain without fear that the enterprise domain may also have access to the conversation. When the user ends the personal phone call, the policy arbitration subsystem issues a policy action to the microphone virtual service provider to re-enable the use of the microphone by the enterprise domain. In this way, the static policy of "don't allow the enterprise to listen to my personal calls" is flexibly implemented by the policy arbitration subsystem.

In another example, the device/platform 100 is again policy provisioned with a personal domain and an enterprise domain. Here, the enterprise domain has a local policy that prohibits the user of the device/platform 100 from accessing certain intranet internet protocol (IP) addresses when they are on company property and are not using the enterprise domain. The device/platform 100 has wireless internet (e.g. WIFI) capabilities that allow it to automatically monitor for the presence of WIFI access points in the immediate geographic area. The domain-local policy requires that intranet subnet access is restricted to only the enterprise domain when the device/platform 100 is connected to the company's WIFI access point. Further, the enterprise policy prohibits the employee from recording video, pictures, or audio of proprietary information while on company property. In this case, the event trigger handler of the policy arbitration subsystem detects that the device/platform 100 has connected to the company's wireless access point. In response, the event trigger handler sends policy actions to the virtual service providers controlling the camera, microphone, and intranet access. In this example, a policy action restricts only the personal domain (intranet access) while another policy action restricts all domains (camera and microphone) in response to the trigger event of the user having arrived on company property.

Once the user of the device/platform 100 leaves the company property, the event trigger handler will no longer detect a connection to the corporate wireless access point. In response, the policy arbitration subsystem verifies that no other existing policy artifacts in the active device policy require the restrictions that were required by policy action, and then issues policy actions to the virtual service providers controlling the intranet access, camera, and microphone features of the device/platform 100. In this way, the policy arbitration subsystem selectively controls access to the system resources by multiple different domains.

Suppose that the domain owner in the previous example wants to further ensure no phones are allowed onto the corporate property unless it is assured that the company's policy is enacted on the device (via the enterprise domain). When an employee arrives at work, the device automatically connects to the corporate access point, performs the policy restrictions (i.e. camera and microphone), makes the enterprise domain active (foreground), and for the user to approach the security checkpoint. At this point, the security checkpoint initiates a prompt-response query (via the WIFI connection to the enterprise domain) and a random color, text, or other response is shown to confirm connectivity and the appropriate policies are being enforced. To ensure the user does not deprovision the enterprise domain (and thus policy), some implementations may prevent deprovisioning while on corporate grounds, require GPS access so that the deprovisioning can be reported against the user with their user coordinates via WIFI, or other protective measures. Of course, when the user is away from the corporate grounds, these restrictions are not required and thus are not enforced, thus allowing normal use of the user device/platform 100.

The suite of tools disclosed herein extends to a number of embodiments, platforms, and devices. In this example, the device being shared is a corporate cloud service which may include a server farm, end-user computers, and mobile devices. In this system, domains are created to both host isolated services (based on project, job, other task specific) as well as to provide remote connectivity to said services. The domains may be stored in a private "domain store" hosted on a secure server at the company's facility that provided secure connectivity to the various devices for deployment. Each of these domains includes their own policy artifact with accompanying multiple implementations, which are designed to protect the company's interests. Furthermore, each policy artifact may be created via the summation of all stakeholders' (i.e. company, department, project) requirements as defined to protect the stakeholders' individual interests. In addition to the previously discussed policy requirements (i.e. subnet access and restriction), requirements for performance (i.e. CPU speed, memory, network speed), data security (i.e. site security, data encryption, storage on physically self-destructive drives), and system cohabitation restrictions (i.e. only domains with a key-based shared resources) can also be on the device. These extra restrictions, in addition to the authentication requiring deployment systems, allows domain creators to not have to manually load each device and user, but rather utilize the policy suite and accompanying policy to control the deployment. For example, a mobile device could be allowed to policy provision a highly sensitive piece of information (assuming it met the MPRs), as the company has an assurance that the data is sufficiently protected (e.g., the storage could be physically destroyed should the password be misentered multiple times or the network command to delete ("wipe") is issued.) This can also ease the software management burden in the server farm as the virtualization service can automatically load balance the services based on their performance requirements. Furthermore, high security elements can coexist in the cloud but be limited to highly physically secured servers. By enabling per-domain policy creation, the domain creators, rather than the corporate device managers, can define the domain-specific security requirements for deployment.

The policy arbitration subsystem disclosed herein is by no means limited to benefitting only mobile device applications. For instance, embodiments of the policy arbitration subsystem can be integrated into virtualized personal computer or server farm operating systems (e.g., cloud-based computing services).

Polymorphic Virtual Appliance Rule Set

Referring now to FIGS. 1 and 22-28, the illustrative domain manager subsystem 138, 258 is embodied as software, firmware, hardware, or a combination thereof, to perform domain activation, switching, and deactivation services during the operation of a computing device/platform 100. The domain manager subsystem 138, 258 responds to user-initiated domain triggers 2224 and/or event triggers 2226 by activating and deactivating domains, and by switching from one active domain to another, in accordance with an applicable policy or policies of the computing device/platform 100. As noted above, embodiments of the domain manager subsystem 138, 258 or portions thereof may control or initiate control of shared system resources, including hardware components, in response to a domain activation or deactivation. For example, access to a camera, microphone, or sensor data may be selectively restricted or enabled as part of a domain activation or deactivation handled by the domain manager subsystem 138, 258.

In some embodiments, the domain manager subsystem 138, 258 comprises a "rule set" of computer programming constructs (e.g., both on and off-device.) For example, the domain manager subsystem 138, 258 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources.

The illustrative domain manager subsystem 258 represents an executing instance of the domain manager subsystem 138, which defines rules and specifications for, and in operation (258) controls and manages, the activation and deactivation of the domains 260, 270 globally, e.g., at the computing device level. The domain manager subsystem 258 can, for example, switch operation of the computing device/platform 100 from a highly sensitive domain (e.g., an enterprise domain) to a less-sensitive domain (e.g., a personal/social use domain), or vice versa, in response to a triggering event (e.g., dynamically, or in "real time"). Such a triggering event may include, for example, the receipt of user input such as tactile or speech input, a gesture, a specific software command, a user name and password, etc. The detection of certain inputs from one or more of the sensors 152 may also act as a triggering event. For example, if the computing device/platform 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing device/platform 100.

The domain manager subsystem 258 regulates the activation and deactivation of the domains 260, 270 in accordance with the applicable domain and/or device policies. In response to the activation or deactivation of a domain by the domain manager subsystem 258, access may be restricted to particular hardware components by specific domains 260, 270 to deny an "anti-purpose" of the system or an activated domain. In particular, access by a domain 260, 270 to device drivers that control hardware components that are capable of capturing personal or confidential information (like the camera, phone, GPS, and microphone) may be selectively restricted. In this way, data can be prevented from leaking from highly secure to less secure domains, and access to specific system resources can be controlled based on a policy or in response to "real-time" information, such as the current geographic location of the computing device/platform 100, the current time of day, and/or other aspects of the current context of the computing device/platform 100 that may be detected, for example, by sensors 152.

In addition, communication channels may be controlled in response to the activation or deactivation of a domain, to provide for the downgrading or filtering of information on such channels to different domains. As an example, if a security-vetted domain is activated, the security-vetted domain may be permitted to receive highly accurate geographic location values from a GPS, but other un-vetted domains may be only permitted to receive rough approximations of the same geographic information.

Figure 22:
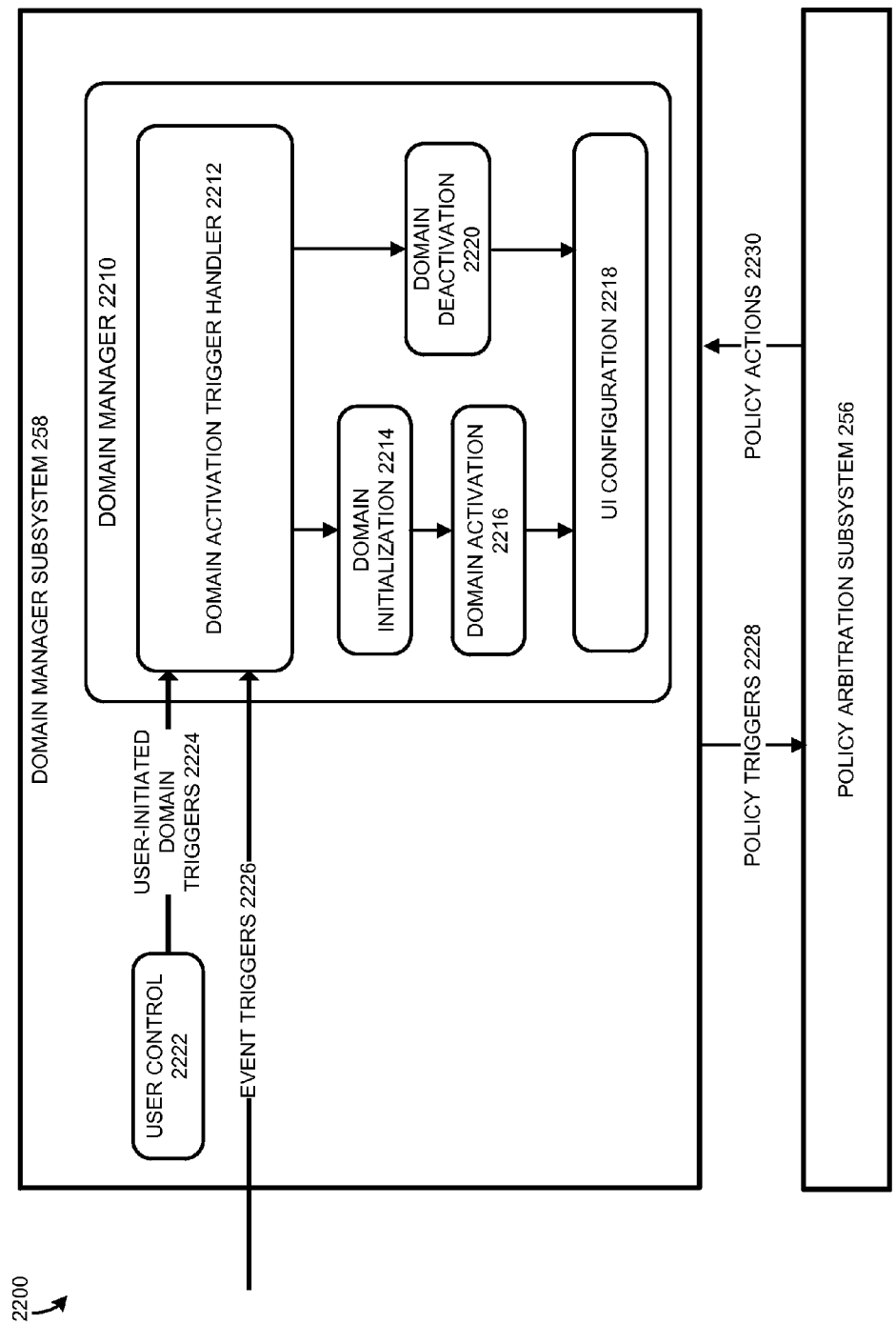
FIG. 22 is a simplified module diagram of at least one embodiment of a domain manager subsystem as disclosed herein.

Referring now to FIG. 22, the illustrative domain manager subsystem 258 is embodied as a number of computerized components or modules that, in some embodiments, may exist within an isolated domain (e.g., APIs, physics-based controls, firmware, etc.) that can dynamically and selectively activate and deactivate domains on the computing device/platform 100, as described in more detail below. As used herein, "activate" may refer to, among other things, the process of launching a domain for execution by the computing device/platform 100, whether as an "active" domain (e.g., where the domain is running in the foreground, enabling user interaction with the domain) or another type of "executing" domain (e.g., where the domain is running as a background process, where user interaction with the domain is not enabled). Similarly, as used herein, "deactivate" may refer to, among other things, the process of temporarily "freezing" execution of a domain or "closing" a domain by ending its execution (whether foreground or background). Where a domain is temporarily frozen by the domain manager subsystem 258 (e.g., as a result of the policy implications of activating another domain), such freezing may be accomplished by, for example, transferring the execution of the domain to a passive or background mode in which the domain is temporarily denied privileges to access and use one or more of the shared system resources 210 in accordance with the applicable policy. Such freezing or deactivating operations may be accomplished by, for example, the domain manager subsystem 258 in communication with the virtualization service 212 or by the domain manager subsystem 258 in communication with one or more of the shared services 218 (e.g., via the policy arbitration subsystem 256).

The illustrative domain manager subsystem 258 is embodied as a domain manager 2210, which includes a domain activation trigger handler 2212, a domain initialization module 2214, a domain activation module 2216, a user interface ("UI") configuration module 2218, and a domain deactivation module 2220. The domain activation trigger handler 2212 communicates with a user control 2222 to receive the user-initiated domain triggers 2224. The domain activation trigger handler 2212 also communicates with, e.g., shared services 218 (such as virtual service providers 224, 230, 236, 242) to receive the event triggers 2226. Further, the domain manager subsystem 258 communicates with the policy arbitration subsystem 256 to receive policy actions 2230 in response to policy triggers 2228, which may be initiated by the domain manager 2210 (e.g., as a result of the activation, initialization, or deactivation of a domain).

The domain activation trigger handler 2212 applies policy rules to the user-initiated domain triggers 2224 and event triggers 2226, to determine whether to activate or deactivate any domains in response to the triggers 2224, 2226, and to determine which, if any, shared system resources 210 need to be controlled in response to the activation or deactivation, as the case may be, of a domain. In the illustrative embodiment, such policy rules are supplied to the domain activation trigger handler 2212 by the policy arbitration subsystem 256 in the form of policy actions 2230. Some techniques for determining policy actions 2230 are described in more detail above and in the aforementioned Forsberg et al., U.S. application Ser. No. 14/052,080.

If a domain is to be activated in response to a trigger 2224, 2226, domain initialization 2214 and domain activation 2216 modules initialize and activate the domain in accordance with the applicable policy of the domain which, in some cases, is combined and reconciled with the policies of other domains on the computing device/platform 100 in a least restrictive conforming way. As described in the aforementioned Forsberg et al., U.S. application Ser. No. 14/052, 080, "least restrictive conforming" may refer to, among other things, a policy that is determined by a process of synthesizing the policies of multiple domains of a computing device such that each domain's respective policy is satisfied in a least restrictive way. To do this, each domain's policy may include a number of different implementation options (e.g., to achieve a particular purpose and prevent an anti-purpose). The different implementation options of the policies may be dynamically selected and implemented, depending on the requirements of other domain policies and/or the current operating context of the computing device/platform 100. If a domain is to be deactivated in response to a trigger 2224, 2226, a domain deactivation module 2220 deactivates the domain similarly (in accordance with the applicable policy of the domain which, in some cases, is combined and reconciled with the policies of other domains on the computing device/platform 100 in a least restrictive conforming way).

The UI configuration module 2218 updates a user interface of the computing device/platform 100 (e.g., a visual display screen) to communicate to the user information relating to domain activations as they occur. Alternatively or in addition, the UI configuration module 2218 may issue audio or tactile notifications, or utilize any suitable means of interacting with a user of the computing device/platform 100 to communicate to the user information relating to the current status of the device in terms of activated and/or deactivated domains, the occurrence of a switch from one activated domain to another, and/or other domain-related information. In some embodiments, a colored border or frame may appear on a display screen of the computing device/platform 100, or the "background" of the visual display may change, to indicate that a domain change has occurred or that a certain domain is active. For example, a red border may indicate that a highly restrictive domain is active, while a green or blue border may indicate that a less restrictive domain is active (where "highly restrictive" or "less restrictive") may indicate the degree to which other domains are prevented from using shared system resources 210 while the domain is running). Some examples of domains that may be considered highly restrictive include mobile virtual appliance applications that are specifically designed to control the operation of or communicate with "smart homes" (e.g., home security systems, consumer appliances, climate control systems, etc.), vehicles, machines, and/or electromechanical devices such as medical devices, physiological monitors, and healthcare equipment, or applications that require access to sensitive information, such as financial, medical, and health-related applications, or domains that are designed for use by children or young adults. Some examples of domains that may be considered less restrictive in the sense that the domains may not require the use of shared system resources 210 to be restricted for other domains while the domain is active include, for example, general-purpose domains and domains that are used primarily for browsing or reading (e.g., Internet surfing, e-readers, etc.), general social media communications, or entertainment.

Figure 26:
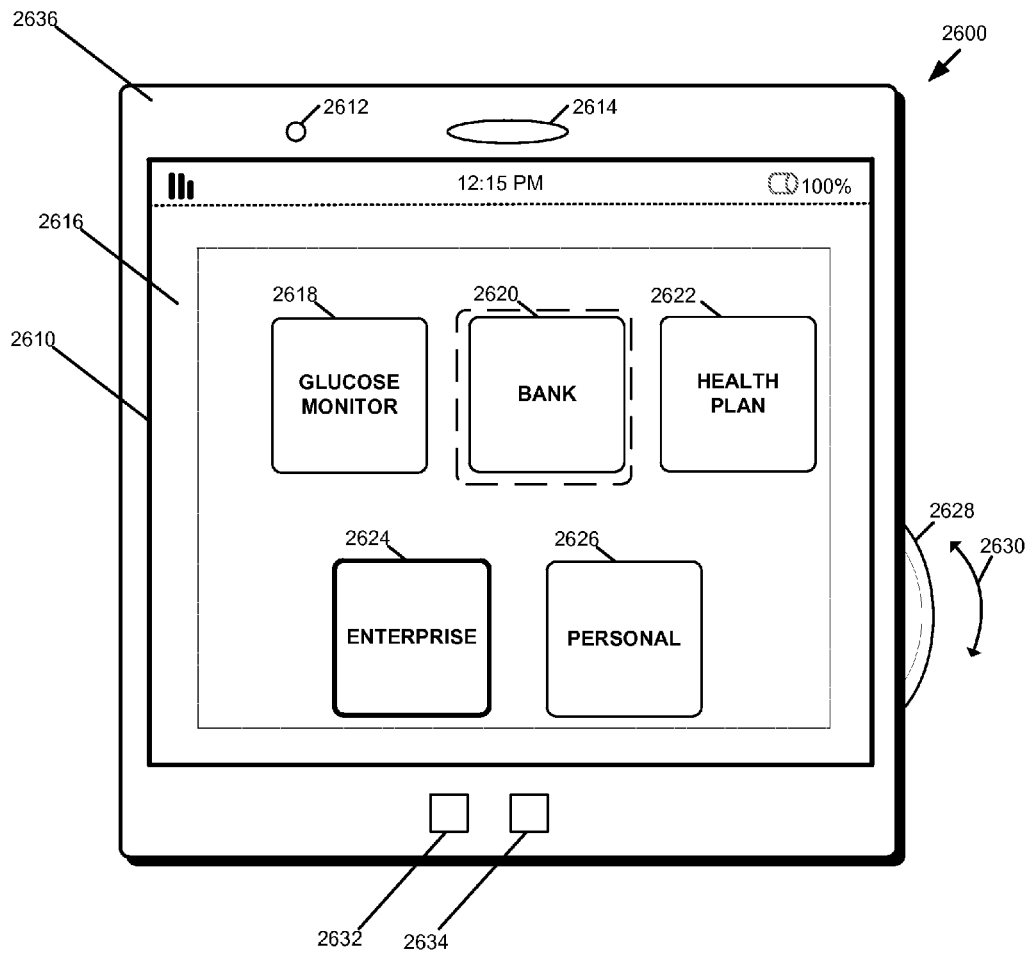
FIG. 26 is a simplified front elevational view of at least one embodiment of a computing device, showing an exemplary display screen and a number of user-selectable elements.
Figure 27:
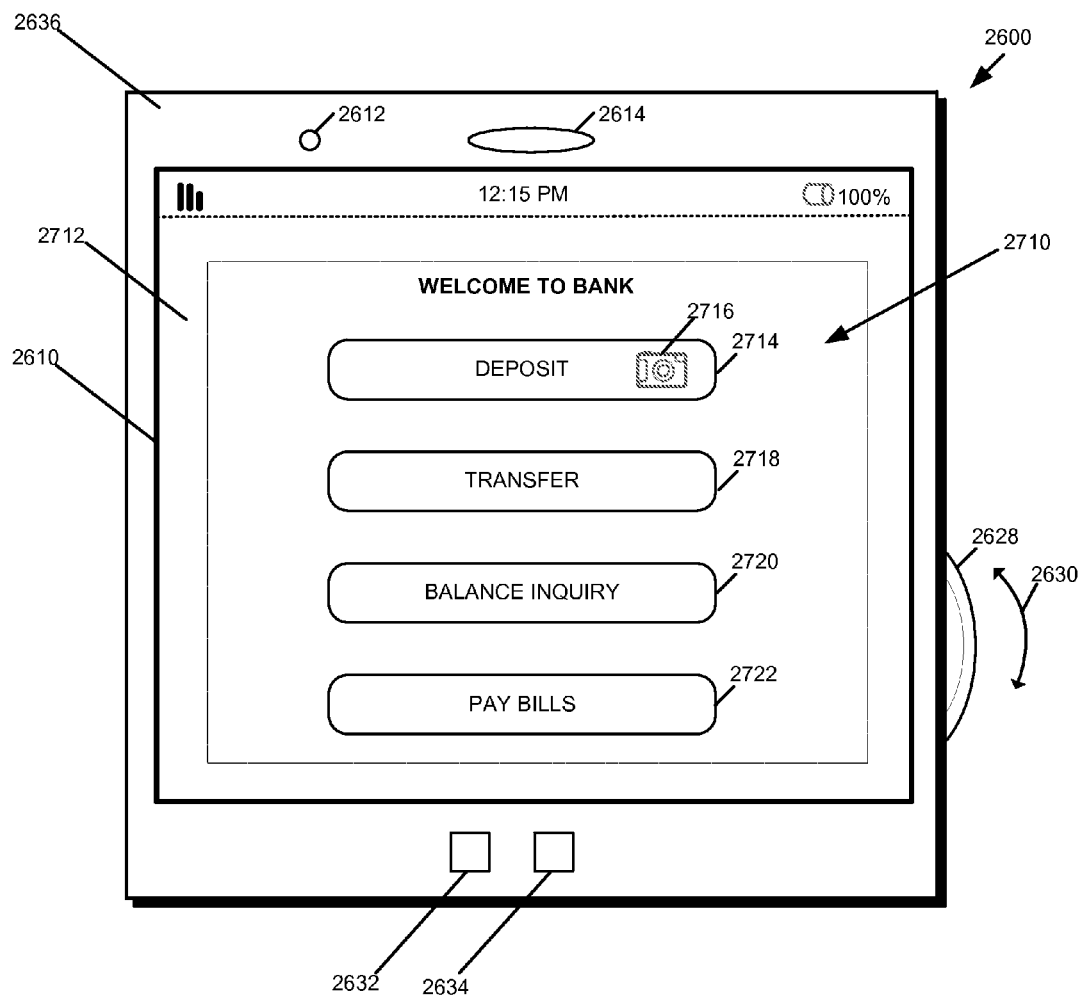
FIG. 27 is a simplified front elevational view similar to FIG. 9, showing an exemplary display screen for a domain and a number of user-selectable elements.

As noted above, such switches from one domain to another may be initiated by the user or by other events detected by the computing device/platform 100. In the illustrative embodiment, a user control 2222 (or a number of user controls 2222) provide the mechanism by which the user may initiate a domain activation or deactivation. In general, the user control 2222 provides a user-authenticated trust path interface in that signals received by the domain manager 2210 from the user control 2222 can be trusted as having been generated in response to input by an authorized user of the computing device and such that the signals generated in response to the user input can be trusted as not having been tampered with in an unauthorized way prior to receipt by the domain manager 2210. As such, the user control 2222 may be embodied as a virtual or physical user touch, tap, or gesture based control, such as a touchscreen graphical control or a physical push button, slide, dial, switch, etc., as a voice-based control (e.g., microphone), or image-based control (e.g., camera detecting facial characteristics, including human eye features and gaze). In some embodiments, software or firmware-based biometric authentication techniques, such as fingerprint recognition, face or iris recognition, or voice biometrics, may be used in combination with the user control 2222 to establish user authentication. Well-defined communication channels as described above may be used to provide the trusted path from the user control 2222 to the domain manager 2210. Illustrative embodiments of the user control 2222 are shown in FIGS. 26-27, described below.

Figure 23:
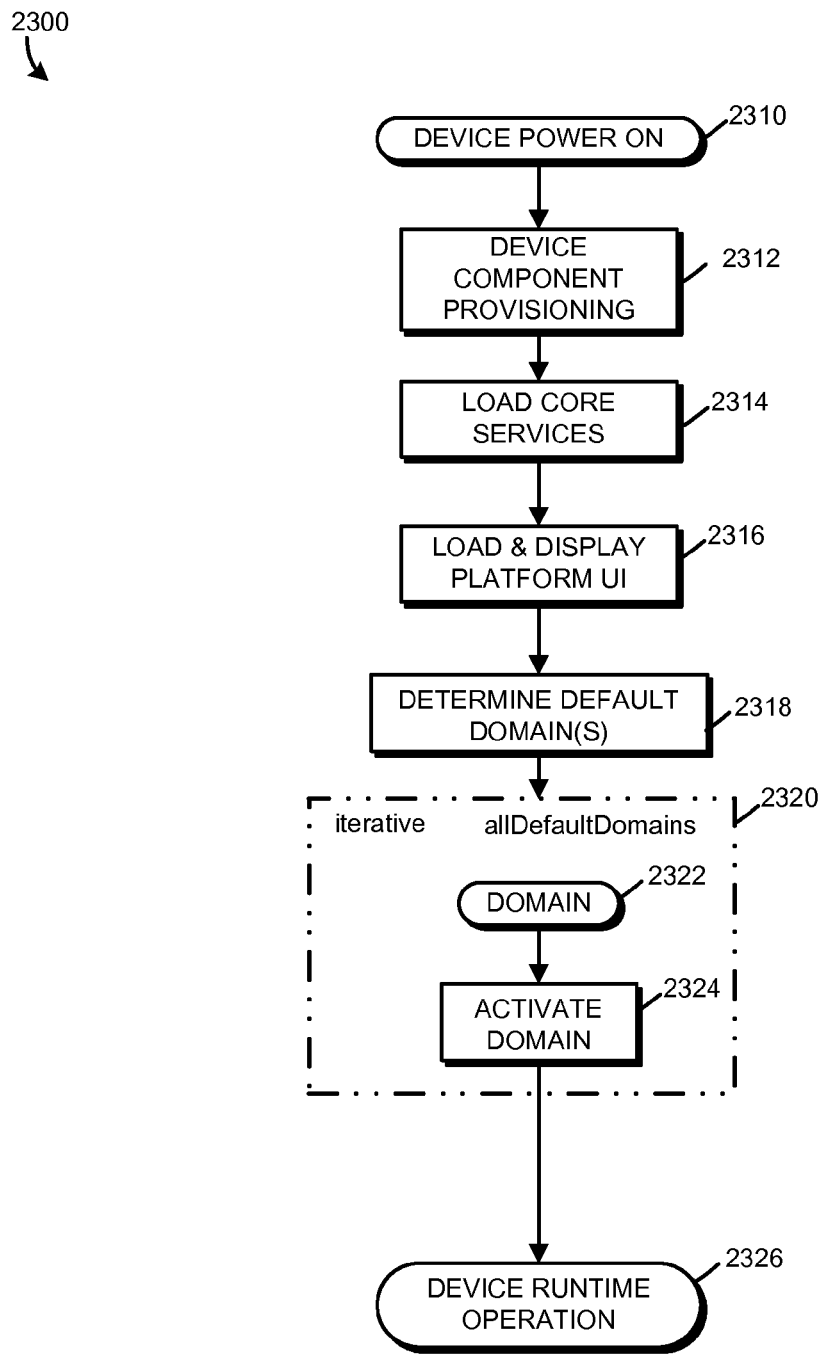
FIG. 23 is a simplified flow diagram of at least one embodiment of a method for starting operation of a computing device with multiple domains as disclosed herein.

Referring now to FIG. 23, an illustrative method 2300 for starting a computing device/platform 100 provisioned with one or more domains is shown. The method 2300 may be embodied as computerized programs, routines, logic and/or instructions executed by the computing device/platform 100 (by the domain manager 2210, for example). At block 2310, the method 2300 is initiated by the power on of the device/platform 100. At block 2312, the trusted computing base of the device/platform 100 (e.g., the virtualization service 212 and/or one or more of the shared services 218) performs component-based purpose provisioning and/or domain policy provisioning to, for example, check and install any updates to the device/platform 100, including any updates to the domains or their respective components, purposes, and/or policies. Some examples of mechanisms for provisioning the device/platform 100 and/or its components are described in the aforementioned Forsberg et al., U.S. application Ser. No. 14/051,080 and the aforementioned Oberg et al., U.S. application Ser. No. 14/051,923.

At block 2314, core services that are needed for the operation of the device/platform 100 are loaded into memory (e.g., memory 112, 124). The core services that are loaded at block 2314 may include, for example, one or more of the virtual service providers 224, 230, 236, 242 and/or one or more of the virtual service enablers 262, 272. For instance, if the device/platform 100 is provisioned with a financial services domain, the financial services domain may require use of the device's camera (e.g., to photograph checks for deposit). As such, a virtual service provider for the access and use of the camera may be loaded at block 2314.

Figure 24:
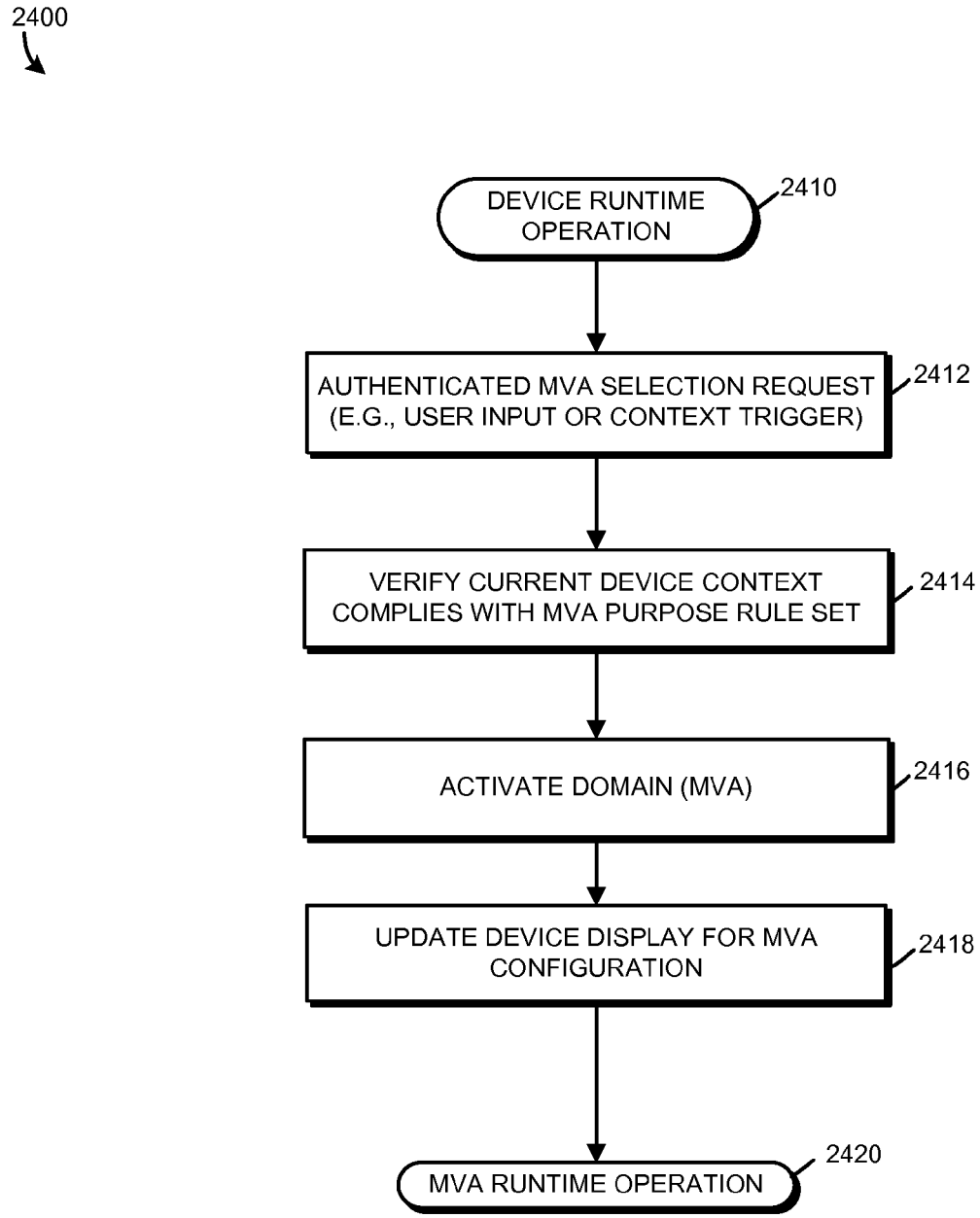
FIG. 24 is a simplified flow diagram of at least one embodiment of a method for activating a domain of a computing device as disclosed herein.
Figure 25:
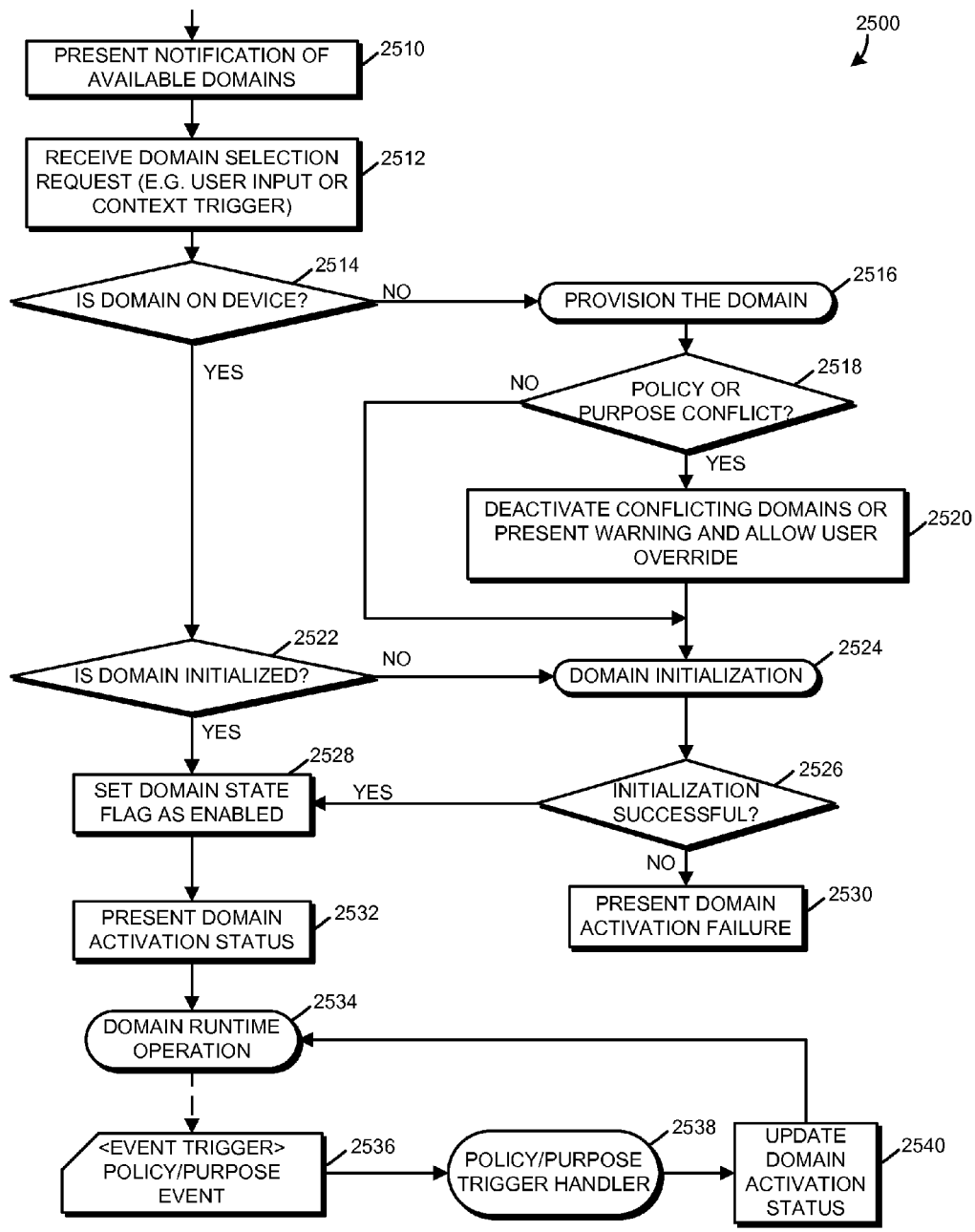
FIG. 25 is a simplified flow diagram of at least one embodiment of another method for activating a domain as disclosed herein.

At block 2316, the device/platform 100 loads the platform user interface into memory and displays the platform user interface on a visual display of the device/platform 100. The platform user interface may display, for example, a splash screen with a logo, and/or a listing of the domains that have been provisioned on the device/platform 100 (but which are not yet active). At block 2318, the device/platform 100 determines the "default" domains; that is, the domains that are to be activated automatically upon start-up of the device (e.g., in the absence of any triggers 2224, 2226 or policy actions 2230 dictating otherwise). Once the default domains are determined, the device/platform 100 enters an iterative loop 2320 to activate each of the identified default domains (blocks 2322, 2324). While illustrated as a loop, it should be understood that the activation of domains may occur concurrently or in parallel rather than sequentially, in some cases. Some examples of procedures that may be executed by the device/platform 100 for activating the domains are illustrated in FIGS. 24-25, described below. Following activation of the default domains, the device/platform 100 begins or resumes normal runtime operation at block 2326.

Referring now to FIG. 24, an illustrative method 2400 for activating a domain, or more specifically, a domain that implements a mobile virtual appliance on a general purpose or multi-purpose device is shown. The method 2400 may be embodied as computerized programs, routines, logic and/or instructions executed by the computing device/platform 100 (by the domain manager 2210, for example). At block 2410, the method 2400 is initiated during device startup as described above, or during normal runtime operation of the device/platform 100 (e.g., by the detection of a trigger 2224, 2226). At block 2412, the device/platform 100 determines that the trigger for domain activation includes an activation request to activate a mobile virtual appliance ("MVA"), where the request has been authenticated. That is, the device/platform 100 has received a request to activate a "mobile virtual appliance" (e.g., a mobile device implementation of a polymorphic virtual appliance) and the source of the request (e.g., a user or a sensing device) has been authenticated. Such authentication may be performed by, for example, the integrity verification subsystem 132, 252. In general, a polymorphic (e.g., mobile) virtual appliance may refer to a type of domain that is configured to cause a computing device to perform a single, dedicated function or set of functions that are related to a single purpose. For convenience, "MVA" may be used herein to refer to such polymorphic (e.g., mobile) virtual appliances. Some examples of polymorphic (e.g., mobile) virtual appliances may include device control applications, such as medical device control applications and/or others. At block 2414, the device/platform 100 reviews the rule set or policy associated with the polymorphic (e.g., mobile) virtual appliance and verifies that the current operating context of the device/platform 100 complies with the MVA rule set/policy. As an example, an MVA rule set for a medical device MVA may stipulate that no other domain can have network connectivity while the medical device MVA is running. As another example, an MVA rule set for a bank MVA may require that no other domain can use the device's camera while the bank MVA is in use, or at least while the "deposit" feature of the bank MVA is in use. If the device's current context violates the MVA's rule set, then appropriate actions are taken by the device/platform 100 to conform the current operating context to the MVA's rule set. This may involve deactivating one or more other domains, partially or fully disabling certain shared system resources 210 for some domains, and/or enabling certain shared system resources 210 for exclusive use by the MVA, as described above.

At block 2416, the selected/requested MVA is activated (assuming access and use of the shared system resources 210 is successfully configured and controlled as required by the MVA's rule set or policy). To do this, the device/platform 100 may launch the MVA, e.g., in a similar manner to which software applications are typically launched or activated by an operating system. In some embodiments, the device/platform 100 may perform policy provisioning on the MVA prior to its activation, as described below with reference to FIG. 8. At block 2418, a visual display of the device/platform 100 is updated (e.g., by changing a border or background color, etc., as described above), or some other action is generated by the device/platform 100, to communicate the activation of the MVA to the user of the device/platform 100. The device/platform 100 continues normal runtime operation, now acting solely as the MVA however (and not as a general purpose device), at block 2420. In this way, the method 2400 can effectively transform the general purpose or multi-purpose device/platform 100 into a specific-purpose MVA, at least temporarily.

Referring now to FIG. 25, another illustrative method 2500 for activating a domain is shown. The method 2500 may be embodied as computerized programs, routines, logic and/or instructions executed by the computing device/platform 100 (by the domain manager 2210, for example). At block 2510, the method 2500 presents a notification of domains that are available for activation to the user (e.g., as a list displayed on a display screen of the computing device/platform 100). In some embodiments, the available domains may include domains that are not yet provisioned on the computing device/platform 100. For example, the method 2500 may periodically "ping" or receive notifications from one or more cloud-based "app stores" or "app markets" as to new or updated domains that are available. At block 2512, the device/platform 100 receives a domain selection or request, which may take the form of, for example, a user-initiated domain trigger 2224 or an event trigger 2226. For instance, the user may select a domain from an app store, or a domain may be selected as a result of a context trigger, such as the detection by the device/platform 100 of a wireless communication with another device (e.g., a WIFI communication from a medical device, a smart TV, or some other networked device).

At block 2514, the method 2500 determines whether the selected/requested domain is already provisioned (e.g., installed and configured for use in accordance with applicable policies) on the device/platform 100. If the domain is not already provisioned on the device/platform 100, policy provisioning and/or component purpose provisioning is performed at block 2516. Some examples of techniques for policy provisioning and componentized purpose provisioning a domain on a device are described above. For example, in some embodiments, the domain's policy may be combined and reconciled with the policies and/or component purposes of other domains on the device/platform 100, or with an existing device policy or component purpose, as mentioned above. At block 2518, the device/platform 100 determines whether any of the selected/requested domain's policy(ies) or purpose(s) conflict with the existing device policy, or with any of the policies or purposes of the other domains on the device/platform 100. The domain's policy or purpose may conflict with another policy or purpose if, for example, both domains require exclusive access to a shared system resource 210 at the same time. If the provisioning 2516 concludes that there are no policy or purpose conflicts, the method 2500 proceeds to block 2524. If the provisioning 2516 concludes that the selected/requested domain's policy or purpose conflicts with one or more other policies or purposes governing the operation of the device/platform 100, the method 2500 may deactivate the domains having conflicting policies/purposes or allow the user (or another higher-privileged authority) to override the conflict (block 2520) and continue with the domain initialization (block 2524). In general, domain initialization involves executing procedures on the computing device/platform 100 to load the domain into memory and make it available for execution.

In some embodiments or contexts of component purpose provisioning, "deactivating" may simply mean the revoking of privileges or security contexts to certain tasks or events, as opposed to stopping execution of the task or event. For example, a domain can be a simple or complex multiple task/event execution environment that may have the ability to be deactivated (e.g. stopped if running, descheduled, or marked as unavailable to run). However, a task/event once purpose permitted/accepted may only be able to be revoked if the security context, purpose trust token etc., has not already left the device/platform's 100 control (e.g. if the security context or component resource has not already been shared/transferred to an external party/network). If the task or event is still being executed on the device/platform 100, the platform could revoke the security context (effectively pulling the rug out from the task/event as it is being processed/handed), but in some cases this may be possible only if the task/event has not been given full access to the security context.

If, at block 2514, the domain is already provisioned on the device/platform 100, the method 2500 proceeds to block 2522, where it determines whether the domain is already initialized. If the domain has not been initialized, initialization is performed at block 2524 as described above. If the domain has already been initialized, or if initialization is determined successful (block 2526), the device/platform 100 sets a domain state flag to indicate that the domain is "enabled" (or activated) (block 2528), updates the domain activation status on the user interface of the device/platform 100 (block 2532), and begins or continues normal runtime operation of the domain (block 2534). If the domain initialization is not successful (e.g., if the domain is not successfully loaded due to an integrity check failure), the domain activation fails and a communication to that effect is generated at block 2530.

During runtime operation of the domain (block 2534), various event triggers 2536 (e.g., policy triggers, purpose triggers, context triggers, etc.) may occur from time to time on the computing device/platform 100. Such event triggers 2536 may include user-initiated and/or system-detected events that implicate one or more of the domain policies and/or component purposes that are currently active on the device/platform 100. Such events may include, for example, connection of the device/platform 100 to a certain wireless access point, location of the device/platform 100 in a geofenced area, or the sending of an electronic communication to a particular email address or to another device. A policy/purpose trigger handler 2538 handles the policy/purpose event triggers 2536 as described above, for example (e.g., policy enforcement and/or purpose enforcement). The handling of policy/purpose event triggers 2536 may involve a change in the status of the domain activation. For example, a policy/purpose event trigger may implicate a policy that requires the domain's access or use of certain shared system resources to be modified, enabled, or disabled, in which case the necessary changes are implemented and the method 2500 returns to block 2534. While not specifically shown, it is of course possible that in some cases, a policy/purpose event trigger 2536 may require the domain to be deactivated.

In these cases, the domain is deactivated, the domain state flag is set to "disabled" (or deactivated), and the domain status is updated.

The foregoing methods are simplified for discussion purposes, but it should be understood that the device/platform 100 may undertake any of the foregoing methods or processes (or blocks or steps thereof) concurrently or in parallel, e.g., for each of the executing domains 260, 270. For example, the device/platform 100 may perform an analysis of any triggers 2224, 2226 that it receives from any or all of the domains 260, 270, in whatever order or sequence they may occur.

Example Usage Scenarios—Polymorphic Virtual Appliance Rule Set

Figure 28:
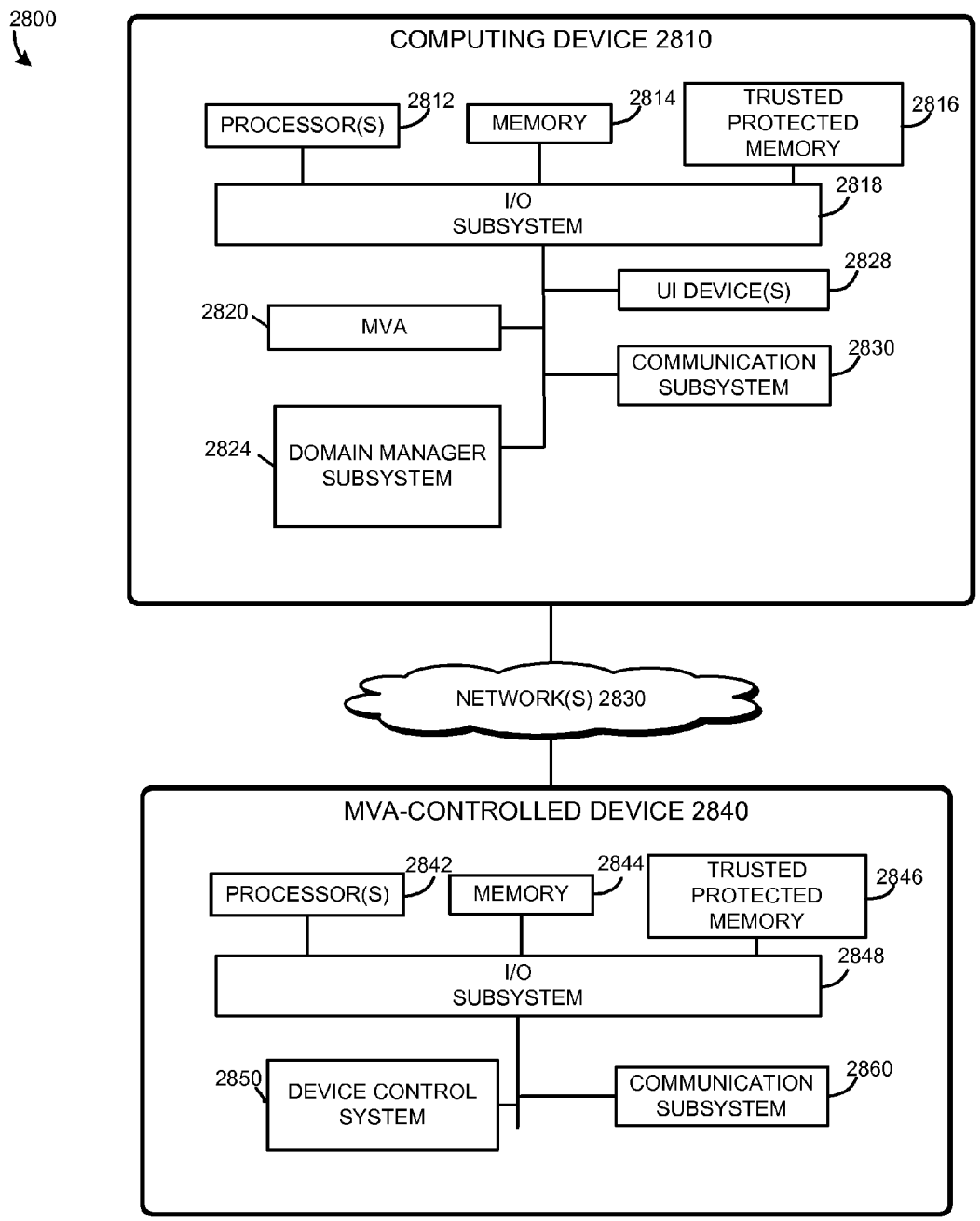
FIG. 28 is a simplified block diagram of at least one embodiment of a networked computing system, including a mobile virtual appliance and an MVA-controlled device as disclosed herein.

Referring now to FIGS. 26-28, embodiments of the above-described domain management techniques can provide finer-grained, context-aware control over the use of shared system resources in response to domain activations and deactivations, which has many potential applications. In FIGS. 26-28, a general purpose or multi-purpose mobile computing device 2600 is embodied to include a housing 2636 (made of a rigid or non-rigid material, e.g., plastic, metal, glass, or a combination thereof). The housing supports a display screen 2610, a number of sensors 2612, 2614 (e.g., optical sensor, microphone, accelerometer, etc.), and a number of user controls 2628, 2632, 2634. In FIG. 26, the display screen graphically displays a frame or border 2616 and a number of user-selectable icons or tiles 2618, 2620, 2622, 2624, 2626. Each of the icons or tiles 2618, 2620, 2622, 2624, 2626 represents a domain that is available for use on the device, and can be selectively activated by the user or by an event trigger. The illustrative user control 2628 is embodied as a rotatable member (e.g., a dial or wheel), which can be rotated in either a clockwise or counterclockwise direction, as indicated by the bidirectional arrow 2630. The illustrative user controls 2632, 2634 are embodied as touch-sensitive buttons (e.g., push buttons). In some embodiments, the user control 2628 is operable to switch between active domains. For example, if the "bank" domain 2620 is activated, rotating the control 2628 in a clockwise direction may operate to deactivate the bank domain 2620 and activate the "health plan" domain 2622. Along with the activation of the domain 2622 and deactivation of the domain 2620, such rotation of the control 2628 also accomplishes the necessary changes to the access and use of shared system resources 210 in accordance with the applicable domain policies (e.g., the policy of the on-coming domain 2622). The user controls 2632, 2634, in some embodiments, respectively enable navigation within an active domain and navigation out of an active domain back to the "home" screen (e.g., FIG. 26).

The frame or border 2616 may be displayed in a specific color or pattern, for example, to indicate the status of the device/platform 100 as having one or more particular domains active. Such display may be dynamically changed as the active domains change. Further, as shown in FIG. 26, the display of certain domains may be configured to indicate the status of the domain. For example, the display of the "enterprise" domain 2624 may be emphasized to indicate that it is currently active, while the display of the "bank" domain 2620 may be displayed with a contrasting-color border (represented by dashed lines) to indicate that it is not currently active, but is currently selected (e.g., by the wheel or dial 2628).

As shown in FIG. 27, selection of the bank domain 2620 (e.g., via the wheel or dial 2628) results in the activation of the bank domain 2620. Activation of the bank domain 2620 transforms the multi-purpose device 2600 into a specific-purpose device or mobile virtual appliance (MVA). That is, while the bank domain 2620 is activated, the device 2600 cannot be used for another purpose, e.g., to access one's health plan or personal domain. Of course, in some embodiments, portions of the device 2600 may still be used for other, limited purposes, in accordance with the applicable policy. For example, the device 2600's phone may continue to receive telephone calls if permitted by the MVA's policy. In accordance with the domain change, the frame or border 2616 is changed to a different color or pattern 2712. Additionally, user-selectable graphical controls 2714, 2718, 2720, 2722 are presented for each of the various domain-specific functions of the bank domain 2620. A camera icon 2716 is displayed in connection with the "deposit" feature 2714 to indicate that use of the device 2600's camera is available when the "deposit" feature 2714 is activated, but not available for any of the other features 2718, 2720, 2722.

Referring now to FIG. 28, an illustrative computing system 2800 includes a mobile virtual appliance 2820 and domain manager subsystem 2822 embodied in a computing device 2810, and a device control system 2850 embodied in another device 2840. In the illustrative embodiment, the computing device 2810 is embodied as a general purpose or multi-purpose mobile computing device (such as a smartphone, tablet, wearable device, etc.), while the computing device 2840 is embodied as an "MVA-controlled device," e.g., another device that is not a general purpose or multi-purpose computing device. The devices 2810, 2840 are in communication with each other via one or more networks 2830. For example, the network(s) 2830 may communicatively couple the computing devices 2810, 2840 to each other and/or to other computing devices and/or systems by, for example, a cellular network, a local area network, wide area network, personal cloud, virtual personal network (VPN), enterprise cloud, public cloud, and/or public network such as the Internet, or by short-range wireless communication (e.g., Near Field Communication or NFC). The illustrative computing devices 2810, 2840 and the network 2830 are depicted in simplified form for ease of discussion. It should be understood that either or both of the computing devices 2810, 2840 may be configured in a similar manner to the computing device/platform 100 and have one or more similar components thereto. For example, the computing device 2810 and/or the computing device 2840 may include all or a subset of the components of the computing device/platform 100. In general, the components of the computing system 2800 having similar or identical names to components shown in FIG. 1 and/or described above may be embodied in a similar fashion to the corresponding components described above. As such, reference is made here to the foregoing description and such description is not repeated here.

The mobile virtual appliance 2820 is embodied as a specific-purpose domain that is configured specifically to control the operation of the MVA-controlled device 2840, as described above. For example, the MVA 2820 may be embodied as a user-level glucose monitor control application 2618, such that when the MVA 2820 is activated on the (general purpose or multi-purpose) computing device 2810, the device 2810 is temporarily transformed into a glucose monitor control capable of interacting with the user only for the purpose of communicating with and controlling the operation of the MVA-controlled device 2840 (e.g., a glucose monitoring device). To do this, the domain manager subsystem 2822 implements the MVA rule set as described above to deactivate any other active domains while the MVA 2820 is activated, and enables exclusive access by the MVA 2820 to the communication subsystem 2830 and UI devices 2828, which effectuate communications between the user and with the device control system 2850. With assurance that the computing device 2810 is only operating as the MVA 2820 during the time that the MVA 2820 is active being provided by, e.g., a MILS-based architecture, the system 2800 allows for, among other things, validation of the MVA 2820 without requiring validation of the entire device 2810.

The domain manager systems disclosed herein are by no means limited to benefitting only mobile device applications. For instance, embodiments of the disclosed domain manager subsystem can be used in connection with, for instance, virtualized personal computer or server-based systems, including "cloud" based computing services.

ADDITIONAL EXAMPLES

In accordance with at least one aspect of this disclosure, a computing device includes a processing unit including one or more hardware processors; a context detector in communication with the processing unit to receive data indicating a current operating context of the computing device; shared system resources in communication with the processing unit, the shared system resources comprising one or more of a telephony subsystem, a camera subsystem, and a network subsystem; machine accessible storage media; and a plurality of well-defined communication channels operably coupling the processing unit with the context detector, the shared system resources, and the machine accessible storage media, wherein the machine accessible storage media has embodied therein: a plurality of isolated independently executable domains, each domain having a domain-specific purpose governing use by the domain of the shared system resources, the domain-specific purpose being different for each of the domains; and wherein the processing unit monitors the current operating context of the computing device and, for each of the domains: enables the domain to use the shared system resources if the current operating context of the computing device does not conflict with the domain's domain-specific purpose; and disables the domain's use of one or more of the shared system resources if the current operating context conflicts with the domain-specific purpose.

The processing unit may maintain data relating to the domain-specific purposes of all of the domains, and, for each of the domains, may enable the domain to use the shared system resources if the current operating context of the computing device does not conflict with any of the domains' domain-specific purposes; and disables the domain's use of one or more of the shared system resources if the current operating context conflicts with any of the domains' domain-specific purpose. The processing unit may modify, without fully disabling, the domain's use of one or more of the shared system resources if the current operating context conflicts with the domain-specific purpose. The processing unit may cause data to be shared by the domain with another entity to be modified before the data is shared by the domain with the other entity, if the current operating context conflicts with the domain-specific purpose. The processing unit may prevent data from being shared by the domain with another domain on the computing device if the current operating context conflicts with the domain-specific purpose. The processing unit may enable data to be shared by the domain with another domain on the computing device if the current operating context does not conflict with the domain-specific purpose.

In accordance with at least one aspect of this disclosure, a method for activating an executable component on a polymorphic computing device, includes, with the polymorphic computing device, receiving data indicating a current operating context of the polymorphic computing device; and, in response to the data: independently of any operating system running on the polymorphic computing device, verifying the integrity of the component; determining a defined purpose of the component; determining an anti-purpose corresponding to the defined purpose of the component; determining if a use of the component in the current operating context is permitted by the purpose; determining if the current operating context enables the use of the component for the anti-purpose; and activating the component on the polymorphic computing device only if the use of the component in the current operating context is permitted by the purpose and the current operating context does not enable the use of the component for the anti-purpose.

The method may include receiving natural language input from a user of the polymorphic computing device, determining the purpose based on the natural language user input, and deriving the anti-purpose from the purpose. The method may include determining if a use of a shared system resource of the polymorphic computing device by the component in the current operating context is permitted by the purpose, determining if the current operating context enables the use of the shared system resource for the anti-purpose, and enabling use of the shared system resource by the component only if the use of the shared system resource by the component in the current operating context is permitted by the purpose and the current operating context does not permit the use of the shared system resource for the anti-purpose. The method may include disabling the use of the shared system resource by the component if the use of the shared system resource by the component in the current operating context is not permitted by the purpose and the current operating context permits the use of the component for the anti-purpose. The method may include determining if a sharing of data by the component with another entity in the current operating context is permitted by the purpose, determining if the current operating context would permit the sharing of the data by the component for the anti-purpose, and enabling the sharing of the data by the component only if the sharing of the data by the component in the current operating context is permitted by the purpose and the current operating context does not permit the sharing of the data for the anti-purpose. The method may include preventing the sharing of the data by the component if the sharing of the data by the component in the current operating context is not permitted by the purpose and the current operating context permits the sharing of the data for the anti-purpose.

In accordance with at least one aspect of this disclosure, a polymorphic computing device includes a processing unit comprising one or more processors; one or more context detectors in communication with the processing unit to receive data indicating a current operating context of the polymorphic computing device; shared system resources in communication with the processing unit; and machine accessible storage media having embodied therein: a plurality of independently executable domains, each domain having a domain-specific purpose governing use by the domain of the shared system resources, and a plurality of components executable within the domain, each component comprising a component-specific purpose governing the sharing of component resources by the component with other components; an integrity verification system to verify the integrity of each of the domains and components independently of any operating system running on the polymorphic computing device; a provisioning system to provision each of the components for use on the polymorphic computing device independently of the provisioning of the other components and according to the component-specific purpose; a policy arbitration system to determine a global policy for use of the shared system resources by the domains, wherein the global policy is a combination of all of the domain-specific purposes that does not violate any of the domain-specific purposes and the policy arbitration system enforces the global policy during operation of the polymorphic computing device; and a domain manager to activate and deactivate the domains on the polymorphic computing device in accordance with the global policy; wherein the processing unit selectively executes the domains, the components, the integrity verification system, the provisioning system, the policy arbitration system, and the domain manager in response to the data indicating a current operating context of the polymorphic computing device.

In the polymorphic computing device both the domain-specific purpose and the component-specific purpose may be defined differently for different operating contexts of the polymorphic computing device. In the polymorphic computing device, the domain-specific purposes may be different for each of the plurality of domains. In the polymorphic computing device the component-specific purposes may be different for each of the plurality of components. In the polymorphic computing device, each domain may have a domain-specific anti-purpose corresponding to the domain-specific purpose, and the policy arbitration system may enforce the global policy to prevent execution of the domain-specific anti-purposes. In the polymorphic computing device, each component may have a component-specific anti-purpose corresponding to the component-specific purpose, and the provisioning system may provision each of the components for use on the polymorphic computing device to prevent execution of the component-specific anti-purpose. The polymorphic computing device may be arranged according to a Multiple Independent Levels of Security (MILS) architecture, where each of the domains is memory-isolated from each of the other domains, and each of the domains communicates with other domains only through well-defined communication channels. The polymorphic computing device may comprise a mobile computing device arranged according to a mobile device virtualization architecture.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated. For instances, features, structures, and characteristics having the same or similar names but shown in multiple figures and/or embodiments with different reference numerals may have any of the features, structures or characteristics of the other similarly-named elements, whether or not explicitly stated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A computing device, comprising:
a processing unit comprising one or more hardware processors;
a context detector in communication with the processing unit to receive data indicating a current operating context of a use purpose of the computing device;
shared system resources in communication with the processing unit, the shared system resources comprising one or more of a telephony subsystem, a camera subsystem, and a network subsystem;
machine accessible storage media; and
a plurality of well-defined communication channels operably coupling the processing unit with the context detector, the shared system resources, and the machine accessible storage media, wherein the machine accessible storage media has embodied therein:

a plurality of isolated independently executable domains, wherein the plurality of isolated independently executable domains comprise at least one personal domain and at least one non-personal domain, each domain having a domain-specific purpose governing use by the domain of the shared system resources, the domain-specific purpose being different for each of the domains, and wherein the processing unit monitors, with the context detector, the current operating context of the computing device and, for each of the domains:

enables the domain to use the shared system resources if the current operating context of the computing device does not conflict with the domain's domain-specific purpose;

disables the domain's use of one or more of the shared system resources if the current operating context conflicts with the domain-specific purpose; and enables data to be shared by the domain with another domain on the computing device if the current operating context does not conflict with the domain-specific purpose;

wherein the processing unit modifies the domain's use of one or more of the shared system resources without fully disabling the domain's use of the one or more of the shared system resources when the current operating context conflicts with the domain-specific purpose; and wherein the processing unit causes data to be modified before the data is shared by the domain with another entity, when the current operating context conflicts with the domain-specific purpose.

2. The computing device of claim 1, wherein the processing unit prevents data from being shared by the domain with another domain on the computing device if the current operating context conflicts with the domain-specific purpose.

3. A polymorphic computing device, comprising:

a processing unit comprising one or more processors;

one or more context detectors in communication with the processing unit to receive data indicating a current operating context of a use purpose of the polymorphic computing device;

shared system resources in communication with the processing unit; and machine accessible storage media having embodied therein:

a plurality of independently executable domains, wherein the plurality of isolated independently executable domains comprise at least one personal domain and at least one non-personal domain, each domain having a domain-specific purpose governing use by the domain of the shared system resources, and a plurality of components executable within the domain, each component comprising a component-specific purpose governing the sharing of component resources by the component with other components;

an integrity verification system to verify the integrity of each of the domains and components independently of any operating system running on the polymorphic computing device;

a provisioning system to provision each of the components for use on the polymorphic computing device independently of the provisioning of the other components and according to the component-specific purpose;

a policy arbitration system to determine a global policy for use of the shared system resources by the domains, wherein the global policy is a combination of all of the domain-specific purposes that does not violate any of the domain-specific purposes and the policy arbitration system enforces the global policy during operation of the polymorphic computing device; and a domain manager to activate and deactivate the domains on the polymorphic computing device in accordance with the global policy;

wherein the processing unit selectively executes the domains, the components, the integrity verification system, the provisioning system, the policy arbitration system, and the domain manager in response to the data indicating a current operating context of the polymorphic computing device;

wherein data is shared by ones of the domains with another domain on the computing device if the current operating context does not conflict with the domain-specific purpose; and wherein each component has a component-specific anti-purpose corresponding to the component-specific purpose, and the provisioning system provisions each of the components for use on the polymorphic computing device to Prevent execution of the component-specific anti-purpose.

4. The polymorphic computing device of claim 3, wherein both the domain-specific purpose and the component-specific purpose are defined differently for different operating contexts of the polymorphic computing device.

5. The polymorphic computing device of claim 3, wherein the domain-specific purposes are different for each of the plurality of domains.

6. The polymorphic computing device of claim 3, wherein the component-specific purposes are different for each of the plurality of components.

7. The polymorphic computing device of claim 3, wherein each domain has a domain-specific anti-purpose corresponding to the domain-specific purpose, and the policy arbitration system enforces the global policy to prevent execution of the domain-specific anti-purposes.

8. The polymorphic computing device of claim 3, wherein the polymorphic computing device is arranged according to a Multiple Independent Levels of Security (MILS) architecture, each of the domains is memory-isolated from each of the other domains, and each of the domains communicates with other domains only through well-defined communication channels.

9. The polymorphic computing device of claim 3, wherein the polymorphic computing device comprises a mobile computing device arranged according to a mobile device virtualization architecture.

10. A computing device, comprising:

a processing unit comprising one or more hardware processors;

a context detector in communication with the processing unit to receive data indicating a current operating context of a use purpose of the computing device;

shared system resources in communication with the processing unit, the shared system resources comprising one or more of a telephony subsystem, a camera subsystem, and a network subsystem;

machine accessible storage media; and a plurality of well-defined communication channels operably coupling the processing unit with the context detector, the shared system resources, and the machine accessible storage media, wherein the machine accessible storage media has embodied therein:

a plurality of isolated independently executable domains, wherein the plurality of isolated independently executable domains comprise at least one personal domain and at least one non-personal domain, each domain having a domain-specific purpose governing use by the domain of the shared system resources, the domain-specific purpose being different for each of the domains and wherein the processing unit monitors, with the context detector, the current operating context of the computing device and, for each of the domains:

enables the domain to use the shared system resources if the current operating context of the computing device does not conflict with the domain's domain-specific purpose; and disables the domain's use of one or more of the shared system resources if the current operating context conflicts with the domain-specific purpose;

enables data to be shared by the domain with another domain on the computing device if the current operating context does not conflict with the domain-specific purpose;

disables the domain's use of one or more of the shared system resources if the current operating context conflicts with any of the domains' domain-specific purpose;

maintains data relating to the domain-specific purposes of all of the domains, and, for each of the domains, enables the domain to use the shared system resources if the current operating context of the computing device does not conflict with any of the domains' domain-specific purposes; and causes data to be shared by the domain with another entity to be modified before the data is shared by the domain with the other entity, if the current operating context conflicts with the domain-specific purpose.

* * * * *